(12) United States Patent
Maeda et al.

(10) Patent No.: US 7,092,431 B2
(45) Date of Patent: Aug. 15, 2006

(54) RECEIVER, TRANSMITTER, COMMUNICATION SYSTEM, AND METHOD OF COMMUNICATION

(75) Inventors: Noriyuki Maeda, Yokohama (JP); Hiroyuki Atarashi, Yokohama (JP); Sadayuki Abeta, Yokosuka (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 763 days.

(21) Appl. No.: 10/329,421

(22) Filed: Dec. 27, 2002

(65) Prior Publication Data

US 2003/0123530 A1 Jul. 3, 2003

(30) Foreign Application Priority Data

Dec. 28, 2001 (JP) ............................. 2001-401418

(51) Int. Cl.
H04L 27/30 (2006.01)
(52) U.S. Cl. ...................... 375/144; 375/146; 375/148; 375/267; 375/347; 370/320; 370/465; 370/479; 455/52.3; 455/65; 455/101; 455/137; 455/272
(58) Field of Classification Search ................ 375/130, 375/140–144, 146–148, 150, 152, 260, 267, 375/299, 343, 347, 349; 370/320, 330, 335, 370/342, 441, 465, 479, 481; 455/49.1, 50.1, 455/52.1, 52.3, 65, 101, 103, 132, 137, 230, 455/231, 269, 271–272
See application file for complete search history.

(56) References Cited

U.S. PATENT DOCUMENTS

| | | | |
|---|---|---|---|
| 5,481,570 A * | 1/1996 | Winters | 375/347 |
| 5,940,453 A * | 8/1999 | Golden | 375/347 |
| 5,949,833 A | 9/1999 | Weerackody | |
| 5,982,327 A | 11/1999 | Vook et al. | |
| 6,205,166 B1 * | 3/2001 | Maruta et al. | 375/130 |
| 6,665,286 B1 * | 12/2003 | Maruta et al. | 370/342 |

(Continued)

FOREIGN PATENT DOCUMENTS

EP 0 773 638 5/1997

(Continued)

OTHER PUBLICATIONS

H. Takahashi, et al., IEICE Trans. Commun. vol. E79B, No. 9, XP-000636058, pp. 1221-1226, "Antenna and Multi-Carrier Combined Diversity System", Sep. 1, 1996.

(Continued)

Primary Examiner—Dac V. Ha
(74) Attorney, Agent, or Firm—Oblon, Spivak, McClelland, Maier & Neustadt, P.C.

(57) ABSTRACT

A receiver, comprising a plurality of antennas configured to receive signals that are obtained by multiplying a plurality of data symbols transmitted over a plurality of data channels using spreading codes for each of the data channels, the data symbol being transmitted over a plurality of sub-carriers having different frequencies; a spreading code multiplier configured to multiply reception signals received by the plurality of antennas using spreading codes for the data channels corresponding to the reception signals; a weight controller configured to adjust antenna weights by which a reception signal received by each antenna is to be multiplied, and sub-carrier weights by which a reception signal received over each sub-carrier is to be multiplied; a weight multiplier configured to multiply the reception signals by the antenna weights and the sub-carrier weights adjusted by the weight controller; and a combining unit configured to combine the reception signals multiplied by the antenna weights and the sub-carrier weights at the weight multiplier among the antennas and over spreading code duration of the spreading codes.

40 Claims, 41 Drawing Sheets

U.S. PATENT DOCUMENTS

2002/0085653 A1* 7/2002 Matsuoka et al.

FOREIGN PATENT DOCUMENTS

| EP | 0 844 765 | 5/1998 |
| EP | 1 043 857 | 10/2000 |
| WO | WO 00/05831 | 2/2000 |
| WO | WO 01/03330 | 1/2001 |

OTHER PUBLICATIONS

D.G. Brennan, "Linear Diversity Combining Techniques," Proceedings of the IRE, vol. 47, No. 6, Jun. 1959, pp. 1075-1102.

Nathan Yee, et al. "Multi-Carrier CDMA in Indoor Wireless Radio Networks," The Fourth International Symposium on Personal, Indoor and Mobile Radio Communications, Sep. 8-11, 1993, pp. 109-113.

Shinsuke Hara, et al. "Design and Performance of Multicarrier CDMA System in Frequency-Selective Rayleigh Fading Channels," IEEE Transactions on Vehicular Technology, vol. 48, No. 5, Sep. 1999, pp. 1584-1595.

M. Münster, et al. "Co-Channel Interference Suppression Assisted Adaptive OFDM in Interference Limited Environments," IEEE VTS 50th Vehicular Technology Conference, vol. 1, Sep. 19-22, 1999, pp. 284-288.

* cited by examiner

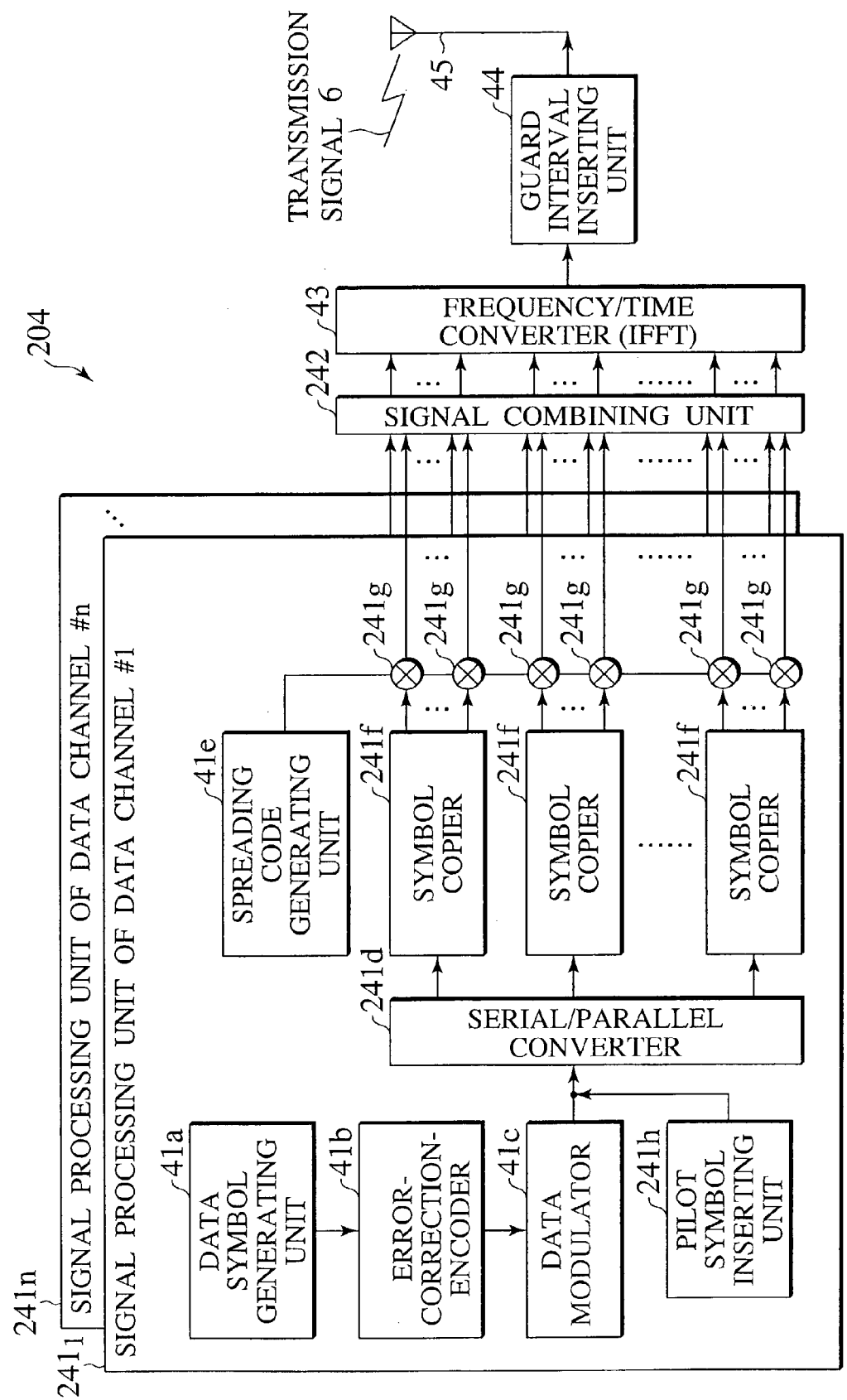

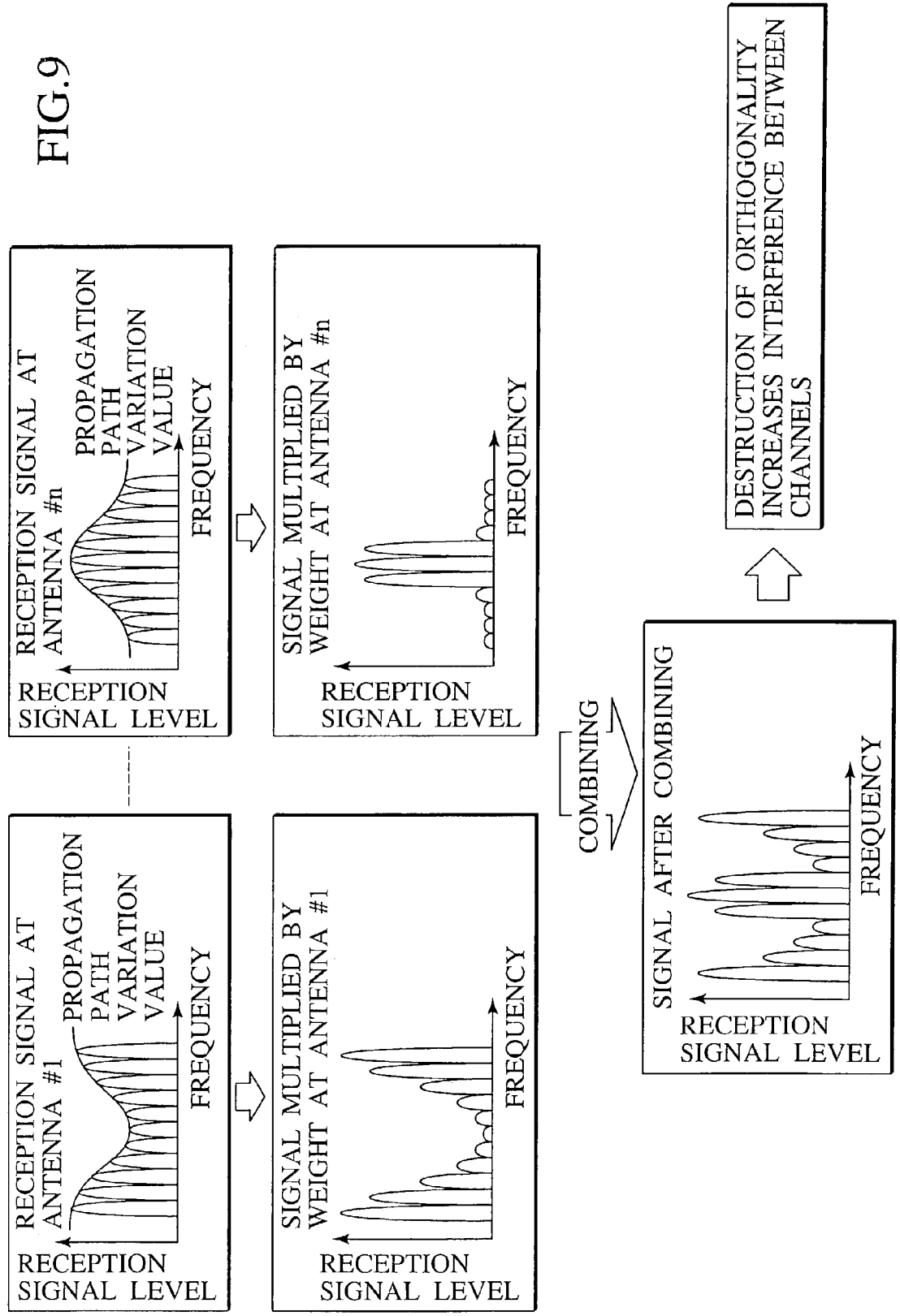

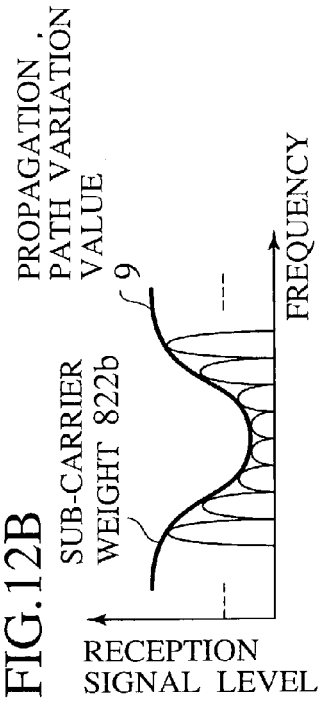
FIG.12A
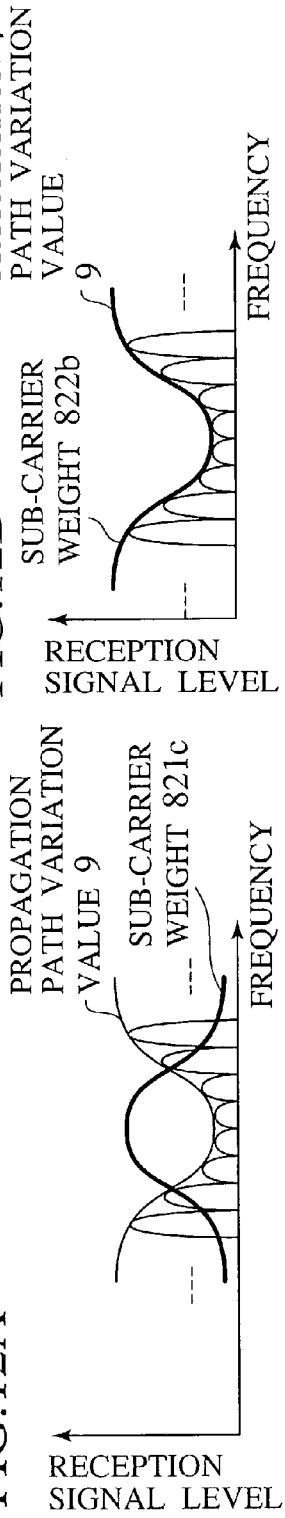
FIG.12B
FIG.12C
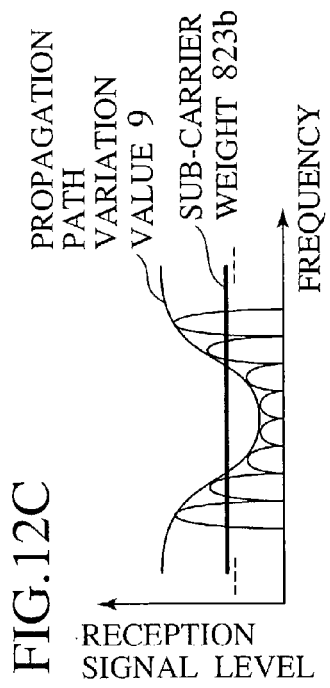
FIG.12D
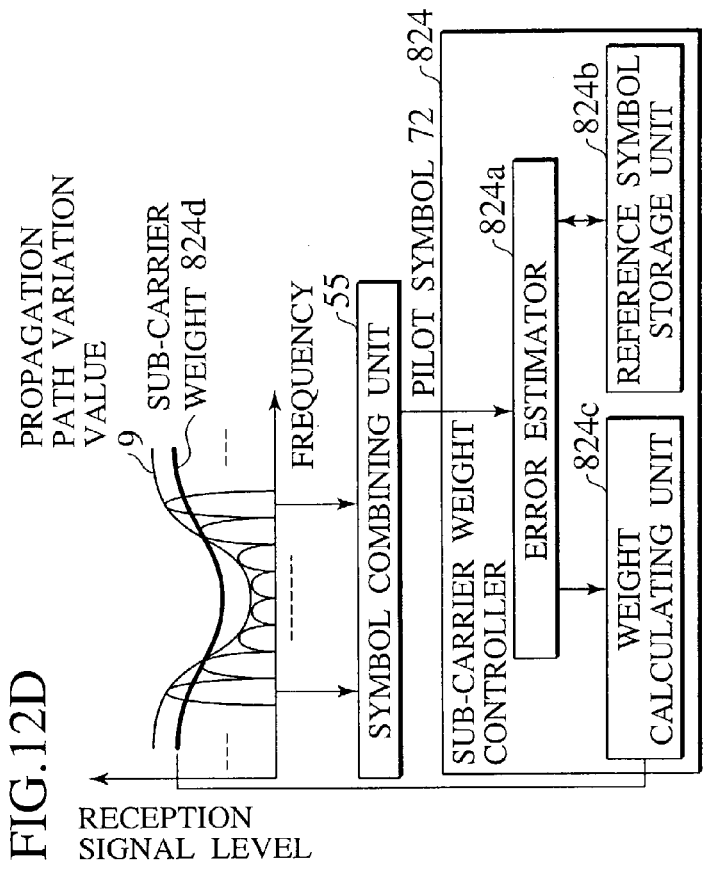

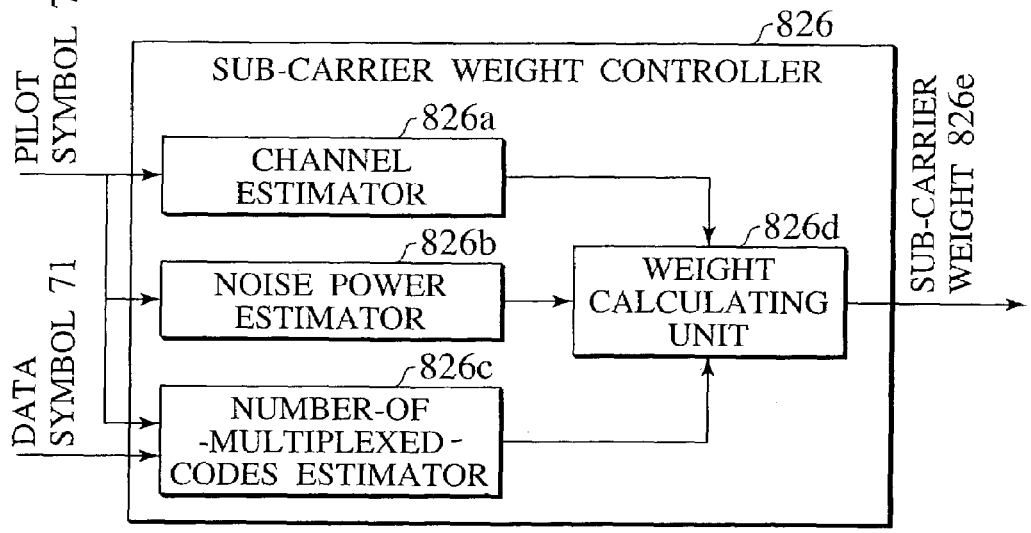
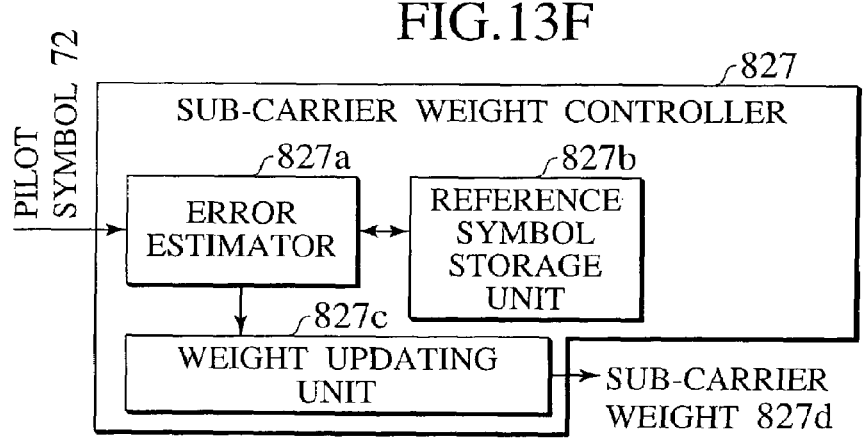
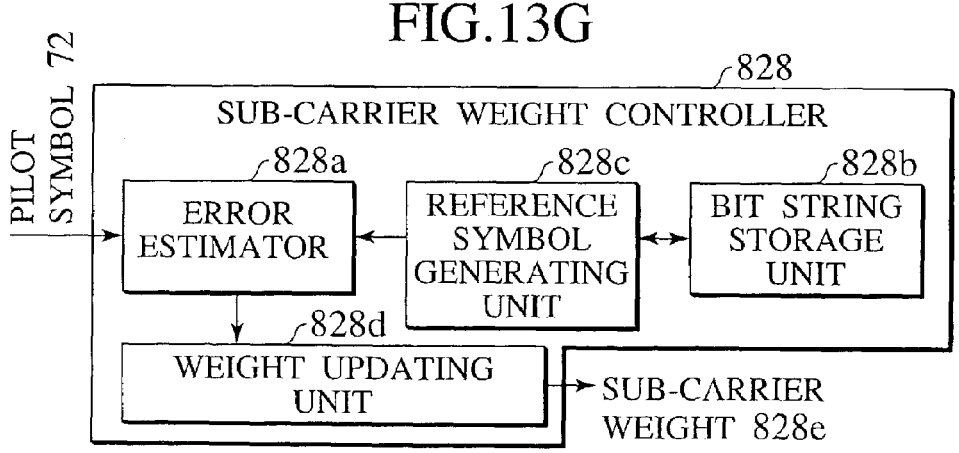

US 7,092,431 B2

RECEIVER, TRANSMITTER, COMMUNICATION SYSTEM, AND METHOD OF COMMUNICATION

CROSS REFERENCE TO RELATED APPLICATIONS

This application is based upon and claims the benefit of priority from the prior Japanese Patent Application No. P2001-401418, filed on Dec. 28, 2001; the entire contents of which are incorporated herein by reference.

BACKGROUND OF THE INVENTION

1. Field of the Invention

The present invention relates to a receiver, a transmitter, a communication system, and a method of communication.

2. Description of the Related Art

The multi-carrier code division multiple access (CDMA) transmission method was proposed in 1993 in MULTI-CARRIER CDMA IN INDOOR WIRELESS RADIO NETWORKS (N. Yee et al., 1993 IEEE Personal, Indoor and Mobile Radio Communications), and studies have been made regarding the application of the same to mobile communication systems since then.

The multi-carrier CDMA transmission method is a method of transmission in which a data symbol is copied in the direction of a frequency axis; each of the copied data symbols is multiplied by one chip of a spreading code and spread; and the spread data signals are transmitted in parallel over a plurality of sub-carriers having different frequencies.

The multi-carrier CDMA transmission method makes it possible to transmit a plurality of data symbols simultaneously. According to the multi-carrier CDMA transmission method, a data symbol is multiplied by a spreading code in the direction of a frequency axis. Therefore, according to the multi-carrier CDMA transmission method, a plurality of data symbols can be code-division-multiplexed by multiplying the data symbols by a spreading code orthogonal to each other.

Further, a low symbol rate and a great symbol length are achieved by the multi-carrier CDMA method because parallel transmission is performed using a plurality of sub-carriers. As a result, the multi-carrier CDMA transmission method makes it possible to reduce the influence of so-called multipath interference that is problematic in a mobile communication environment. Multipath interference is interference which occurs between transmission signals when they arrive at a receiver at different timing via a plurality of different paths (a multipath) and which results in the degradation of signal transmission characteristics. In a multipath, frequency-selective fading occurs in which variations in the path occurs depending on frequency, the signal transmission characteristic varying depending on its frequency. According to the multi-carrier CDMA transmission method, a data signal is spread in the direction of a frequency axis. Therefore, according to the multi-carrier CDMA transmission method, a frequency diversity effect reduces the influence of variation in signal transmission characteristic, thus improving signal transmission characteristics. The multi-carrier CDMA transmission method has many advantages as thus described.

However, the multi-carrier CDMA transmission method has the following problems. As shown in FIGS. 1A and 1B, a receiver receives signals that are signals over a data channel #1 and a data channel #2 multiplexed and transmitted. The receiver multiplies the reception signals by a spreading code in the direction of frequencies, the spreading code being identical to a spreading code that has been multiplied at the transmitter. Then, the receiver performs despreading by combining the reception signals of each sub-carrier over the spreading code duration of the spreading codes.

As shown in FIG. 1A, when the propagation path variation value of the sub-carriers has a constant, the spreading codes multiplied on the data symbols in the respective data channels are orthogonal to each other. Therefore, the data symbols in the respective data channels #1 and #2 are completely recovered in the reception signals after despreading. In practice, however, since the sub-carriers are subjected to different amplitude variations and phase variations as shown in FIG. 1B, the propagation path variation value will not have a constant. Therefore, the orthogonality of the spreading codes multiplied on the reception signals in the respective data channels received after propagating on the multipath is destructed. As a result, the data symbols in the respective data channels #1 and #2 can be not completely recovered from the reception signals after despreading, and the data symbols in the data channels interfere with each other and remain, which degrades signal transmission characteristics.

In order to solve such a problem, a method in which a receiver multiplies a reception signal over each sub-carrier by weights and combines signals to reduce interference between data symbols in data channels has been proposed in Design and Performance of Multicarrier CDMA System in Frequency-Selective Rayleigh Fading Channels (S. Hara et al., IEEE TRANSACTIONS ON VEHICULAR TECHNOLOGY, pp. 1584–1595, VLO. 48, NO. 5, September 1999), for example.

Diversity combining is a technique for reducing the influence of variation in signal transmission characteristics depending on frequency by the above-described effect of frequency-selective fading, and improving signal transmission characteristics. One scheme for diversity combining is antenna diversity combining in which signals are received by a plurality of antennas and in which combining is performed with the signal received of each of the antennas multiplied by weights. For example, a method for weighting in antenna diversity combining has been proposed in Linear Diversity Combining Techniques (D. G. Brennan, Proc. IRE, pp. 1075–1102, VOL. 47, NO. 6, June 1959).

A proposal has recently been made in which antenna diversity combining is applied to the orthogonal frequency division multiplexing (OFDM) multi-carrier transmission method (CO-CHANNEL INTERFERENCE SUPPRESSION ASSISTED ADAPTIVE OFDM IN INTERFERENCE LIMITED ENVIRONMENTS (M. Munster et al., IEEE Vehicular Technology Conference-Fall, 1999)).

However, studies have been made only on the application of antenna diversity to the OFDM multi-carrier transmission method, and no study has been made at all on the application of antenna diversity combining in the multi-carrier CDMA transmission method.

BRIEF SUMMARY OF THE INVENTION

An object of the present invention, is to apply appropriately antenna diversity combining to the multi-carrier CDMA transmission method to reduce the influence of interference between data channels and to thereby improve signal transmission characteristics.

A receiver according to an aspect of the present invention comprises a plurality of antennas configured to receive signals that are obtained by multiplying a plurality of data symbols transmitted over a plurality of data channels using spreading codes for each of the data channels, the data symbol being transmitted over a plurality of sub-carriers having different frequencies, a spreading code multiplier configured to multiply the reception signals received by the plurality of antennas using spreading codes for the data channels corresponding to the reception signals, a weight controller configured to adjust antenna weights by which the reception signal received by each antenna is to be multiplied and sub-carrier weights by which the reception signal received over each sub-carrier is to be multiplied, a weight multiplier configured to multiply the reception signals by the antenna weights and the sub-carrier weights adjusted by the weight controller, and a combining unit configured to combine the reception signals multiplied by the antenna weights and the sub-carrier weights at the weight multiplier among the antennas and over the spreading code duration of the spreading codes.

In such a receiver, the plurality of antennas receive signals that are obtained by multiplying a plurality of data symbols using spreading codes for each of the data channels and that are transmitted over a plurality of sub-carriers having different frequencies. The spreading code multiplier multiplies the reception signals using spreading codes for the data channels corresponding to the reception signals. The weight multiplier multiplies the reception signals by the antenna weights which is adjusted by the weight controller and by which the signal received by each antenna is multiplied and sub-carrier weights which is adjusted by the weight controller and by which the signal received over each sub-carrier is multiplied. The combining unit combines the reception signals multiplied by the antenna weights and sub-carrier weights among the antennas and over the spreading code duration of the spreading codes.

Thus, the reception signals are multiplied by the antenna weights and sub-carrier weights adjusted by the weight controller. Therefore, the spreading codes for each of the data channels which the reception signals are multiplied are orthogonal to each other. As a result, the data symbols are less affected by interference between the data channels that is caused by the destruction of orthogonality between the spreading codes. As thus described, the receiver can improve the signal transmission characteristics by appropriately applying antenna diversity combining to the multi-carrier CDMA transmission method.

BRIEF DESCRIPTION OF THE SEVERAL VIEWS OF THE DRAWINGS

FIG. 5 is a block diagram illustrating the configuration of another transmitter according to the first embodiment of the present invention;

FIG. 9 illustrates a simple application of antenna diversity combining to the multi-carrier CDMA transmission method;

FIGS. 12A to 12D illustrate a method of determining sub-carrier weights according to the first embodiment of the present invention;

FIGS. 13A to 13G are block diagrams illustrating the configuration of a sub-carrier weight controller according to the first embodiment of the present invention;

DETAILED DESCRIPTION OF THE INVENTION

With reference to the drawings, embodiments of the present invention will be described below.

FIRST EMBODIMENT (Communication System)

Figure 1B:
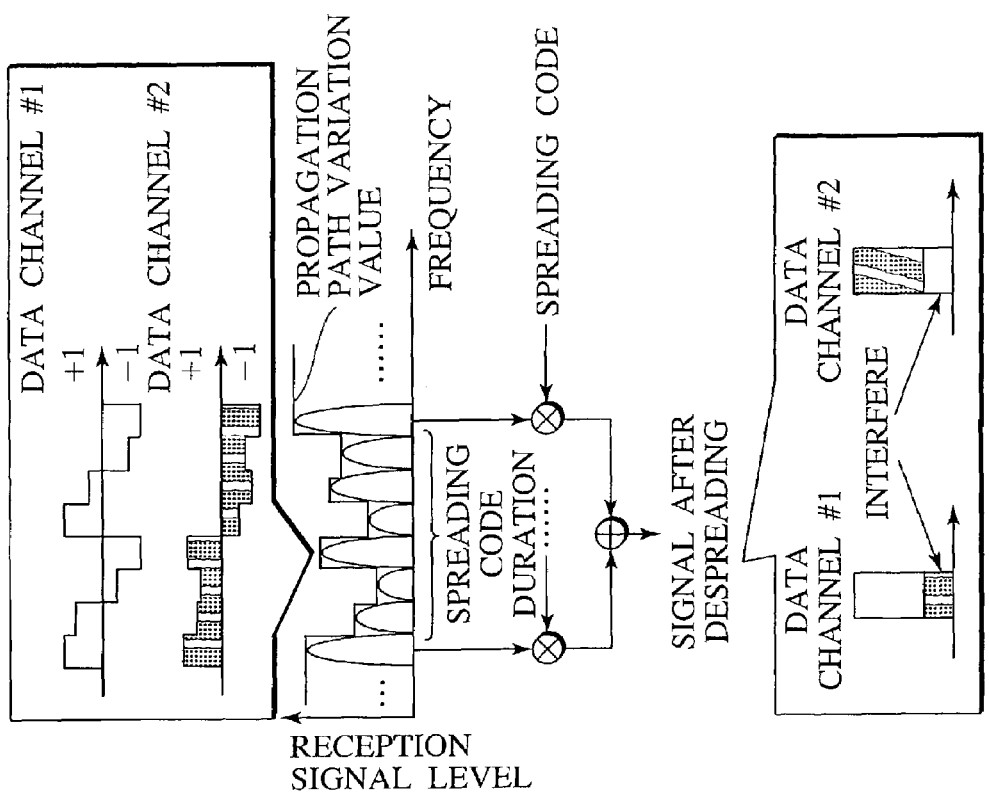
FIGS. 1A and 1B illustrate a conventional multi-carrier CDMA transmission method.
Figure 1A:
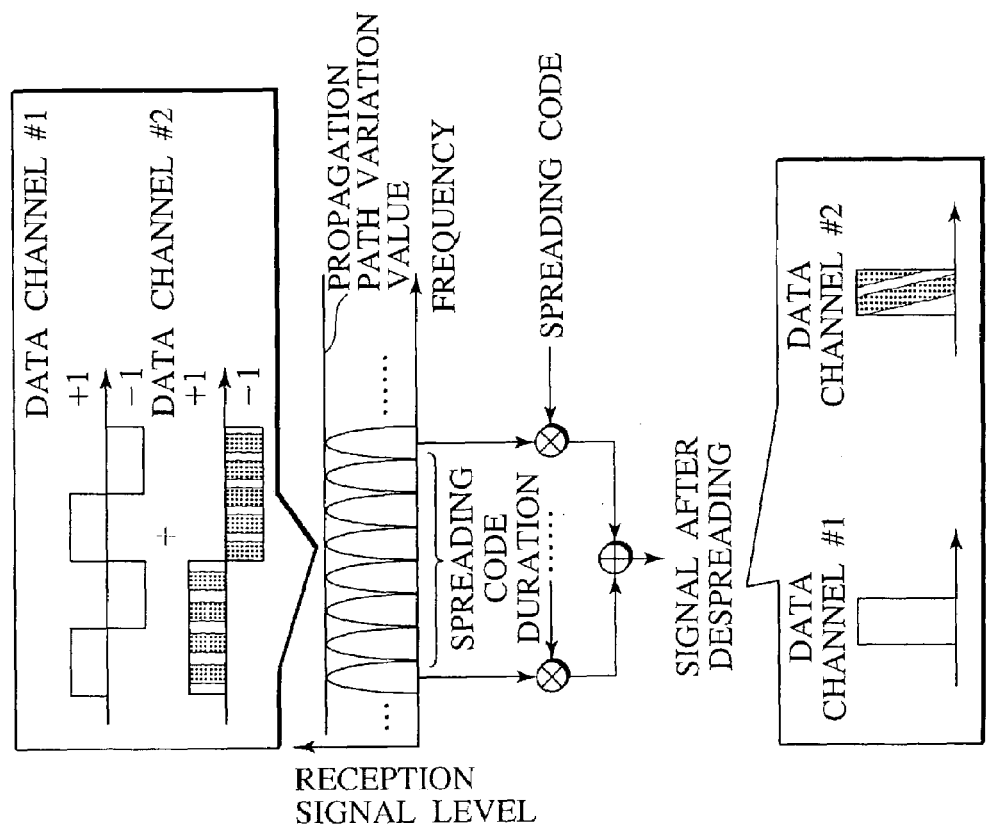
Figure 2:
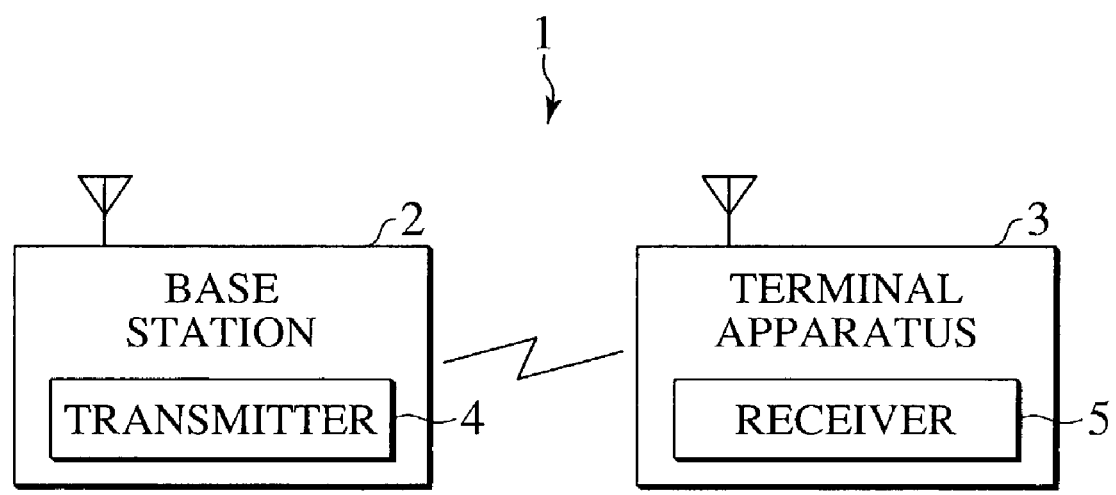
FIG. 2 is a block diagram illustrating the configuration of a communication system according to a first embodiment of the present invention.

As shown in FIG. 2, a communication system 1 comprises a transmitter 4 and a receiver 5. The transmitter 4 is provided at a base station 2, for example. The receiver 5 is provided in a terminal apparatus 3, for example. The transmitter 4 transmits signals using the multi-carrier CDMA transmission method in which signals obtained by multiplying a plurality of data symbols transmitted on a plurality of data channels by a spreading code are transmitted over a plurality of sub-carriers having different frequencies. The receiver 5 receives the signals transmitted by the transmitter 4 according to the multi-carrier CDMA transmission method. The communication system is not limited to one-to-one communication between the transmitter 4 and the receiver 5 as shown in FIG. 2, and a communication system may be employed which allows communication between one transmitter 4 and a plurality of receivers 5, communication between a plurality of transmitters 4 and one receiver 5, or communication between a plurality of transmitters 4 and a plurality of receivers 5. Alternatively, the communication system may be a communication system in which a transmitter 4 or receiver 5 relays a signal to another transmitter 4 or receiver 5.

(Transmitter)

Figure 3:
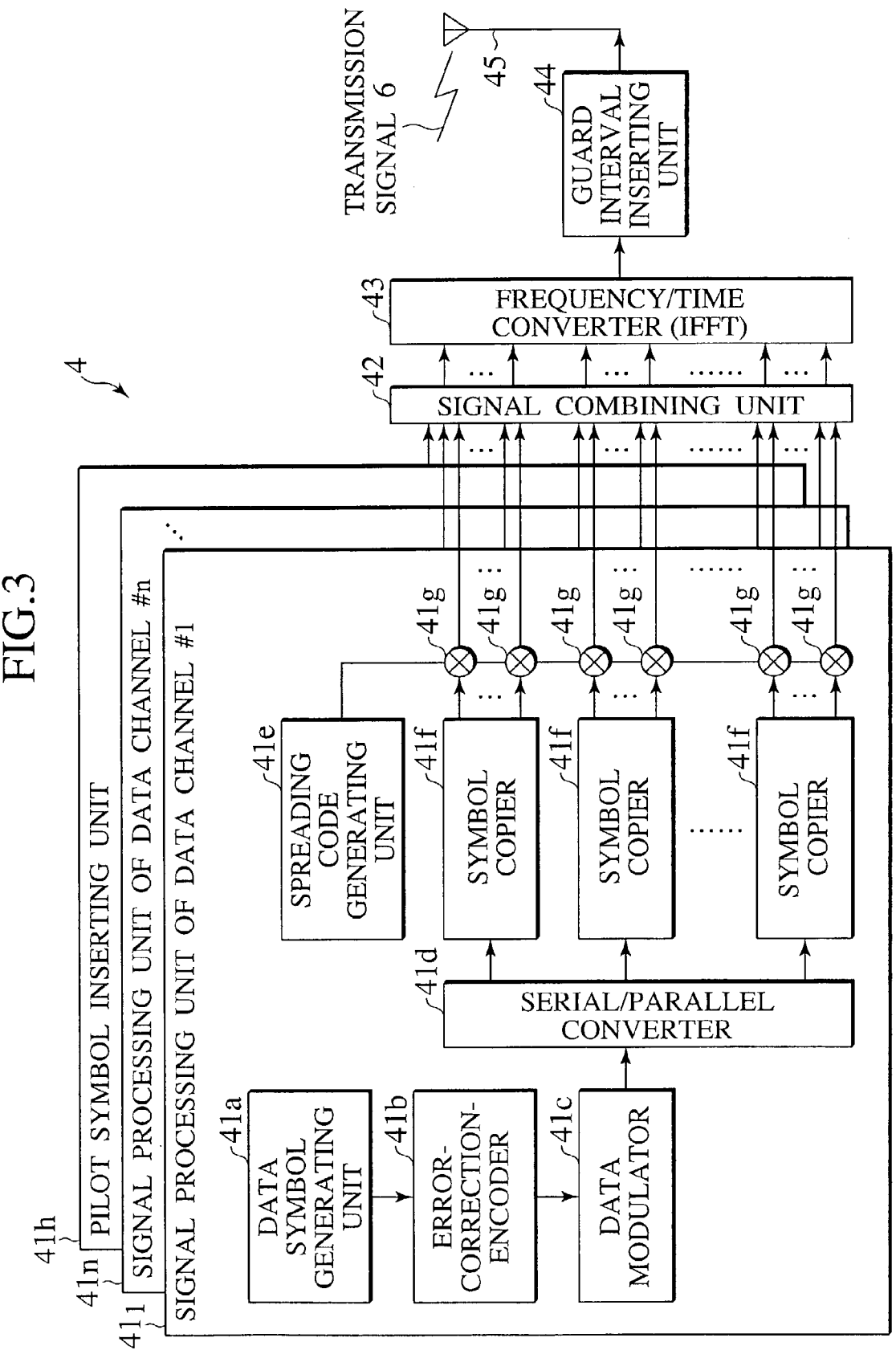
FIG. 3 is a block diagram illustrating the configuration of a transmitter according to the first embodiment of the present invention.

As shown in FIG. 3, the transmitter 4 comprises a plurality of signal processing unit $41_1$ to $41n$, a pilot symbol inserting unit $41h$, a signal combining unit 42, a frequency/time converter 43, a guard interval inserting unit 44, and an antenna 45. The signal processing units $41_1$ to $41n$ are provided in the same quantity as a plyurality of data channels #1 to #n. The signal processing units $41_1$ to $41n$ associated with the data channels #1 to #n process transmission signals such as data signals and pilot signals transmitted over the data channels #1 to #n.

The signal processing units $41_1$ to $41n$ comprise a data symbol generating unit $41a$, an error-correction-encoder $41b$, a data modulator $41c$, a serial/parallel converter $41d$, a spreading code generating unit $41e$, a plurality of symbol copier $41f$, and a plurality of spreading code multiplier $41g$.

The data symbol generating unit $41a$ generates data symbols to be transmitted over the data channels associated therewith. Specifically, the data symbol generating units $41a$ of the respective signal processing units $41_1$ to $41n$ generate data symbols associated with the respective data channels #1 to #n. The data symbol generating unit $41a$ generates data symbols of data such as images and sounds to be transmitted to the terminal apparatus 3. For example, data symbol generating circuit that generates data symbols may be used as the data symbol generating unit $41a$.

The error-correction-encoder $41b$ perform error-correction encoding on data symbols generated by the data symbol generating units $41a$. The error-correction-encoder $41b$ performs turbo encoding or convolutional encoding, for example. Thus, the receiver 5 can perform error-correction-decoding. Therefore, the receiver 5 can obtain an encoding gain (a quantity of improvement that is a reduction in power required for reception achieved by applying an error-correcting encoding) to improve communication quality.

The data modulator $41c$ performs a data modulating process on a data symbol that has been subjected to error-correction-encoding. The data modulator $41c$ performs multivalued quadrature amplitude modulation (QAM) such as 16-QAM and 64-QAM, binary phase shift keying (BPSK) modulation, or quadrature phase shift keying (QPSK) modulation.

The serial/parallel converter $41d$ is a divider configured to divide a data symbol into a plurality of data symbols. The serial/parallel converter $41d$ performs serial/parallel conversion of a data symbol in order to transmit a plurality of data symbols at the same time. Specifically, the serial/parallel converter $41d$ divide a serial data symbol input from the data modulator $41c$ at constant intervals, converting it into data symbols that are arranged in parallel in the direction of a frequency axis.

The symbol copiers $41f$ copy the plurality of data symbols obtained by the serial/parallel conversion and division at the serial/parallel converter $41d$ in a quantity that is equal to a number of spreading code duration of the spreading codes corresponding to the data channels #1 to #n over which the data symbols are transmitted.

The spreading code generating unit $41e$ generates the spreading codes corresponding to the respective data channels and assigned to the data channels. The spreading code generating unit 41e inputs the generated spreading codes to the spreading code multiplier 41g.

The spreading code multipliers 41g multiply the data symbols copied by the symbol copiers 41f using the spreading codes corresponding to the data channels #1 to #n over which the data symbols are transmitted to provide data signals. The spreading code multipliers 41g multiply the respective copied data symbols using the spreading codes input thereto from the spreading code generating unit 41e in the direction of the frequency axis. The spreading code multipliers 41g are provided in a quantity that is equal to the number of the spreading code duration of the spreading codes corresponding to the data channels #1 to #n over which the data symbols are transmitted. The spreading code multipliers 41g input the data signals obtained by multiplying the data symbols using the spreading codes to the signal combining unit 42.

The pilot symbol inserting unit 41h inserts pilot symbol into the data symbols to generate transmission signals 6 that are data signals multiplexed with pilot signals. The pilot symbol is symbol whose amplitude and phase are known to the receiver 5. The pilot symbol is used by the receiver 5 to estimate propagation path variation in the reception signal and an error between a reception signal and a transmission signal after despreading.

Referring to the pilot symbols, common pilot symbols may be used in the plurality of data channels #1 to #n, and different pilot symbols may alternatively be used in each of the data channels #1 to #n.

Propagation path variation is variation in the phase and amplitude of a signal transmitted by the transmitter 4 that occur on the same when it is propagated in a propagation path between the transmitter 4 and the receiver 5 before it is received by the receiver 5. That is, propagation path variation indicates how much the phase and amplitude of a signal transmitted by the transmitter 4 changes before it is received by the receiver 5 after being propagated in a propagation path between the transmitter 4 and the receiver 5. Such estimation of a propagation path variation in a reception signal is referred to as "channel estimation". Therefore, propagation path variation in a reception signal obtained through channel estimation is specially called "channel estimated value".

The transmitter 4 performs code-division-multiplexing in order to multiplex pilot signals and data signals in the direction of a spreading code axis. The pilot signal inserting unit 41h provides the signal combining unit 42 with the input of pilot signals obtained by multiplying pilot symbols using spreading codes different from those of the signal processing units $41_1$ to 41n as well as the signal processing units $41_1$ to 41n of the plurality of data channels #1 to #n. The term "insertion of pilot symbols" implies not only inserting pilot symbols as they are but also inserting pilot symbols after converting them into pilot signals by multiplying them using spreading codes.

The signal combining unit 42 combines the data signals in the respective data channels #1 to #n input from the spreading code multiplier 41g of the signal processing units $41_1$ to 41n of the respective data channels, thereby code-division-multiplexing the same. Not only the data signals of the respective data channels #1 to #n but also the pilot signals are input to the signal combining unit 42 of the transmitter 4 by the pilot symbol inserting unit 41h. Therefore, the signal combining unit 42 combines the data signals and pilot signals to perform code-division-multiplexing on the same.

The frequency/time converter 43 is a spreading unit configured to spread the data signals multiplied using spreading codes at the spreading code multiplier 41g and code-division-multiplexed by the signal combining unit 42 over a plurality of sub-carriers having different frequencies for transmitting the data signals. The frequency/time converter 43 performs frequency/time signal conversion on the data signals to assign the data signals to the plurality of sub-carriers having different frequencies, thereby generating a multi-carrier CDMA signal. For example, an inverse fast Fourier transform (IFFT) apparatus may be used as the frequency/time converter 43 to perform an inverse fast Fourier transform process.

The guard interval inserting unit 44 inserts a guard interval in each of the data signals spread over the plurality of sub-carriers by the frequency/time converter 43. The guard interval is inserted between the data signals to prevent interference between the data signals. The insertion of the guard intervals makes it possible to reduce the influence of interference between the data signals that is attributable to a delay of each data signal in arriving at the receiver 5 as a result of multipath propagation. As a guard interval, the guard interval inserting unit 44 may insert a signal obtained by copying a part of the waveform of a data signal or a signal having a predetermined pattern, for example. The length of a guard interval may be determined taking the delay time into consideration.

Figure 4A:
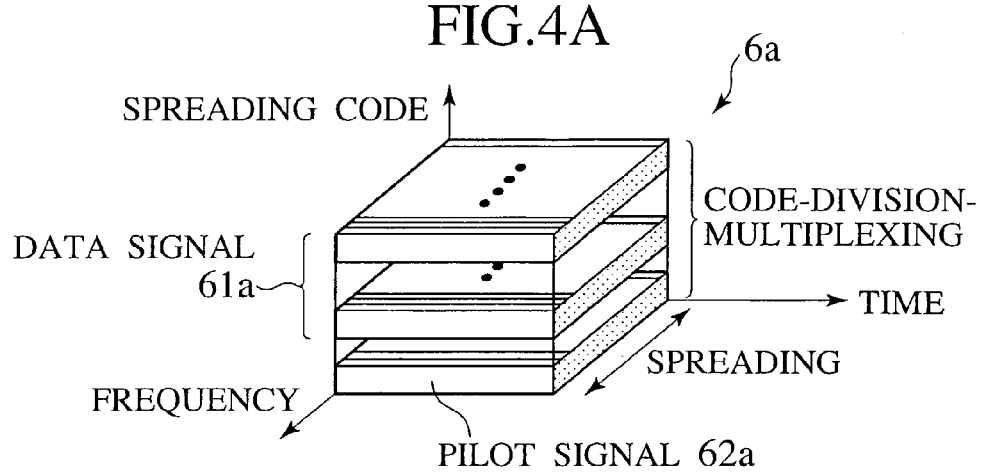
FIGS. 4A, 4B, and 4C illustrate a transmission signal according to the first embodiment of the present invention.

The antenna 45 transmits a multi-carrier CDMA signal having guard intervals inserted therein to the receiver 5 as a transmission signal 6. Since pilot signals and data signals have been code-division-multiplexed at the transmitter 4, there is provided a transmission signal 6a in which pilot signals 62a and data signals 61a are code-division-multiplexed with different spreading codes in the direction of a spreading code axis as shown in FIG. 4A. The transmission signal 6a is a multi-carrier CDMA signal that is spread in the direction of the frequency axis or spread over the frequencies of a plurality of sub-carriers. Thus, when the pilot signals 62a and the data signals 61a are code-division-multiplexed, the duration of one frame of the transmission signal 6a can be made short to achieve improved frame efficiency.

Pilot signals and data signals may be multiplexed through time-division-multiplexing that is multiplexing in the direction of a time axis. When time-division-multiplexing is performed, for example, a transmitter 204 as shown in FIG. 5 may be used. In the transmitter 204, pilot signals and data signals are time-division-multiplexed. In the transmitter 204, data symbol generating unit 41a, error-correction-encoder 41b, data modulator 41c, and spreading code generating unit 41e of respective signal processing units $241_1$ to 241n, a frequency/time converter 43, a guard interval inserting unit 44, and an antenna 45 are substantially the same as those of the transmitter 4 shown in FIG. 3. Therefore, in FIG. 5 they are indicated by like symbols to those for the transmitter 4 and will not be described here.

The pilot symbol inserting unit 241h inputs pilot symbols to the serial/parallel converter 241d at different times to when the data modulator 41c inputs data symbols to the serial/parallel converter 241d. Thus, the data symbols and the pilot symbols are time-division-multiplexed. Specifically, the data symbols output by the data modulator 41c and the pilot symbols output by the pilot symbol inserting unit 241h are input to the serial/parallel converter 241d at different times by switching unit 241i that input the data symbols and the pilot symbols to the serial/parallel converter 241d on a switched basis.

The serial/parallel converter 241d performs serial/parallel conversion on the time-division-multiplexed data symbols and pilot symbols similarly to the serial/parallel converter 41d. Symbol copiers 241f copies the time-division-multiplexed data symbols and pilot symbols similarly to the symbol copier 41f. Spreading code multipliers 241g multiply the time-division-multiplexed data symbols and pilot symbols using spreading codes similarly to the spreading code multipliers 41g to provide time-division-multiplexed data signals and pilot signals. The spreading code multipliers 241g of the respective data channels #1 to #n input the data signals and pilot signals which have been multiplied using the spreading codes and time-division-multiplexed to a signal combining unit 242. The signal combining unit 242 combines the time-division-multiplexed data signals and pilot signals in the respective data channels #1 to #n input from the spreading code multipliers 241g of the signal processing units $241_1$ to 241n of the respective data channels to perform code-division-multiplexing on the same.

Figure 4B:
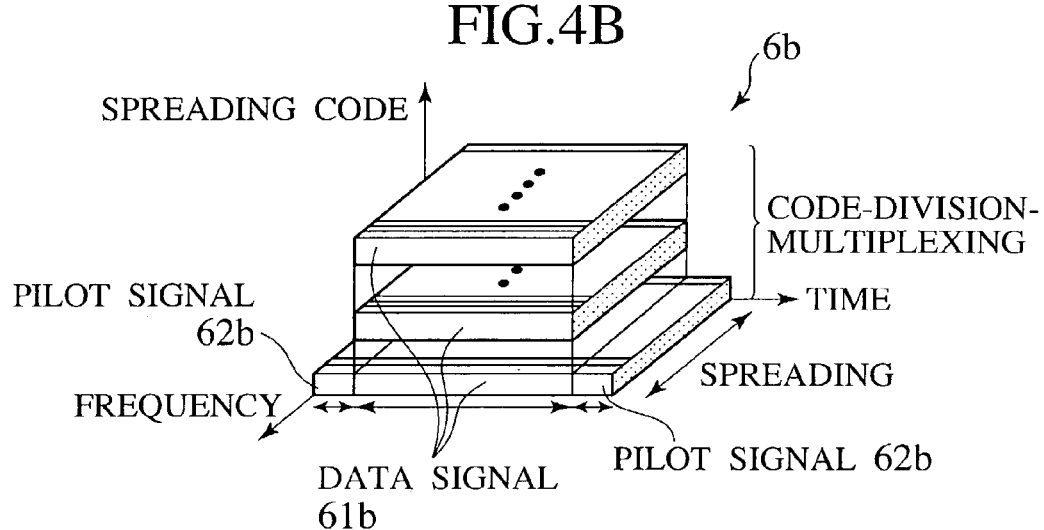

As a result, a transmission signal 6b transmitted by the transmitter 204 is a transmission signal in which pilot signals 62b and data signals 61b are time-division-multiplexed in the direction of the time axis as shown in FIG. 4B. Since time-division-multiplexed data signals and pilot signals are multiplied using spreading codes to be code-division-multiplexed, the transmission signal 6c becomes a multi-carrier CDMA signal in which the pilot signals 62b are code-division-multiplexed as well as the data signals 61b. Thus, when the pilot signals 62b and the data signals 61b are time-division-multiplexed, no inter-code interference occurs between the pilot signals 62b as shown in FIG. 4B. Therefore, estimation accuracy of the receiver 5 can be improved for estimating the propagation path variation and error between a reception signal and a transmission signal 6 after despreading using pilot signals 62b thus received.

Figure 7:
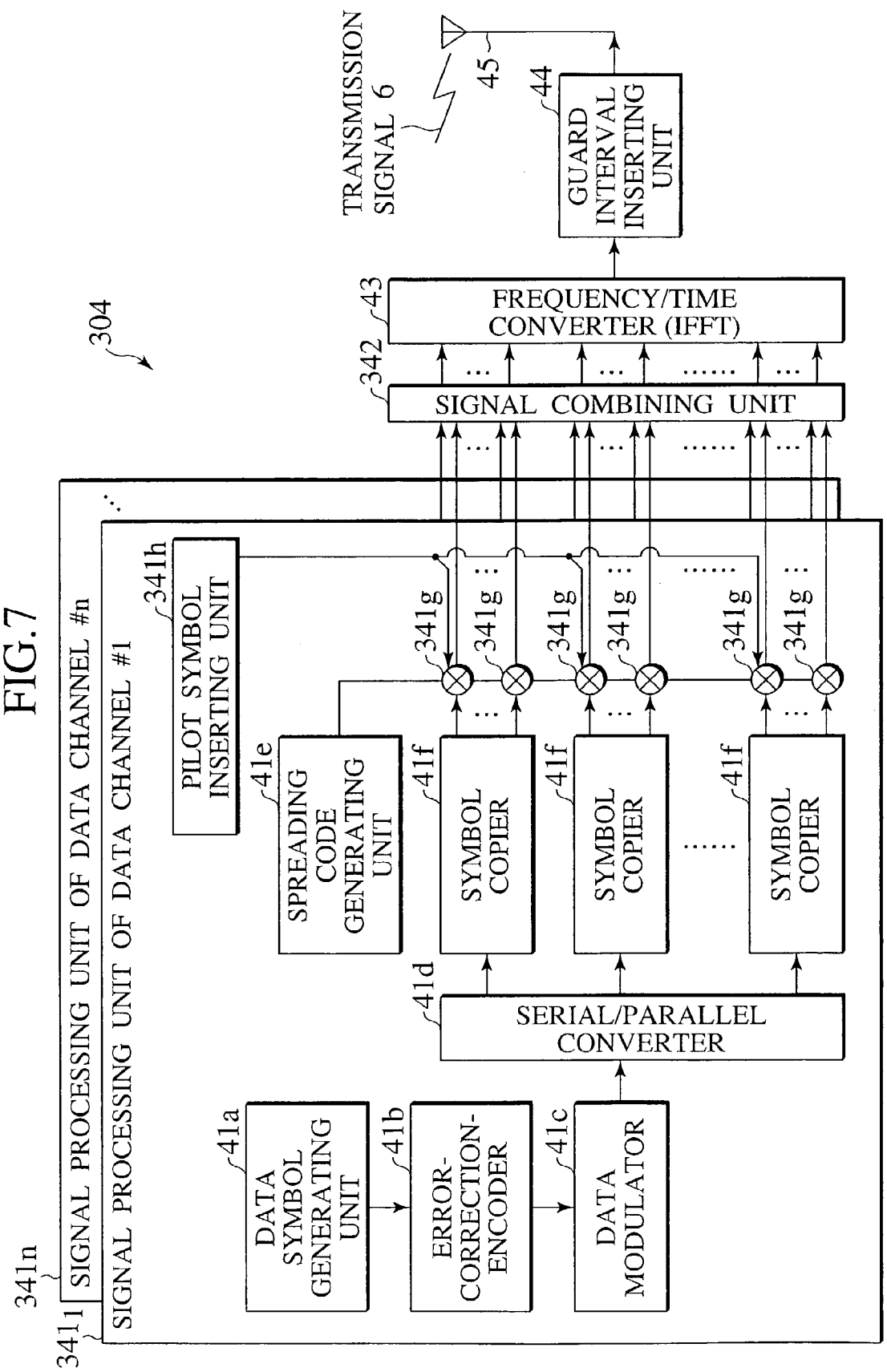
FIG. 7 is a block diagram illustrating the configuration of another transmitter according to the first embodiment of the present invention.

Pilot signals and data signals may be multiplexed through frequency-division-multiplexing that is multiplexing in the direction of a frequency axis. When frequency-division-multiplexing is performed, for example, a transmitter 304 as shown in FIG. 7 may be used. In the transmitter 304, pilot signals and data signals are frequency-division-multiplexed. In the transmitter 304, data symbol generating unit 41a, error-correction-encoder 41b, data modulator 41c, serial/parallel converter 41d, spreading code generating units 41e, symbol copiers 41f of respective signal processing units $341_1$ to 341n, a frequency/time converter 43, a guard interval inserting unit 44, and an antenna 45 are substantially the same as those of the transmitter 4 shown in FIG. 3. Therefore, in FIG. 7 they are indicated by like symbols to those for the transmitter 4 and will not be described here.

Pilot symbol inserting unit 341h inputs pilot symbols to spreading code multipliers 341g. Instead of inputting pilot symbols to all of a plurality of spreading code multipliers 341g, the pilot symbol inserting unit 341h inputs the same at intervals each of which is provided by skipping several spreading code multipliers 341g. That is, the pilot symbol inserting unit 341h inputs the pilot symbols to some of the plurality of spreading code multipliers 341g. Thus, the pilot symbols are inserted at some particular frequencies to allow data symbols and the pilot symbols to be frequency-division-multiplexed. At the spreading code multipliers 341g to which the pilot symbols have been input, the data symbols and pilot symbols are multiplied using spreading codes as done in the spreading code multipliers 41g. The spreading code multipliers 341g of the respective data channels #1 to #n input the resultant frequency-division-multiplexed data signals and pilot signals multiplied using the spreading codes to a signal combining unit 342. The signal combining unit 342 combines the frequency-division-multiplexed data signals and pilot signals in the data channels #1 to #n input from the spreading code multipliers 341g of the signal processing units $341_1$ to 341n of the respective data channels, performing code-division-multiplexing on the same.

Figure 4C:
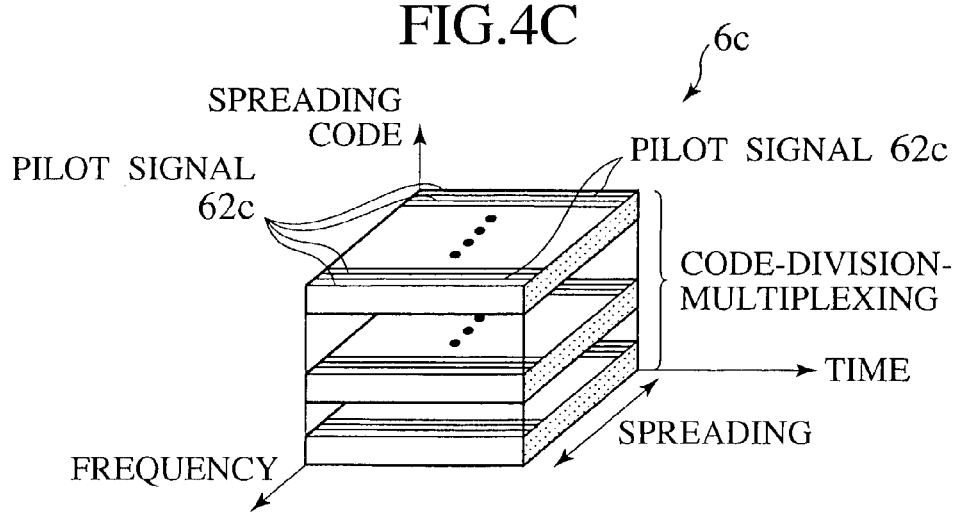
Figure 6:
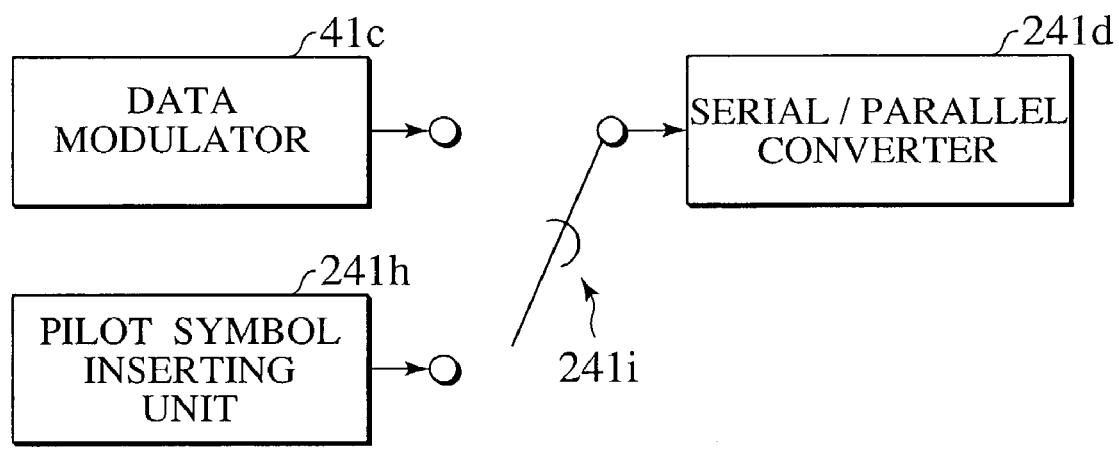
FIG. 6 illustrates switching of input symbols according to the first embodiment of the present invention.

As a result, a transmission signal 6c transmitted by the transmitter 304 is a transmission signal in which pilot signals 62c and data signals 61c are multiplexed in the direction of the frequency axis as shown in FIG. 4C. Since frequency-division-multiplexed data signals and pilot signals are code-division-multiplexed, the transmission signal 6c becomes a multi-carrier CDMA signal in which the pilot signals 62c are code-division-multiplexed as well as the data signals 61c. Thus, when the pilot signals 62c and the data signals 61c are frequency-division-multiplexed, the duration of one frame of the transmission signal 6c can be kept short thus achieving improved frame efficiency.

The pilot signals may be transmitted in a signal format different from that of the data signals. Referring to the spreading codes by which the pilot symbols are multiplied, a common spreading code may be used in the plurality of data channels #1 to #n, and a different spreading code may alternatively be used in each of the data channels #1 to #n.

In such transmitters 4, 204, and 304, the serial/parallel converters 41d and 241d divide each of the data symbols transmitted over the plurality of data channels #1 to #n into a plurality of data symbols. The symbol copiers 41f and 241f copy data symbols in quantities equal to the numbers of the spreading code duration of spreading codes corresponding to the data channels #1 to #n over which the data symbols are transmitted. The spreading code generating unit 41e generate spreading codes corresponding to the data channels. The spreading code multipliers 41g, 241g, and 341g multiply the copied data symbols using the spreading codes to obtain data signals. The frequency/time converter 43 spreads the data signals and pilot signals over a plurality of sub-carriers having different frequencies. The guard interval inserting unit 44 inserts a guard interval in each of the data signals spread over the plurality of sub-carriers. Thus, the transmitters 4, 204, and 304 can simultaneously transmit a plurality of data signals in a plurality of data channels #1 to #n over a plurality of sub-carriers having different frequencies. The transmitters 4, 204, and 304 can reduce the influence of interference between a plurality of data signals attributable to delay in the data signals in arriving at a receiver as a result of multipath propagation. Therefore, the transmitters 4, 204, and 304 can provide improved signal transmission characteristics.

Further, the transmitters 4, 204, and 304 have the respective pilot symbol inserting units 41h, 241h, and 341h that insert pilot symbols in data symbols. The transmitters 4, 204, and 304 are thus capable of transmitting the pilot symbols to the receivers 5 and 205 along with the data symbols, the pilot symbols having amplitudes and phases known to the receivers 5 and 205. Therefore, the receiver can compare an actually received pilot symbol with a pilot symbol having a known amplitude and phase to be transmitted by the transmitter 4, 204, or 304 to find propagation path variation in the pilot symbol and any error between the received despread pilot symbol and the transmitted pilot symbol. The receiver can perform channel estimation using the propagation path variation in the pilot symbol. The receiver can also estimate an error between a reception signal and a transmission signal after despreading using errors of pilot symbols.

(Receiver)

Figure 8:
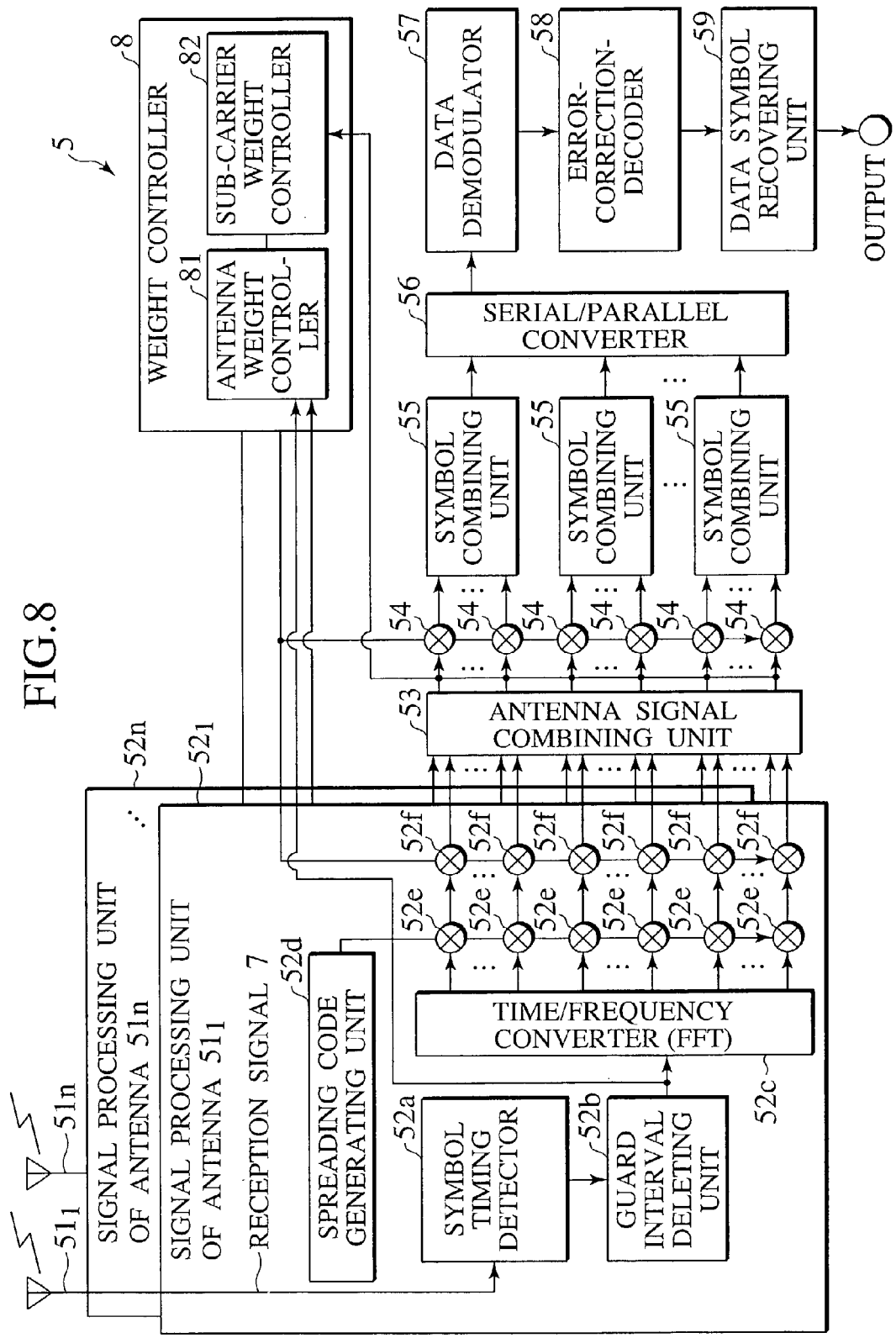
FIG. 8 is a block diagram illustrating the configuration of a receiver according to the first embodiment of the present invention.

As shown in FIG. 8, the receiver 5 comprises a plurality of antennas $51_1$ to 51n, a plurality of signal processing units $52_1$ to 52n, a weight controller 8, an antenna signal combining unit 53, a plurality of sub-carrier weight multipliers 54, a plurality of symbol combining units 55, a serial/parallel converter 56, a data demodulator 57, an error-correction-decoder 58, and a data symbol recovering unit 59.

The plurality of antennas $51_1$ to 51n receive a multi-carrier CDMA signals which are signals obtained by multiplying a plurality of data symbols transmitted by the transmitter 4 and transmitted over the plurality of data channels #1 to #n using spreading codes for each of the data channels and that are transmitted over a plurality of sub-carriers having different frequencies. Hereinafter, the signal received by the antennas $51_1$ to 51n is called a reception signal 7. The reception signal 7 includes not only data signals but also pilot signals and guard interval.

The signal processing units $52_1$ to 52n are provided in a quantity that is equal to the number of the plurality of antennas $51_1$ to 51n. The signal processing units $52_1$ to 52n associated with the respective antennas $51_1$ to 51n process the reception signal 7 that is a multi-carrier CDMA signal received by the antennas $51_1$ to 51n. The signal processing units $52_1$ to 52n comprise a symbol timing detector 52a, a guard interval deleting unit 52b, a time/frequency converter 52c, a spreading code generating unit 52d, a plurality of spreading code multipliers 52e, and a plurality of antenna weight multipliers 52f.

The symbol timing detector 52a detects symbol timing for each of the reception signals 7 received by the plurality of antennas $51_1$ to 51n. The guard interval deleting units 52b deletes guard intervals inserted between the reception signals 7.

The time/frequency converter 52c performs time/frequency conversion on the reception signals 7 to demultiplex the reception signals 7 spread over the plurality of sub-carriers having different frequencies into a reception signal 7 on each of the sub-carriers. For example, a fast Fourier transform (FFT) apparatus may be used as the time/frequency converter 52c to perform a fast Fourier transform process.

The spreading code generating unit 52d generates spreading codes that are identical to the spreading codes by which the reception signals 7 are multiplied. Specifically, the spreading code generating unit 52d generates spreading codes for the data channels #1 to #n over which the reception signals 7 have been transmitted. The spreading code generating unit 52d inputs the generated spreading codes to the spreading code multipliers 52e.

The spreading code multipliers 52e multiply the reception signals 7 received by the plurality of antennas $51_1$ to 51n using the spreading codes for the data channels corresponding to the reception signals 7. The spreading code multipliers 52c multiply the reception signals 7 on the respective sub-carriers demultiplexed by the time/frequency converter 52c using the spreading codes for the data channels #1 to #n over which the reception signals 7 have been transmitted in the direction of the frequency axis. By multiplying the reception signals 7 using the spreading codes thus described, the effect of the spreading codes being multiplied at the transmitter 4 is eliminated. As a result, the data signals and pilot signals included in the reception signals 7 become data symbols and pilot symbols. The spreading code multipliers 52e are provided in a quantity equal to the number of the sub-carriers. The respective spreading code multipliers 52e multiply the reception signals 7 on the respective sub-carriers. The spreading code multipliers 52e input the reception signals multiplied using the spreading codes to the antenna weight multipliers 52f.

The weight controller 8 adjusts weights by which the signal 7 received by each antenna is multiplied (hereinafter referred to as "antenna weight") and weights by which the reception signal 7 on each sub-carrier is multiplied (hereinafter referred to as "sub-carrier weight"). The antenna weights include a weight by which the reception signal 7 is multiplied at each antenna before it is demultiplexed into each sub-carrier and a weight by which the reception signal 7 is multiplied at each antenna after it is demultiplexed into each sub-carrier. The sub-carrier weights include a weight by which the reception signal 7 is multiplied at each sub-carrier before the signals are combined among the antennas and a weight by which the reception signal 7 is obtained after combining among the antennas is multiplied at each sub-carrier.

The inventors studied the application of antenna diversity combing in the multi-carrier CDMA transmission method and found that the following problem occurs when a receiver simply combines reception signals among the antennas after multiplying the reception signal over each sub-carrier of each of the antennas by a weight. When a reception signal on each of the sub-carriers at each of antennas is simply multiplied by a weight and combining is performed among the antennas as shown in FIG. 9, the power of the reception signal on each sub-carrier after the combining among the antennas can significantly change in the direction of the frequency from that before the combining among the antennas. This significantly destructs orthogonality between spreading codes by which data signals have been multiplied. When the reception signal on each sub-carrier after the combining among the antennas is multiplied by a spreading code and the signals are then despread by combining over the spreading code duration of the spreading codes, resultant data symbols after despreading are subjected to increased interference between the data channels, attributable to the destruction of the orthogonality between the spreading codes. That is, a simple application of antenna diversity combining in the multi-carrier CDMA transmission method can significantly degrade signal transmission characteristics.

It is therefore important that the weight controller 8 adjusts antenna weights and sub-carrier weights such that the spreading codes for the plurality of data channels #1 to #n are orthogonal to each other. Therefore, the weight controller 8 adjusts antenna weights and sub-carrier weights such that spreading codes for the plurality of data channels #1 to #n are kept orthogonal to each other. The weight controller 8 preferably adjusts antenna weights and sub-carrier weights such that spreading codes for the plurality of data channels #1 to #n are orthogonal to each other and a great signal to noise power ratio (SNR) is achieved as possible. As a result, since the SNR of the reception signals 7 can be great, the receiver 5 is less affected by noise, thus achieving a further improvement in the signal transmission characteristics.

The weight controller 8 adjusts the antenna weights and the sub-carrier weights to determine the antenna weights and the sub-carrier weights separately. The weight controller 8 comprises an antenna weight controller 81 and a sub-carrier weight controller 82. The antenna weight controller 81 determines the antenna weights and inputs the antenna weights to the antenna weight multipliers 52f. The sub-carrier weight controller 82 determines the sub-carrier weights and inputs the sub-carrier weights to the sub-carrier weight multipliers 54.

The antenna weight multipliers 52f and the sub-carrier weight multipliers 54 constitute a weight multiplier configured to multiply the reception signals 7 by the antenna weights and the sub-carrier weights adjusted by the weight controller 8. The antenna signal combining unit 53 and the symbol combining units 55 constitute a combining unit configured to combine the reception signals 7 multiplied by the antenna weights and the sub-carrier weights at the weight multiplier among the antennas and over the spreading code duration of the spreading codes.

The antenna weight multipliers 52f multiply the reception signal 7 received of each of the antennas $51_1$ to $51n$ by the antenna weights. The antenna weight multipliers 52f multiply the reception signals 7 received by the antennas $51_1$ to $51n$ that are processed by the signal processing units $52_1$ to $52n$ by antenna weights. The antenna weight multipliers 52f are provided in a quantity equal to the number of sub-carriers. The respective antenna weight multipliers 52f multiply the reception signals 7 on the respective sub-carriers input from the respective spreading code multipliers 52e by antenna weights. The antenna weight multipliers 52f of the respective signal processing units $52_1$ to $52n$ input the reception signals 7 each of which is multiplied by an antenna weight to the antenna signal combining unit 53.

The sub-carrier weight multipliers 54 multiply the reception signals 7 on each of the sub-carriers by the sub-carrier weights. The sub-carrier weight multipliers 54 are provided in a quantity equal to the number of sub-carriers. The respective sub-carrier weight multipliers 54 multiply the reception signals 7 on the respective sub-carriers input from the antenna signal combining unit 53 by sub-carrier weights. The respective sub-carrier weight multipliers 54 input the reception signals 7 on the respective sub-carriers multiplied by the sub-carrier weights to the symbol combining units 55.

The antenna signal combining unit 53 combines the reception signals 7 among the antennas $51_1$ to $51n$. The antenna signal combining unit 53 combines the reception signals 7 input from the antenna weight multipliers 52f of the signal processing units $52_1$ to $52n$ among the antennas. Thus, antenna diversity combining is performed by multiplying the reception signals 7 received by the respective antennas $51_1$ to $51n$ by antenna weights and combining the signals among the antennas. The symbol combining units 55 combine the reception signals 7 over the spreading code duration of the spreading codes. The plurality of symbol combining units 55 combine the reception signals 7 on each of the sub-carriers input from the sub-carrier weight multipliers 54 over the spreading code duration of the spreading codes for the data channels #1 to #n corresponding to the reception signals 7. Thus, multiplying the reception signals 7 on each of the sub-carriers multiplied using the spreading codes by the sub-carrier weights and combining the signals over the spreading code duration perform despreading. The symbol combining units 55 input the combined reception signals 7 to the serial/parallel converter 56.

In the receiver 5, the spreading code multipliers 52e multiply the reception signals 7 on the respective sub-carriers using the spreading codes, and the antenna weight multipliers 52f thereafter multiply the reception signals 7 received by the respective antennas $51_1$ to $51n$ by the antenna weights. The antenna signal combining unit 53 combines the reception signals 7 among the antennas $51_1$ to $51n$ to perform antenna diversity combining. Thereafter, the sub-carrier weight multipliers 54 multiply the reception signals 7 on the respective sub-carriers combined among the antennas $51_1$ to $51n$ by the sub-carrier weights. Finally, the symbol combining units 55 perform despreading by combining the reception signals 7 over the spreading code duration. As a result of the combining at the symbol combining units 55, the data symbols are recovered to the state of the same before the multiplication of spreading codes at the transmitter 4.

The serial/parallel converter 56 performs parallel/serial conversion on the data symbols that have been recovered by being combined at the symbol combining units 55 over the spreading code duration. The serial/parallel converter 56 is a connecting unit that connects a plurality of data symbols into a single data symbol. The serial/parallel converter 56 connects data symbols that are divided at constant intervals and arranged in parallel in the direction of the frequency axis to convert them into a single serial data symbol.

The data demodulator 57 performs a data demodulation process on the data symbol obtained as a result of parallel/serial conversion at the serial/parallel converter 56. The data demodulator 57 performs the data demodulating process in accordance with the modulation performed by the data modulators 41c of the transmitter 4, 204, or 304.

The error-correction-decoder 58 performs an error-correction-decoding process on data symbols obtained as a result of the data demodulation process at the data demodulator 57. The error-correction-decoder 58 performs the error-correction-decoding process in accordance with the error-correction-coding performed by the error-correction-encoder 41b of the transmitter 4, 204, or 304. Thus, the receiver 5 can obtain a coding gain, thus achieving improved communication quality.

The data symbol recovering unit 59 recovers the data symbols that have been subjected to the error-correction-decoding process at the error-correction-decoder 58 to a state in which they can be output to an output apparatus such as a display or speaker and outputs them to the output apparatus. Thus, data such as images and sounds are output.

Next, an antenna weight controller 81 and a sub-carrier weight controller 82 will be described in detail. Antenna weight controllers 811 to 813 shown in FIGS. 10A, 10B, and 10C may be used as the antenna weight controller 81, for example.

Figure 10C:
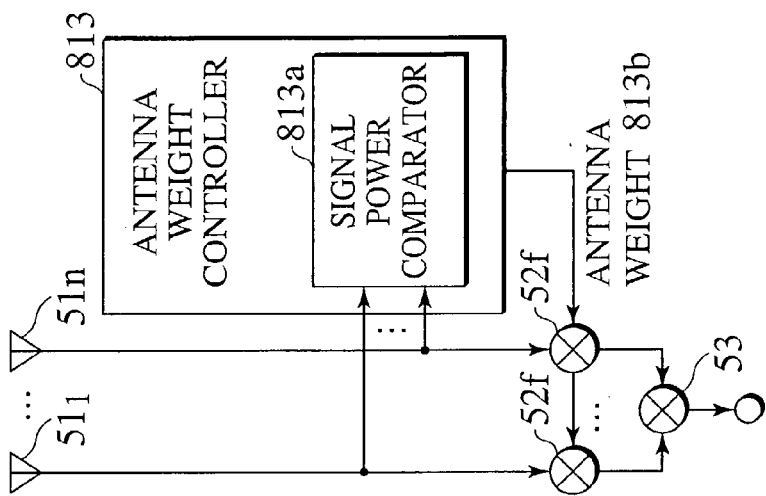
FIGS. 10A, 10B, and 10C are block diagrams illustrating the configuration of an antenna weight controller according to the first embodiment of the present invention.
Figure 10B:
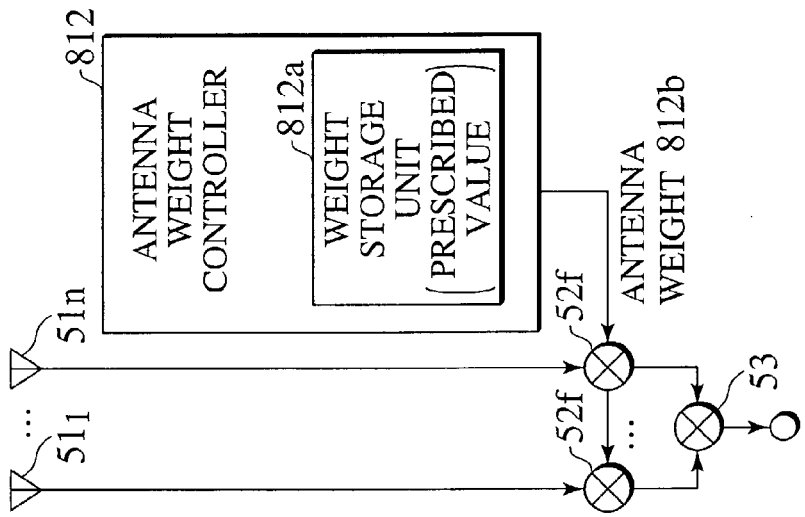
Figure 10A:
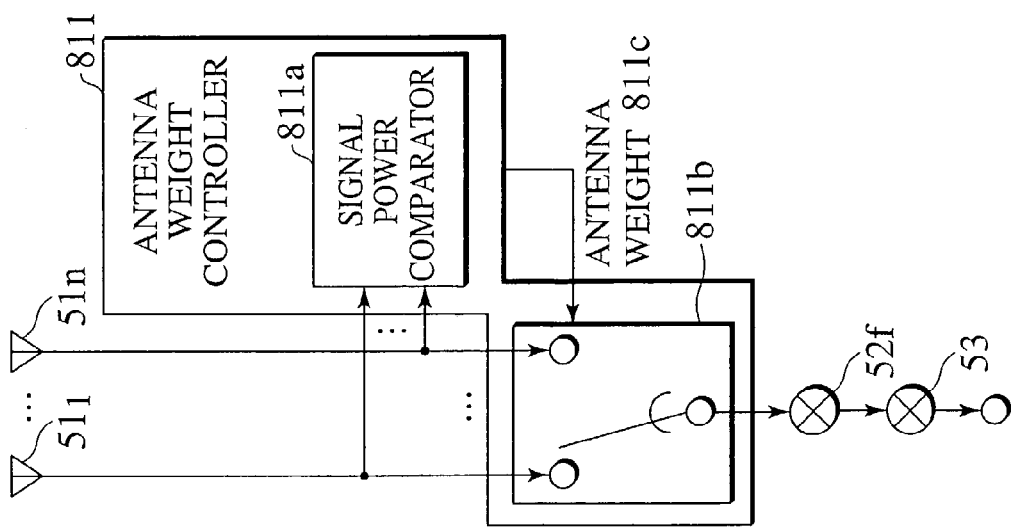

As shown in FIG. 10A, the antenna weight controller 811 comprises a signal power comparator 811a and a selector 811b. The signal power comparator 811a detects and compares the power of reception signals 7 received by the plurality of antennas $51_1$ to $51n$. As the power of the reception signals 7, the signal power comparator 811a detects and compares the power of the reception signals 7 themselves and the power of signals that are obtained by eliminating the effect of noises etc. from the reception signals 7.

The signal power comparator 811a determines an antenna weight 811c such that reception signals 7 from the antennas having the reception signal 7 with the maximum power are weighted by "1" and such that reception signals 7 from the other antennas are weighted by "0". The selector 811b selects reception signals 7 from the antennas weighted by "1" according to the antenna weight 811c. Therefore, the selector 811b selects only reception signals 7 from the antennas having the reception signal 7 having the maximum power.

The antenna weight controller 811 inputs the determined antenna weight 811c to the antenna weight multipliers 52f. As a result, only the reception signals 7 from the selected antennas are input to the antenna signal combining unit 53, and a reception signal obtained by combining among the antennas $51_1$ to $51n$ at the antenna signal combining unit 53 is output. Hereinafter, such a method of determining an antenna weight 811c and combining weights among the antennas $51_1$ to $51n$ is referred to as "selective combining method". Such the antenna weight controller 811 is advantageous in that it allows a simple configuration.

As shown in FIG. 10B, the antenna weight controller 812 has a weight storage unit 812a. The weight storage unit 812a stores a weight of a prescribed value. The antenna weight controller 812 determines the weight of a constant value stored in the weight storage unit 812a as an antenna weight 812b by which the antennas $51_1$ to 51n are to be multiplied. Therefore, the reception signals 7 from all of the antennas $51_1$ to 51n are multiplied by equal antenna weights.

The antenna weight controller 812 inputs the determined antenna weight 812b having a prescribed value to the antenna weight multipliers 52f. Reception signals 7 which have been multiplied by the antenna weight 812b having a prescribed weight at the antenna weight multipliers 52f are input to the antenna signal combining unit 53, and a reception signal 7 obtained through combining among the antennas $51_1$ to 51n at the antenna signal combining unit 53 is then output. Hereinafter, such a method of determining an antenna weight 812b and combining weights among the antennas $51_1$ to 51n is referred to as "equal gain combining (EGC) method". Such the antenna weight controller 812 has the following advantage. Some reception signals 7 that do not have the maximum power may have a high signal power to noise power ratio. Therefore, a higher signal power to noise power ratio can be achieved by combining the reception signals 7 at all of the antennas $51_1$ to 51n while multiplying the signals by equal antenna weights 812b.

As shown in FIG. 10C, the antenna weight controller 813 comprises a signal power detector 813a. The signal power detector 813a detects the power of reception signals 7 received by the plurality of antennas $51_1$ to 51n. As the power of the reception signals 7, the signal power detector 813a detects the power of the reception signals 7 themselves and the power of signals that are obtained by eliminating the effect of noises etc. from the reception signals 7. The antenna weight controller 813 determines weights proportionate to the power of the antennas $51_1$ to 51n detected by the signal power detector 813a as antenna weights 813b by which the respective antennas $51_1$ to 51n are to be multiplied.

The antenna weight controller 813 inputs the antenna weights 813b proportionate to the power of the reception signals 7 at the antennas $51_1$ to 51n to the antenna weight multipliers 52f of the respective antennas $51_1$ to 51n. The reception signals 7 are input to the antenna signal combining unit 53 after being multiplied by the antenna weights 813b proportionate to the power of the reception signals 7 at the antenna weight multipliers 52f, and a reception signal 7 obtained through combining among the antennas $51_1$ to 51n at the antenna signal combining unit 53 is then output. Hereinafter, such a method of determining antenna weights and combining reception signals 7 among the antennas $51_1$ to 51n is referred to as "maximum ratio combining (MRC) method".

Such the antenna weight controller 813 has the following advantage. It makes it possible to reduce the influence of a reception signal 7 having power close to noise power among the reception signals 7, by obtaining a reception signal 7 through combining among the antennas $51_1$ to 51n, and to increase the influence of a reception signal 7 having high power, by obtaining a reception signal 7 through combining among the antennas $51_1$ to 51n. Thus, a greater signal power to noise power ratio can be achieved.

The antenna weight controller 81 may detect data about reception signals 7 such as the power of reception signals 7, to determine antenna weights as seen in the case where the antenna weight controller 811 employing the selective combining method or the antenna weight controller 813 employing MRC is used as the antenna weight controller 81. Such data on reception signals 7 required for determining antenna weights is hereinafter referred to as "antenna weight data". Antenna weight data includes the power of reception signals 7 themselves, the power of the reception signals 7 after eliminating the effect of noises etc. and after eliminating guard intervals, and the SNR, SIR, and carrier to interference power ratio (CIR) of the signals.

As shown in FIG. 8, the antenna weight controller 81 of the receiver 5 acquires antenna weight data from reception signals 7 from which guard intervals have been deleted by the guard interval deleting unit 52b and which have not been subjected to the time/frequency converting process by the time/frequency converters 52c. Thus, the antenna weight controller 81 is only required to acquire antenna weight data from a single reception signal 7 that has not yet been demultiplexed by time/frequency converter 52c into reception signals 7 on respective sub-carriers of each of the antennas $51_1$ to 51n. Therefore, the process at the antenna weight controller 81 can be simplified. The antenna weight controller 81 may acquire antenna weight data from a reception signal 7 which has not been demultiplexed by the time/frequency converter 52c into reception signals 7 on respective sub-carriers and which has not been multiplied using spreading codes yet at the spreading code multiplier 52f.

Figure 11:
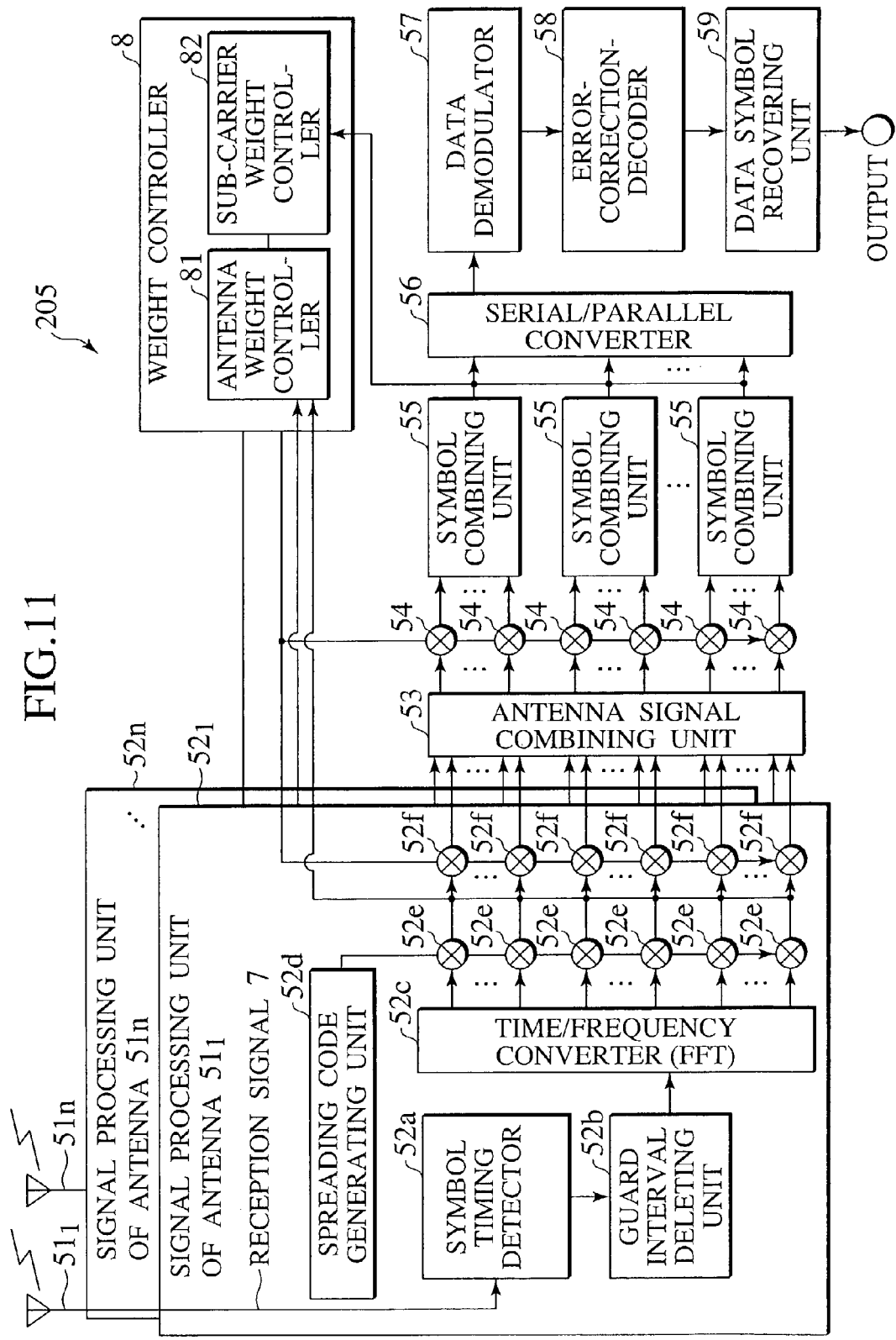
FIG. 11 is a block diagram illustrating the configuration of another receiver according to the first embodiment of the present invention.

In a receiver 205 shown in FIG. 11, an antenna weight controller 81 may acquire antenna weight data from reception signals 7 which have been multiplied using spreading codes at spreading code multipliers 52e and which have not been multiplied by antenna weights at antenna weight multipliers 52f. The receiver 205 is substantially the same as the receiver 5 shown in FIG. 8 except that the weight controller 81 acquires data on reception signals 7 in a different position. Therefore, symbols like those in the receiver 5 are shown in FIG. 11 to avoid repeated description.

In the receiver 205, the antenna weight controller 81 may acquire antenna weight data from reception signals 7 which have been multiplied using spreading codes to eliminate the influence of multiplication of spreading codes at the transmitter 4. When the antenna weight controller 81 is to determine antenna weights based on antenna weight data that is free from the influence of the multiplication of spreading codes at the transmitter 4, if antenna weight data is acquired from reception signals 7 which have not been multiplied using spreading codes yet, a process will be required to obtain antenna weight data after the signals are multiplied using spreading codes based on the antenna weight data. Such a process is not required in the receiver 205, and the process performed by the antenna weight controller 81 can be simplified.

A method of determining sub-carrier weights at the sub-carrier weight controller 82 will now be described with reference to FIGS. 12A to 12D. The sub-carrier weight controller 82 determines sub-carrier weights using methods such as orthogonal restore combining (ORC), maximum ratio combining (MRC), equal gain combining (EGC), and minimum means square error combining (MMSEC).

ORC is a method in which the inverse number of a propagation path variation value 9 of a reception signal 7 on each sub-carrier is determined as a sub-carrier weight 821c by which the reception signal 7 on the sub-carrier is to be multiplied, as shown in FIG. 12A. A propagation path variation value is the value of the power of a reception signal 7 that is a transmission signal 6 transmitted by the transmitter 4 whose phase and amplitude have changed as a result of propagation of the same in the propagation path between the transmitter 4 and the receiver 5. ORC is advantageous in that the reception signals 7 have a constant propagation path variation value 9 after they are multiplied by sub-carrier weights and in that spreading codes for the plurality of data channels #1 to #n are orthogonal to each other.

MRC is a method in which a propagation path variation value 9 of a reception signal 7 on each sub-carrier is determined as a sub-carrier weight 822b by which the reception signal 7 on the sub-carrier is to be multiplied, as shown in FIG. 12B. When MRC is employed, a sub-carrier having a small SNR is multiplied by a small sub-carrier weight, and a sub-carrier having a great SNR is multiplied by a great sub-carrier weight. This is advantageous in that the SNR of data symbols obtained by combining the reception signal 7 on each sub-carrier can be maximized.

EGC is a method in which a sub-carrier weight 823b having a prescribed value is used for reception signals on all sub-carriers regardless of propagation path variation value 9, as shown in FIG. 12C. When EGC is employed, reception signals 7 on all sub-carriers are multiplied by equal sub-carrier weights. This is advantageous in that the signal power to noise power ratio of data symbols obtained by combining the reception signal 7 on each sub-carrier can be improved and the spreading codes for the plurality of data channels #1 to #n can be kept orthogonal to each other.

MMSEC is a method in which sub-carrier weights 824d are determined to minimize a mean square error between a reception signal 7 obtained by multiplying reception signals 7 using spreading codes and combining them over the spreading code duration to despread the same and a transmission signal 6 which has been actually transmitted by the transmitter 4, as shown in FIG. 12D. When MMSEC is employed, the sub-carrier weights 824d can be calculated in accordance with the condition of propagation paths that change at every moment. This is advantageous in that the condition of propagation paths can be taken into consideration; the SNR of data symbols obtained by combining a reception signal on each sub-carrier can be improved; and spreading codes for the plurality of data channels #1 to #n can be kept orthogonal to each other.

Specific sub-carrier weight controllers 82 that execute such methods of determining sub-carrier weights include sub-carrier weight controllers 821 to 828 as shown in FIGS. 13A to 13G, for example.

Figure 13A:
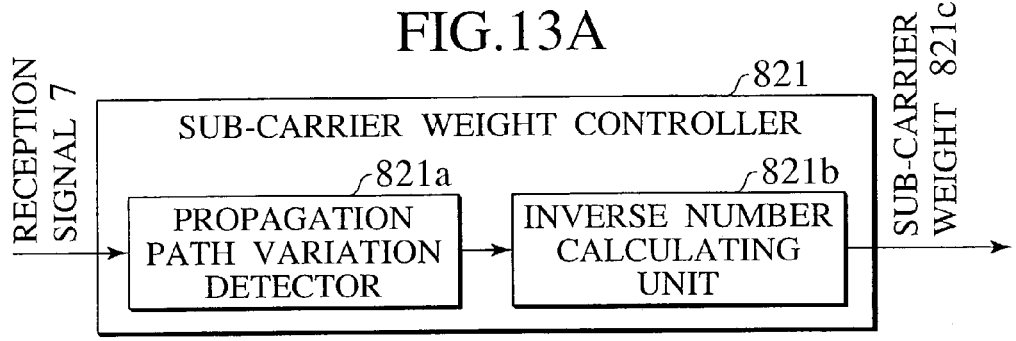

As shown in FIG. 13A, the sub-carrier weight controller 821 comprises a propagation path variation detector 821a and an inverse number calculating unit 821b. The propagation path variation detector 821a detects propagation path variation value 9 from a reception signal 7. The inverse number calculating unit 821b calculates the inverse numbers of the propagation path variation value 9 detected by the propagation path variation detector 821a and determines the calculated inverse numbers of the propagation path variation value 9 as sub-carrier weights 821c. Such a sub-carrier weight controller 821 can determine the sub-carrier weights 821c using ORC.

Figure 13B:
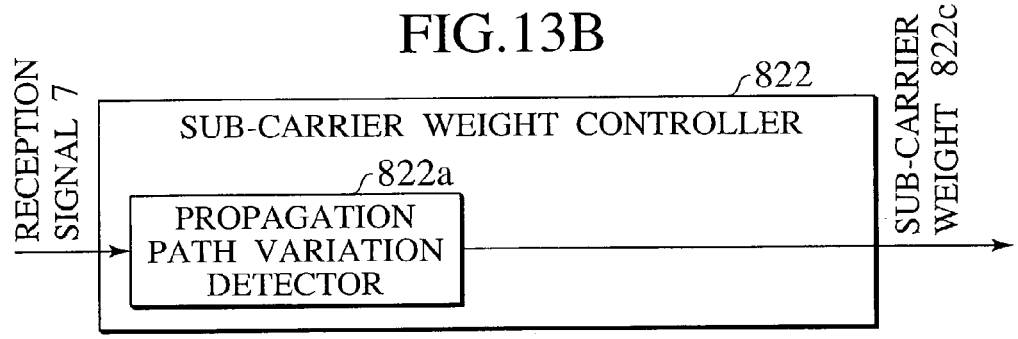

As shown in FIG. 13B, the sub-carrier weight controller 822 comprises a propagation path variation detector 822a. The propagation path variation detector 822a detects propagation path variation value 9 from a reception signal 7 and determines the detected propagation path variation value 9 as sub-carrier weights 822b as they are. Such a sub-carrier weight controller 822 can determine the sub-carrier weights 822b using MRC.

Figure 13C:
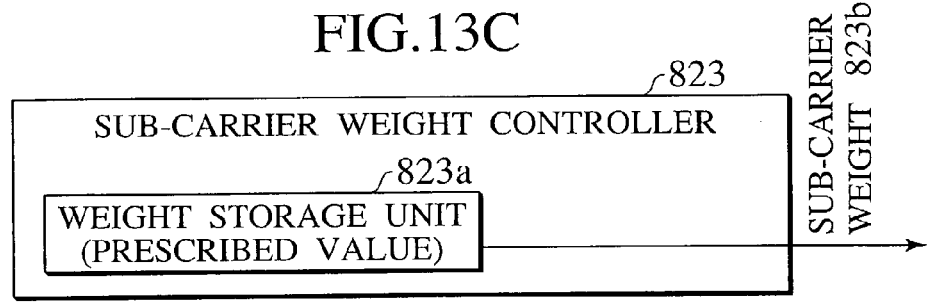

As shown in FIG. 13C, the sub-carrier weight controller 823 comprises a weight storage unit 823a. The weight storage unit 823a stores a weight having a prescribed value. The sub-carrier weight controller 823 acquires the weight having a prescribed value from the weight storage unit 823a and determines the weight having a prescribed value as a sub-carrier weight 823b that is equally used for reception signals 7 on all sub-carriers. Such a sub-carrier weight controller 823 can determine the sub-carrier weight 823b using EGC.

A sub-carrier weight controller 824 shown in FIG. 12D comprises an error estimator 824a, a reference symbol storage unit 824b, and a weight calculating unit 824c. The reference symbol storage unit 824b stores a reference symbol. The reference symbol is a symbol whose amplitude and phase are known to the transmitter 4 and the receiver 5. The reference symbol used here is identical to the pilot symbols that the transmitter 4 is to transmit. The error estimator 824a acquires pilot symbols 72 after despreading that are included in a reception signal 7 that have been transmitted by the transmitter 4 and actually received by the receiver 5. The error estimator 824a acquires the reference symbol from the reference symbol storage unit 824b. The error estimator 824a then compares the phases and amplitudes of the pilot symbols 72 and the reference symbol to obtain errors between pilot symbols that have been transmitted by the transmitter 4 and the pilot symbols 72 after despreading that have been actually received and.

The error estimator 824a assumes that errors between the pilot symbols 72 after despreading thus obtained and the pilot symbols transmitted by the transmitter 4 are errors between the reception signal 7 after despreading and the transmission signal 6. The error estimator 824a inputs estimated error values between the reception signal 7 after despreading and the transmission signal 6 to the weight calculating unit 824c. The weight calculating unit 824c calculates mean square errors from the estimated error values between the reception signal 7 after despreading and the transmission signal 6 and calculates sub-carrier weight 824d that yields the minimum mean square error. When a reception signal 7 is first received, the weight calculating unit 824c sets the sub-carrier weights at preset initial values because there is no pilot symbol 72 after despreading required for estimating error.

Such a sub-carrier weight controller 824 makes it possible to determine sub-carrier weights 824d using MMSEC. The use of received pilot symbols 72 and a reference symbol makes it possible to determine optimum sub-carrier weights 824d by obtaining errors between a reception signal 7 after despreading and a transmission signal 6 taking the condition of the actual propagation paths into consideration.

Figure 13D:
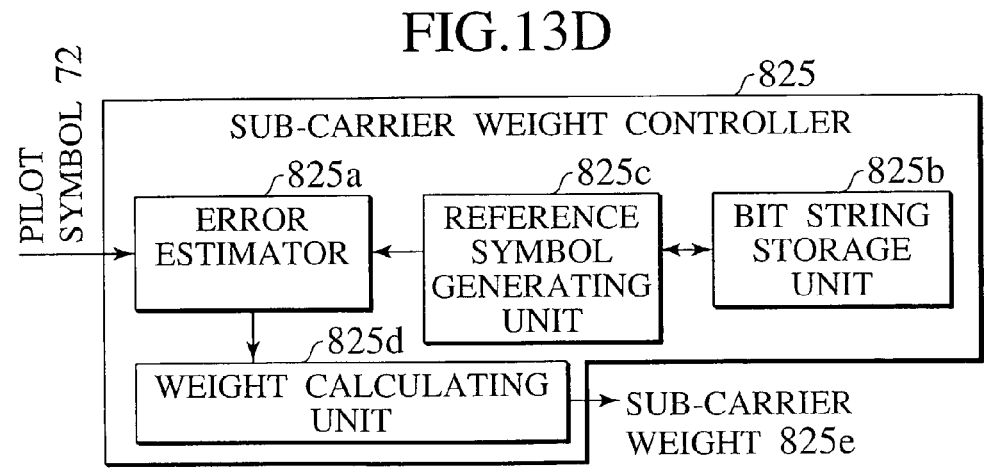

A sub-carrier weight controller 825 shown in FIG. 13D comprises an error estimator 825a, a bit string storage unit 825b, a reference symbol generating unit 825c, and a weight calculating unit 825d. The bit string storage unit 825b stores a bit string that is a basis of a reference symbol whose amplitude and phase are known to the transmitter 4 and the receiver 5. The bit string storage unit 825b stores bit strings that are bases of pilot symbols that the transmitter 4 is to transmit. The reference symbol generating unit 825c acquires the bit string from the bit string storage unit 825b and modulates the bit string to generate a reference symbol. That is, the reference symbol generating unit 825c modulates the bit string to generate a reference symbol identical to the pilot symbols to be transmitted by the transmitter 4.

The error estimator 825a is substantially similar to the error estimator 824a shown in FIG. 12D except that it acquires the reference symbol from the reference symbol generating unit 825c. The weight calculating unit 825d is substantially similar to the weight calculating unit 824c shown in FIG. 12D. Such a sub-carrier weight controller 825 makes it possible to determine sub-carrier weights 825e using MMSEC. The use of received pilot symbols 72 and a reference symbol thus generated makes it possible to determine optimum sub-carrier weights 825e by obtaining errors between a reception signal 7 after despreading and a transmission signal 6 taking the condition of the actual propagation paths into consideration.

A sub-carrier weight controller 826 shown in FIG. 13E comprises a channel estimator 826a, a noise power estimator 826b, a number of multiplexed codes estimator 826c, and a weight calculating unit 826d. The channel estimator 826a, noise power estimator 826b, and the number of multiplexed codes estimator 826c store a symbol that is identical to pilot symbols to be transmitted by the transmitter 4 as a reference symbol. The channel estimator 826a, noise power estimator 826b, and the number of multiplexed codes estimator 826c may store a signal that is identical to pilot signals to be transmitted by the transmitter 4 as a reference signal.

The channel estimator 826a acquires pilot symbols 72 included in a reception signal 7 which has been transmitted by the transmitter 4 and which has actually been received by the receiver 5. The channel estimator 826a compares the phases and amplitudes of the acquired pilot symbols 72 and the reference symbol to obtain propagation path variations of the pilot symbols 72. The channel estimator 826a performs channel estimation using the propagation path variations of the pilot symbols 72 to obtain channel estimates. The channel estimator 826a may obtain a channel estimated value by comparing pilot signals included in the reception signal 7 and a reference signal.

The noise power estimator 826b acquires the pilot symbols 72 included in the reception signal 7 which has been transmitted by the transmitter 4 and which has been actually received by the receiver 5. The noise power estimator 826b compares the acquired pilot symbols 72 and the reference symbol to obtain variance of the pilot symbols 72. The noise power estimator 826b estimates the noise power per sub-carrier of the reception signal 7 using the obtained variance. The noise power estimator 826b may compare the pilot signals included in the reception signal 7 and the reference signal to obtain variance of the pilot signals.

The number of multiplexed codes estimator 826c acquires the pilot symbols 72 and data symbols 71 included in the reception signal 7 which has been transmitted by the transmitter 4 and which has been actually received by the receiver 5. The number of multiplexed codes estimator 826c calculates the ratio between the power of the pilot symbols 72 and the power of the data symbols 71. The number of multiplexed codes estimator 826c estimates the number of multiplexed codes from the calculated ratio between the power of the pilot symbols 72 and the power of the data symbols 71. The spreading codes are generated in a quantity corresponding to the number of data channels #1 to #n. Therefore, the number of multiplexed codes corresponds to the number of data channels #1 to #n that are code-division-multiplexed. Therefore, the number of multiplexed codes estimator 826c may estimate the number of multiplexed codes based on the pilot signals and data signals included in the reception signal 7.

The channel estimator 826a, noise power estimator 826b, and the number of multiplexed codes estimator 826c respectively input a channel estimated value, an estimated value of noise power, and an estimated value of the number of multiplexed codes to the weight calculating unit 826d. The weight calculating unit 826d substitutes the channel estimated value, the estimated value of noise power, and the estimated value of the number of multiplexed codes of the reception signal 7 in Equation 1 shown below to calculate sub-carrier weights 826e.

Equation 1 is an equation for calculating sub-carrier weights 826e that yield a minimum mean square error between a reception signal 7 obtained by multiplying reception signals 7 using spreading codes to despread the same and a transmission signal 6 actually transmitted by the transmitter 4. In Equation 1, $w_m$ represents sub-carrier weight; $h_m$ represents channel estimated value; N represents noise power; and $C_{mux}$ represents the number of multiplexed codes. m represents the number of sub-carriers. For example, a method of calculating a sub-carrier weight is described in Design and Performance of Multicarrier CDMA System in Frequency-Selective Rayleigh Fading Channels (S. Hara et al., IEEE TRANSACTIONS ON VEHICULAR TECHNOLOGY, pp 1584–1595, VOL. 48, N. 5, September 1999).

$$w_m = h_m/(C_{mux}|h_m|^2 + N) \qquad \text{Equation 1}$$

Such a sub-carrier weight controller 824 can obtain sub-carrier weight 826e using MMSEC. Since actually received pilot symbols 72 and data symbols 71 and a reference symbol are used, the sub-carrier weight controller 824 can obtain channel estimated value, noise power, and the number of multiplexed codes taking the actual condition of the propagation paths into consideration, which makes it possible to obtain optimum sub-carrier weight 826e.

A sub-carrier weight controller 827 shown in FIG. 13F comprises an error estimator 827a, a reference symbol storage unit 827b, and a weight updating unit 827c. The error estimator 827a and the reference symbol storage unit 827b are substantially similar to the error estimator 824a and the reference symbol storage unit 824b shown in FIG. 12D.

The weight updating unit 827c substitutes estimated errors between a reception signal 7 after despreading and a transmission signal 6 in an adaptive algorithm. The weight updating unit 827c executes the adaptive algorithm to obtain sub-carrier weight 827d that are gradually updated. The adaptive algorithm is an algorithm for gradually updating the sub-carrier weight 827d based on the estimated errors between the reception signal 7 after despreading and the transmission signal 6 such that the mean square errors of the errors is minimized. For example, least mean square (LMS) or recursive least squares (RLS) algorithm may be used as the adaptive algorithm. For example, adaptive algorithm is described in orthogonal multi-carrier techniques applied to direct sequence CDMA systems (A. Chouly et al., 1993 IEEE Global Telecommunications Conference).

When a reception signal 7 is first received, the weight updating unit 827c sets the sub-carrier weights 827d at preset initial values because there is no despread pilot symbol required for estimating an error. Such a sub-carrier weight controller 824 makes it possible to determine sub-carrier weights 827d using MMSEC. The use of received pilot symbols 72 and a reference symbol allows the weight updating unit 827c to determine optimum sub-carrier weights 827d by obtaining errors between a reception signal 7 after despreading and a transmission signal 6 taking the condition of the actual propagation paths into consideration. Further, the weight updating unit 827c can gradually update the sub-carrier weights 827d to minimize mean square errors between the reception signal 7 after despreading and the transmission signal 6 using the adaptive algorithm.

A sub-carrier weight controller 828 shown in FIG. 13G comprises an error estimator 828a, a bit string storage unit 828b, a reference symbol generating unit 828c, and a weight updating unit 828d. The error estimator 828a, bit string storage unit 828b, and reference symbol generating unit 828c are substantially similar to the error estimator 825a, bit string storage unit 825b, and reference symbol generating unit 825c shown in FIG. 13D. The weight updating unit 828d is substantially similar to the weight updating unit 827c shown in FIG. 13F.

Such a sub-carrier weight controller 828 makes it possible to determine sub-carrier weight 828e using MMSEC. The use of pilot symbols 72 received by the receiver 5 and a generated reference symbol allows the sub-carrier weight controller 828 to determine optimum sub-carrier weights 828e by obtaining errors between a reception signal 7 after despreading and a transmission signal 6 taking the condition of the actual propagation paths into consideration. Further, the sub-carrier weight controller 828 can gradually update the sub-carrier weight 828e such that a mean square error between the reception signal 7 after despreading and the transmission signal 6 is minimized using the adaptive algorithm.

In estimating errors between a reception signal 7 after despreading and a transmission signal 6, the error estimators 824a, 825a, 827a, and 828a shown in FIGS. 12D, 13D, 13F, and 13G may obtain errors between pilot symbols 72 and data symbols 71 after despreading, i.e., errors between the reception signal 7 after despreading itself and a reference signal and may assume the errors to be errors between the reception signal 7 after despreading and the transmission signal 6. As a result, the weight calculating units 824c and 825d and the weight updating units 827c and 828d can use estimated errors between an actually received reception signal 7 after despreading and a transmission signal 6 to obtain more appropriate sub-carrier weights 824d, 825e, 827d, and 828e. In this case, a determination feedback part is provided to allow the error estimators 824a, 825a, 827a, and 828a to acquire a reference signal. The determination feedback part acquires a reception signal 7 combined over the spreading code duration of the spreading codes at the symbol combining unit 55. The determination feedback part determines the properties of the transmission signal 6 based on the reception signal 7 and inputs the same to the error estimators 824a, 825a, 827a, and 828a. The error estimators 824a, 825a, 827a, and 828a use the transmission signal 6 as determined by the determination feedback part as a reference signal.

The sub-carrier weight controller 82 may obtain sub-carrier weights by detecting data about a reception signal 7 such as the propagation path variation value 9 of the reception signal 7, the phases and amplitudes of the pilot symbols 72 or pilot signals, and the power of the data symbols 71 or data signals as seen in the case wherein the sub-carrier weight controller 821 using ORC, the sub-carrier weight controller 822 using MRC, or any of the sub-carrier weight controllers 824 to 828 using the MMSEC are used as the sub-carrier weight controller 82. Such data about a reception signal 7 required for determining sub-carrier weight is hereinafter referred to as "sub-carrier weight data". The sub-carrier weight data includes the propagation path variation value 9 of the reception signal 7, the phases and amplitudes of the pilot symbols 72 or pilot signals, and the power of the data symbols 71 or data signals itself, and data including the propagation path variation value 9 of the reception signal 7, the phases and amplitudes of the pilot symbols 72 or pilot signals, and the power of the data symbols 71 or data signals after the influence of noises and guard intervals are deleted from the reception signal 7.

As shown in FIG. 8, the sub-carrier weight controller 82 of the receiver 5 acquires sub-carrier weight data from a reception signal 7 which has been obtained by combining reception signals 7 multiplied by antenna weights at the antenna signal combining unit 53 among the antennas and which has not yet been multiplied by sub-carrier weights at the sub-carrier weight multiplier 54. Thus, the sub-carrier weight controller 82 may acquire sub-carrier weight data from the reception signal 7 obtained through combining performed between the plurality of antennas at the antenna signal combining unit 53. Therefore, the sub-carrier weight controller 82 is not required to acquire the sub-carrier weight data from the signal processing units $52_1$ to $52n$ of the plurality of antennas $51_1$ to $51n$, thus allowing simplified processing.

Further, the sub-carrier weight controller 82 may acquire sub-carrier weight data from a reception signal 7 which has been multiplied by antenna weight and which has been obtained through combining performed between the plurality of antennas. Thus, the sub-carrier weight controller 82 can obtain sub-carrier weight in consideration to the influence of the multiplication of the antenna weight on the reception signal 7 and the influence of the combining among the antennas on the reception signal 7. In addition, since the sub-carrier weight controller 82 acquires the sub-carrier weight data from the reception signal 7 which has been multiplied using spreading codes in this case, it can obtain more appropriate sub-carrier weights using data on the reception signal 7 which is free from the influence of the spreading codes multiplied at the transmitter 4.

The sub-carrier weight controller 82 may acquire sub-carrier weight data from reception signals 7 which have been multiplied by antenna weights at the antenna weight multipliers 52f and which have not been combined among the antennas into a reception signal at the antenna signal combining unit 53 yet. Thus, the sub-carrier weight controller 82 can acquire sub-carrier weight data from a reception signal 7 that has been multiplied by antenna weight and can therefore obtain sub-carrier weights in consideration of the influence of the multiplication of the antenna weights on the reception signal 7. In this case, the sub-carrier weight controller 82 may estimate sub-carrier weight data after combining among the antennas based on the sub-carrier weight data acquired from the reception signals 7 which have been multiplied by antenna weights at the antenna weight multipliers 52f and which have not yet been combined among the antennas into a reception signal at the antenna signal combining unit 53. The sub-carrier weight controller 82 may obtain sub-carrier weights from the estimated data.

Further, in those cases, since the sub-carrier weight controller 82 acquires the sub-carrier weight data from the reception signal 7 that has been multiplied using spreading codes, more appropriate sub-carrier weights can be obtained using data on the reception signal 7 that is free from the influence of the spreading codes multiplied at the transmitter 4.

The sub-carrier weight controller 82 may acquire sub-carrier weight data from reception signals 7 located between the time/frequency converter 52c and the spreading code multipliers 52e or reception signals 7 located between the spreading code multipliers 52e and the antenna weight multipliers 52f.

When any of the sub-carrier weight controllers 824, 825, 827, and 828 shown in FIGS. 12D, 13D, 13F, and 13G are used as the sub-carrier weight controller 82, sub-carrier weight must be obtained using pilot symbols 72 after despreading or a reception signal 7 after despreading. Therefore, in those cases, the sub-carrier weight controller 82 preferably acquires sub-carrier weight data from a reception signal 7 that has been despread by the symbol combining units 55. In this case, since the sub-carrier weight controller 82 can use the acquired sub-carrier weight data as it is, the process can be simplified.

When the sub-carrier weight controller 826 shown in FIG. 13E is used as the sub-carrier weight controller 82, sub-carrier weight data is preferably acquired from a reception signal 7 that is demultiplexed into each sub-carrier as shown in FIG. 9. The sub-carrier weight controller 82 preferably determines a sub-carrier weight based on the reception signal 7 on each sub-carrier. Thus, the channel estimator 826a, noise power estimator 826b, and the number of multiplexed codes estimator 826c can obtain a channel estimated value, an estimated value of noise power, and an estimated value of the number of multiplexed codes for each sub-carrier, respectively.

When the antenna weight controller 81 and the sub-carrier weight controller 82 acquire antenna weight data and sub-carrier weight data, respectively, in different positions as described above, the antenna weight controller 81 and the sub-carrier weight controller 82 can acquire the data in the optimum positions for determining antenna weights and sub-carrier weights respectively, which makes it possible to perform control with high accuracy.

The weight controller 8 may acquire common data on a reception signal 7 from one location as antenna weight data and sub-carrier data to allow the antenna weight controller 81 and the sub-carrier weight controller 82 to use common data. In this case, the weight controller 8 can acquire the antenna weight data and sub-carrier weight data at a time. Thus, the process at the weight controller 8 can be simplified. The configuration of the receiver 5 is also simplified.

In the receivers 5 and 205 shown in FIGS. 9 and 11, the antenna weight multipliers 52f multiply the reception signal 7 of each of the antennas 51₁ to 51n by the antenna weights; the antenna signal combining unit 53 performs antenna diversity combining to combine the reception signals 7 multiplied by antenna weights among the antennas; the sub-carrier weight multipliers 54 thereafter multiply the reception signals 7 which have been multiplied using spreading codes on each of the sub-carriers by the sub-carrier weights; and the symbol combining units 55 perform despreading to combine the reception signals 7 multiplied by the sub-carrier weights over the spreading code duration of the spreading codes. In this case, the sub-carrier weight controller 82 determines whether to maintain a state of the reception signals 7 multiplied by the antenna weights or to adjust the state of the reception signals multiplied by the antenna weight again, based on the antenna weight by which the reception signals 7 are first multiplied. The sub-carrier weight controller 82 preferably adjusts the sub-carrier weights based on a result of determination. In this case, the antenna weight controller 81 preferably determines the antenna weight by using the EGC method, and the sub-carrier weight controller 82 preferably determines the sub-carrier weight by using either the MMSEC method or the EGC method.

(Method of Communication)

Figure 14:
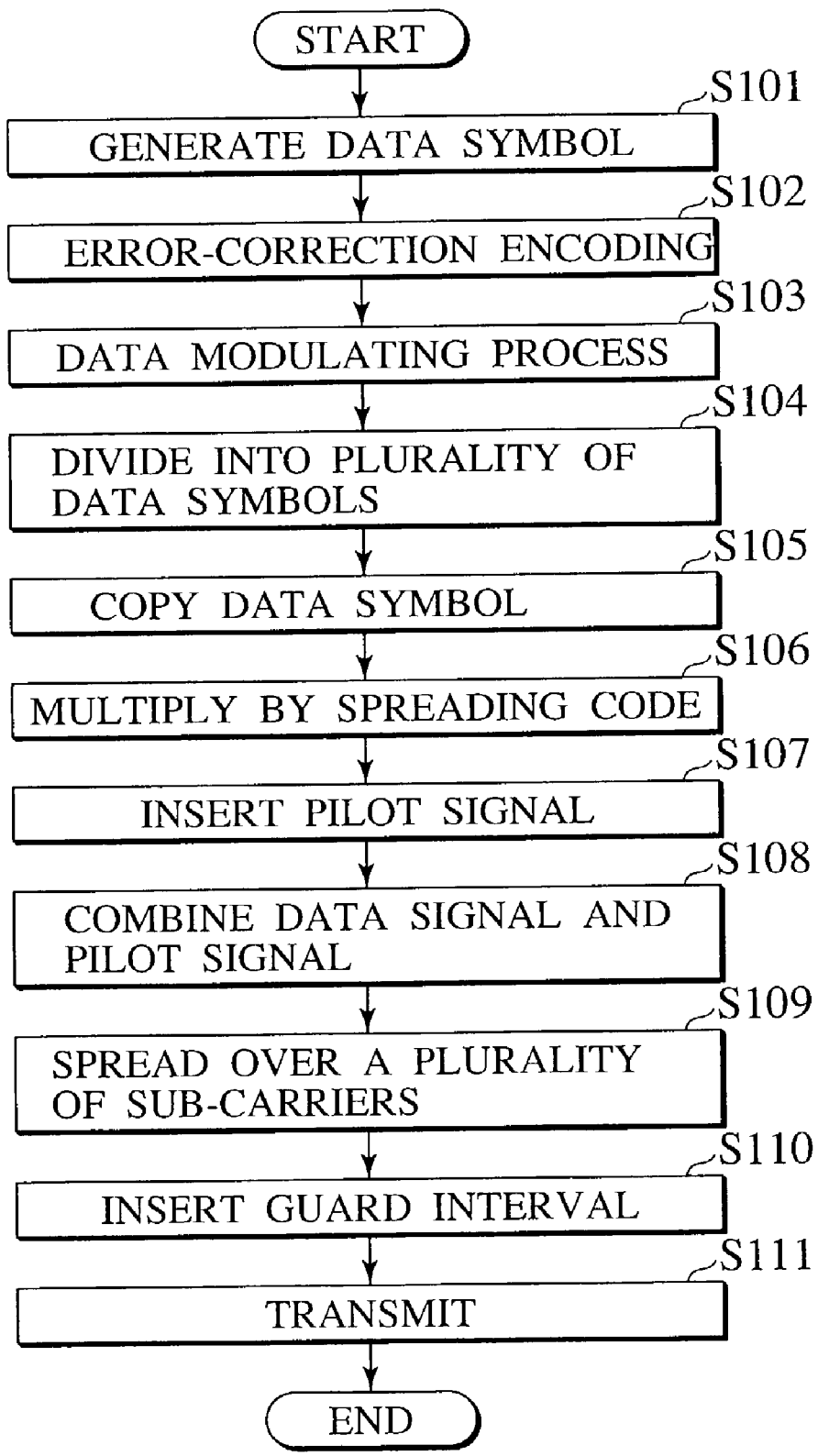
FIG. 14 is a flow chart showing a procedure of transmitting a transmission signal according to the first embodiment of the present invention.

A method of communication will now be described. First, a description will be made for the transmission of a transmission signal using the transmitter 4 shown in FIG. 3. As shown in FIG. 14, the transmitter 4 generates a data symbol to be transmitted over each of the data channels #1 to #n (S101). The transmitter 4 performs error-correction-encoding on the generated data symbol (S102). The transmitter 4 performs a data modulating process on the data symbol that has been subjected to error-correction-encoding (S103). The transmitter 4 performs serial/parallel conversion on the data symbol that have been subjected to the data modulating process to divide the data symbol into a plurality of data symbols (S104).

Next, the transmitter 4 copies the plurality of data symbols obtained through serial/parallel conversion and dividing to provide a copy of the same in a quantity equal to the number of spreading code duration of spreading codes corresponding to the data channels #1 to #n over which the data symbols are transmitted (S105). The transmitter 4 generates the spreading code corresponding to each of the data channels that are assigned to the data channel. The transmitter 4 then multiplies the copied data symbols using the spreading codes corresponding to the data channels #1 to #n for transmitting the data symbols (S106) to obtain data signals.

Next, the transmitter 4 inserts pilot signals in the data signals (S107). The transmitter 4 combines the data signal and pilot signal in each of the data channels #1 to #n to perform code-division-multiplexing (S108). The transmitter 4 spreads the code-division-multiplexed data signals over a plurality of sub-carriers having different frequencies of transmitting data signals (S109). Specifically, the transmitter 4 generates a multi-carrier CDMA signal by performing frequency/time signal conversion on the data signals to assign the data signals to the plurality of sub-carriers having different frequencies. The transmitter 4 inserts guard intervals between each of the data signals spread among the plurality of sub-carriers (S110). Then, the transmitter 4 transmits the multi-carrier CDMA signal having the guard intervals inserted into the receiver 5 as a transmission signal 6 (S111).

Figure 15:
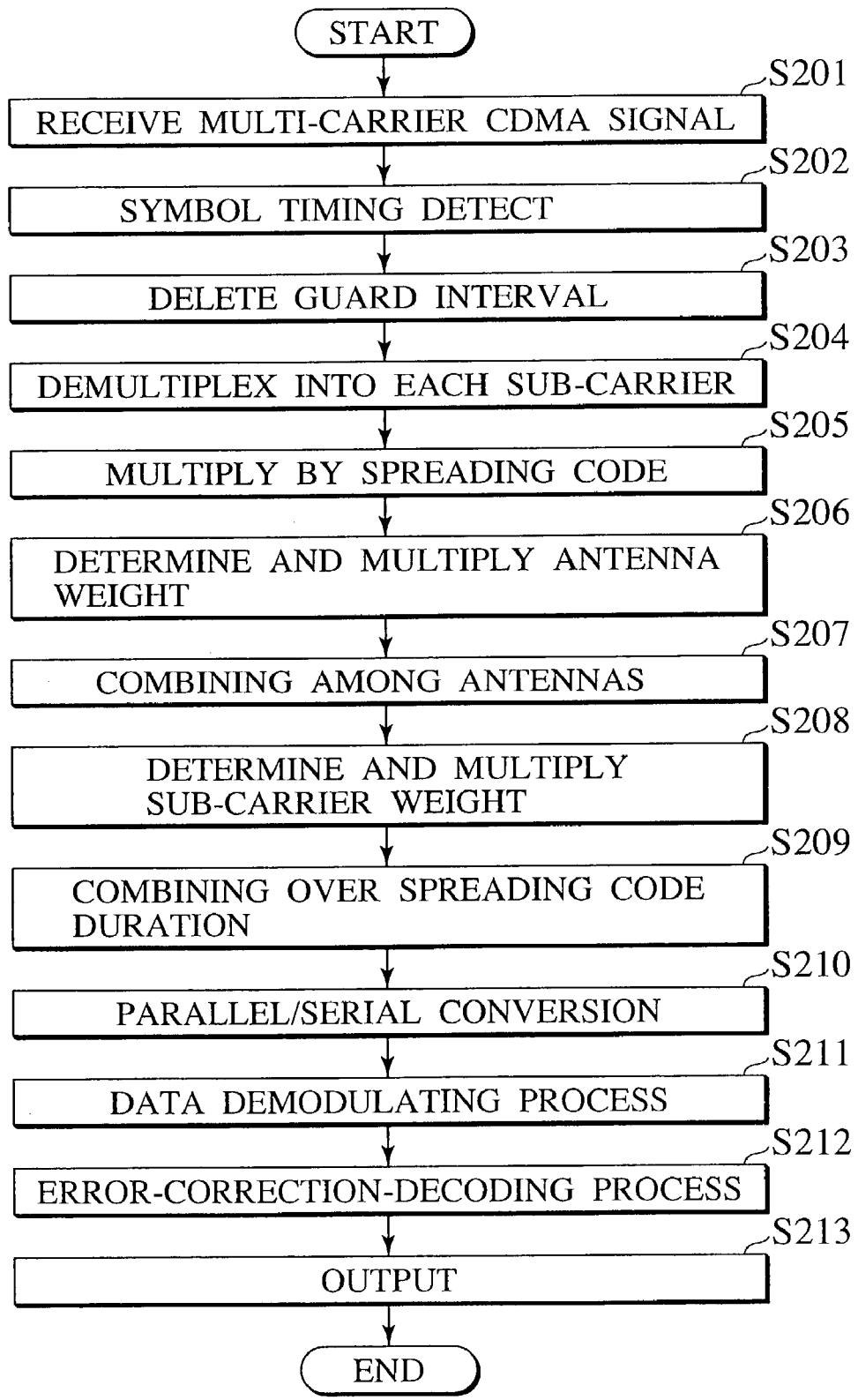
FIG. 15 is a flow chart showing a procedure of receiving a reception signal according to the first embodiment of the present invention.

A description will be made for the reception of a reception signal using the receiver 5 shown in FIG. 8. As shown in FIG. 15, the plurality of antennas 51₁ to 51n of the receiver 5 receive a multi-carrier CDMA signal which is a signal obtained by multiplying a plurality of data symbols transmitted by the transmitter 4 and transmitted over the plurality of data channels #1 to #n using spreading codes for the respective data channels and which is transmitted by the plurality of sub-carriers having different frequencies (S201). The receiver 5 detects symbol timing for each of the reception signals 7 received by the antennas 51₁ to 51n (S202). The receiver 5 deletes guard intervals inserted in the reception signals 7 (S203).

Next, the receiver 5 performs time/frequency conversion on the reception signals 7 to demultiplex the reception signals 7 spread over the plurality of sub-carriers having different frequencies into a reception signal 7 on each of the sub-carriers (S204). Then, the receiver 5 generates spreading codes identical to the spreading codes by which the reception signals 7 have been multiplied. The receiver 5 multiplies the reception signals 7 received by the plurality of antennas 51₁ to 51n using spreading codes for the data channels associated with the reception signals 7 (S205).

Next, the receiver 5 determines antenna weight and multiplies the reception signal 7 of each of the antennas 51₁ to 51n by an antenna weight thus determined (S206). The receiver 5 combines the reception signals 7 among the antennas 51₁ to 51n (S207). Thus, antenna diversity combining is performed. The receiver 5 determines sub-carrier weight and multiplies the reception signal on each of the sub-carriers by a sub-carrier weight thus determined (S208). The receiver 5 combines the reception signals 7 over the spreading code duration of the spreading codes (S209). Despreading is thus performed. Thus, data symbols are recovered to their states before the multiplication using spreading codes at the transmitter 4.

Next, the receiver 5 performs parallel/serial conversion on the data symbols recovered through the combining over the spreading code duration (S210). The receiver 5 performs a data demodulating processing on the parallel/serial converted data symbols (S211). The receiver 5 performs error-correction-decoding processing on the data symbols that have been subjected to the data demodulating processing (S212). Finally, the receiver 5 recovers the data symbols that have been subjected to the error-correction-decoding processing to a state in which they can be output to an output apparatus such as a display or speaker and outputs them to the output apparatus (S213).

The following advantages can be provided by the communication system 1, receivers 5 and 205, and method of communication as thus described. In the receiver 5 or 205, the plurality of antennas $51_1$ to $51n$ receive a transmission signals 6 which are signal obtained by multiplying a plurality of data symbols using the spreading codes for each of the data channels #1 to #n and which are transmitted over a plurality of sub-carriers having different frequencies. The spreading code generating unit 52d generates spreading codes for the data channels corresponding to resultant reception signals 7. The spreading code multipliers 52e multiply the reception signals 7 using the spreading codes. The weight controller 8 adjusts antenna weights and sub-carrier weights such that the spreading codes for the plurality of data channels #1 to #n are orthogonal to each other. The antenna weight multipliers 52f and the sub-carrier weight multipliers 54 multiply the reception signals 7 by the antenna weights and sub-carrier weights adjusted by the weight controller 8. Finally, the antenna signal combining unit 53 and symbol combining units 55 combine the reception signals 7 multiplied by the antenna weights and sub-carrier weights among the antennas and over the spreading code duration of the spreading codes.

The reception signals 7 are thus multiplied by the antenna weights and sub-carrier weights which have been adjusted by the weight controller 8 such that the spreading codes for the plurality of data channels #1 to #n are orthogonal to each other. Therefore, the spreading codes for the data channels #1 to #n by which the reception signals 7 are multiplied are orthogonal to each other. As a result, data symbols obtained by the receiver 5 or 205 are less affected by interference between the data channels #1 to #n caused by the destruction of orthogonality between the spreading codes. Thus, antenna diversity combining can be appropriately applied in the multi-carrier CDMA transmission method in the receivers 5 and 205. Consequently, a high signal power to noise power ratio can be achieved for the reception signal 7 on each sub-carrier in the receivers 5 and 205, which makes it possible to achieve improved signal transmission characteristics.

The weight controller 8 comprises the antenna weight controller 81 and the sub-carrier weight controller 82. The weight controller 8 adjusts antenna weights and the sub-carrier weights and determines antenna weights and sub-carrier weights separately. The receiver 5 comprises the antenna weight multipliers 52f configured to multiply the reception signal 7 at each antenna by an antenna weights, and the sub-carrier weight multipliers 54 configured to multiply the reception signal 7 on each of the sub-carrier by sub-carrier weights. Further, there is provided the antenna signal combining unit 53 configured to combine the reception signals among the antennas and the symbol combining units 55 configured to combine the reception signals 7 over the spreading code duration of the spreading codes.

Therefore, the receiver 5 can separately perform a process of determining antenna weights, multiplying the reception signal 7 at each antenna by an antenna weight, and combining the reception signals 7 among the antennas and a process of determining sub-carrier weight, multiplying the reception signal 7 on each sub-carrier by a sub-carrier weight, and combining the reception signals 7 over the spreading code duration of the spreading codes. As a result, the antenna weight controller 81 can determine antenna weight in consideration to the process of multiplying the reception signals 7 by sub-carrier weight and combining them over the spreading code duration, and the sub-carrier weight controller 82 can determine sub-carrier weight in consideration to the process of multiplying the reception signals 7 by antenna weight and combining them among the antennas $51_1$ to $51n$.

After the antenna weight multipliers 52f multiply the reception signal 7 at each antenna by the antenna weights and the antenna signal combining unit 53 performs antenna diversity combining by combining the reception signals 7 among the antennas, the sub-carrier weight multipliers 54 multiply the reception signal 7 on each of the sub-carriers by the sub-carrier weights, the signal 7 having been multiplied using the spreading code. After the antenna diversity combining is performed, the symbol combining units 55 perform despreading by combining the reception signals 7 that have been multiplied by the sub-carrier weights over the spreading code duration of the spreading codes. Therefore, the sub-carrier weight multipliers 54 and the symbol combining units 55 are not required to perform the process of multiplying each of the reception signals 7 at the plurality of antennas $51_1$ to $51n$ by the sub-carrier weight and the process of combining the reception signals 7 over the spreading code duration of the spreading codes separately. That is, the sub-carrier weight multipliers 54 and the symbol combining units 55 can perform the sub-carrier multiplying process and the process of combining the reception signals 7 over the spreading code duration of the spreading codes on a reception signal 7 obtained through combining between the plurality of antennas $51_1$ to $51n$ on a collective basis.

SECOND EMBODIMENT

A description will now be made on a communication system and a method of communication according to a second embodiment of the invention. The communication system of the second embodiment has a receiver 305 as shown in FIG. 16.

(Receiver)

Figure 16:
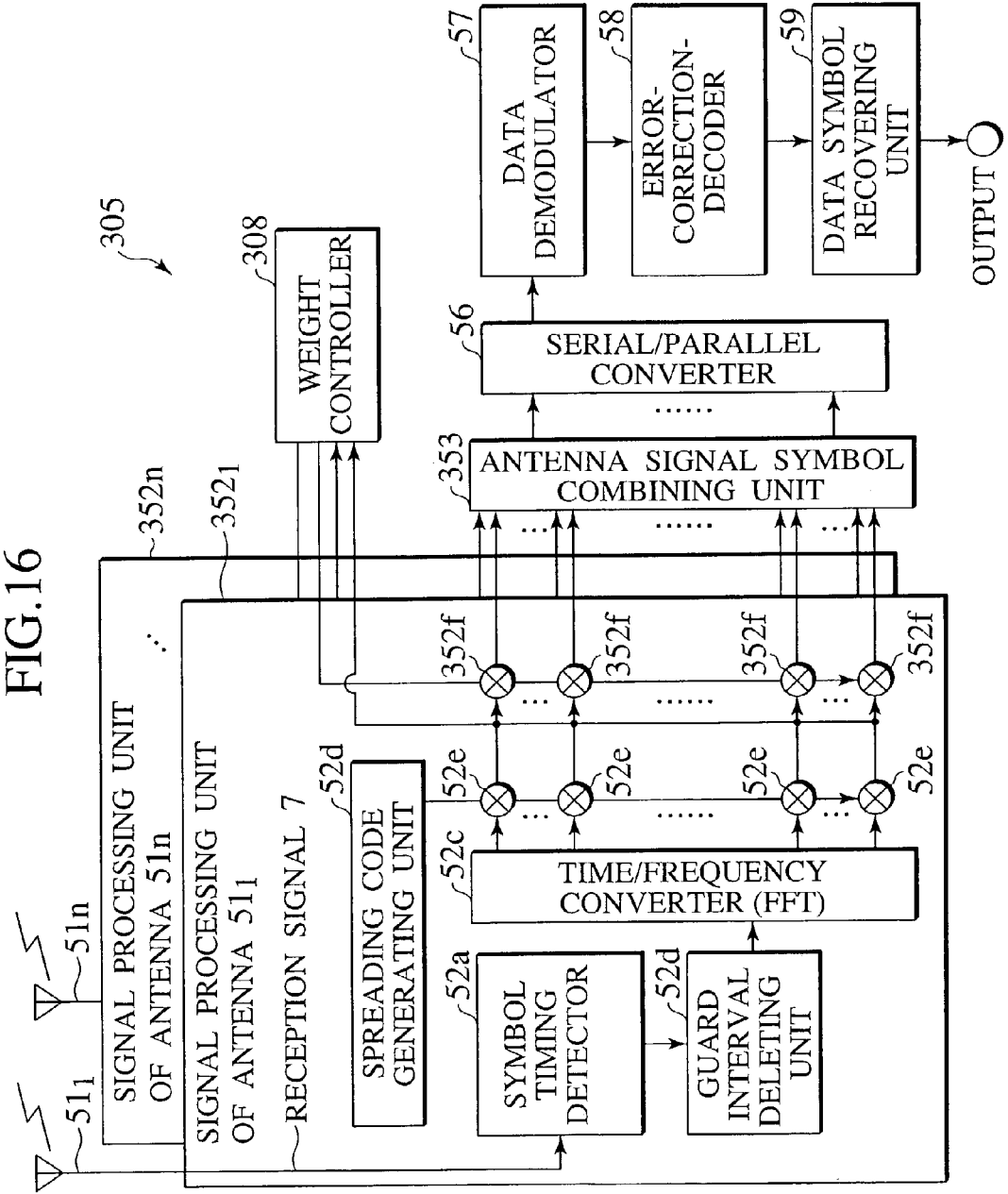
FIG. 16 is a block diagram illustrating the configuration of a receiver according to a second embodiment of the present invention.

As shown in FIG. 16, the receiver 305 comprises a plurality of antennas $51_1$ to $51n$, a plurality of signal processing units $352_1$ to $352n$, a weight controller 308, an antenna signal symbol combining unit 353, a serial/parallel converter 56, a data demodulator 57, an error-correction-decoder 58, and a data symbol recovering unit 59. The signal processing units $352_1$ to $352n$ have a symbol timing detector 52a, a guard interval deleting unit 52b, a time/frequency converter 52c, a spreading code generating unit 52d, a plurality of spreading code multipliers 52e, and a plurality of collective weight multipliers 352f.

The plurality of antennas $51_1$ to $51n$, the serial/parallel converter 56, the data demodulator 57, the error-correction-decoder 58, the data symbol recovering unit 59, the symbol timing detector 52a, the guard interval deleting unit 52b, the time/frequency converter 52c, the spreading code generating unit 52d, and the spreading code multipliers 52e are substantially similar to those in the receiver 5 shown in FIG. 8. Therefore, they are indicated by like symbols in FIG. 16 and will not be described here.

After a transmission signal 6 is received by the plurality of antennas $51_1$ to $51n$, processing similar to that for the receiver 5 shown in FIG. 8 is performed up to the multiplication of reception signals 7 using spreading codes at the spreading code multipliers 52e. The spreading code multipliers 52e input the reception signals 7 to the collective weight multipliers 352f after multiplying them using spreading codes.

The weight controller 308 adjusts antenna weights and sub-carrier weights such that the spreading codes for the plurality of data channels #1 to #n are orthogonal to each other and determines weights by which the reception signal 7 on each sub-carrier at each antenna is to be collectively multiplied (hereinafter referred to as "collective weight"). The weight controller 308 preferably determines the collective weights by adjusting the antenna weight and sub-carrier weight such that the spreading codes for the plurality of data channels #1 to #n are orthogonal to each other and such that a great SNR is achieved. Thus, the receiver 305 can obtain a reception signal 7 with a great signal power to noise ratio thus achieving improved signal transmission characteristics.

The weight controller 308 determines collective weights by adjusting antenna weights using the selective combining method, EGC method, or the MRC etc. and adjusting sub-carrier weights using ORC, MRC, EGC, or MMSEC etc. The weight controller 308 comprises the configuration of any of the antenna weight controllers 811 to 813 shown in FIGS. 10A, 10B, and 10C and the configuration of any of the sub-carrier weight controllers 821 to 828 shown in FIG. 12D and FIGS. 13A to 13G. The weight controller 308 directly determines collective weights by adjusting antenna weight and sub-carrier weight.

Figure 17:
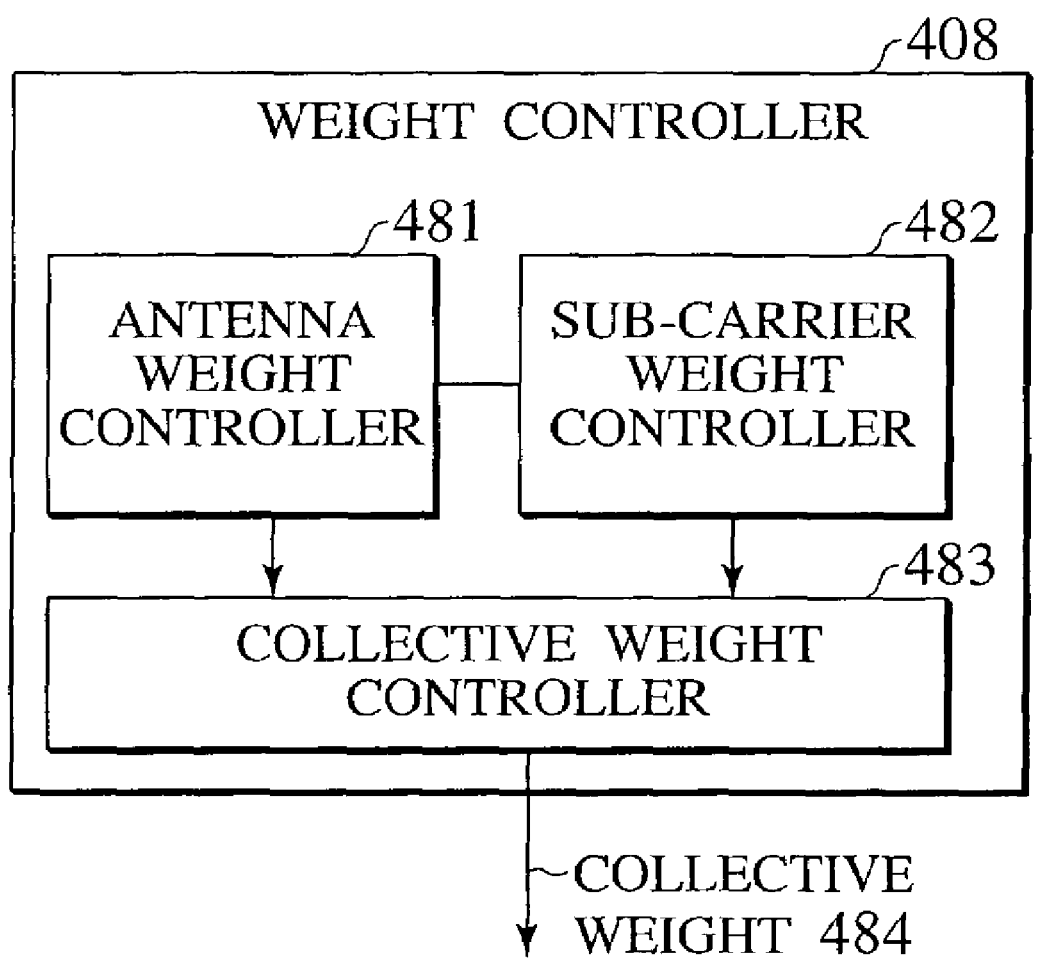
FIG. 17 is a block diagram illustrating the configuration of another weight controller according to the second embodiment of the present invention.

A weight controller 408 as shown in FIG. 17 may be used as the weight controller for determining the collective weight. The weight controller 408 has an antenna weight controller 481, a sub-carrier weight controller 482, and a collective weight controller 483. The antenna weight controller 481 determines antenna weight. The sub-carrier weight controller 482 determines sub-carrier weight. The antenna weight controller 481 determines antenna weight using the selective combining method, EGC method, or MRC method etc. as described above. For example, the antenna weight controllers 811 to 813 shown in FIGS. 10A, 10B, and 10C may be used as the antenna weight controller 481. The sub-carrier weight controller 482 determines sub-carrier weight using ORC, MRC, EGC, or MMSEC etc. as described above. For example, the sub-carrier weight controllers 821 to 828 shown in FIG. 12D and FIGS. 13A to 13G may be used as the sub-carrier weight controller 482. The antenna weight controller 481 and the sub-carrier weight controller 482 input determined antenna weight and sub-carrier weight to the collective weight controller 483.

The collective weight controller 483 adjusts the antenna weight determined by the antenna weight controller 481 and the sub-carrier weight determined by the sub-carrier weight controller 482 to determine collective weight 484. Thus, the weight controller 408 determines antenna weight and sub-carrier weight separately and then determines the collective weights 484 based on them.

The collective weight multipliers 352f multiply collectively the reception signal 7 on each of the sub-carrier of each of the antennas $51_1$ to $51n$ by the collective weights adjusted by the weight controller 308 or 408. The collective weight multipliers 352f multiply reception signals 7 received by the antennas $51_1$ to $51n$ for processing by the signal processing units $352_1$ to $352n$ by collective weights. The collective weight multipliers 352f are provided in a quantity equal to the number of sub-carriers. Each of the collective weight multipliers 352f multiply the reception signal 7 on each sub-carrier input from the respective spreading code multiplier 52e by the collective weight. The collective weight multiplier 352f of each of the signal processing units $352_1$ to $352n$ inputs the reception signal 7 multiplied by the collective weight to the antenna signal symbol combining unit 353.

The antenna signal symbol combining unit 353 is a combining unit for collectively combining the reception signal 7 multiplied by the collective weights among the antennas $51_1$ to $51n$ and over the spreading code duration of the spreading codes. The antenna signal symbol combining unit 353 collectively combines the reception signals 7 input from the collective weight multiplier 352f of each of the signal processing units $352_1$ to $352n$ among the antennas $51_1$ to $51n$ and over the spreading code duration of the spreading codes for the data channels #1 to #n associated with the reception signals. Thus, diversity combining and despreading is collectively performed.

In the receiver 305, the spreading code multipliers 52e multiply the reception signal 7 on each sub-carrier using the spreading codes for the data channels #1 to #n associated with the reception signal 7, and the collective weight multipliers 352f thereafter collectively multiply the reception signal 7 on each sub-carrier of each of the antennas $51_1$ to $51n$ by the collective weight. The antenna signal symbol combining unit 353 collectively combines the reception signals 7 among the antennas $51_1$ to $51n$ and over the spreading code duration of the dispreading codes. As a result of combining at the antenna signal symbol combining unit 353, data symbols are recovered to their states before the multiplication of spreading codes at the transmitter.

A reception signal 7 obtained as a result of combining at the antenna signal symbol combining unit 353 is input to the serial/parallel converter 56. Thereafter, processing similar to in the receiver 5 shown in FIG. 8 is performed to output data symbols.

The weight controllers 308 and 408 acquire antenna weight data and sub-carrier weight data from reception signals 7 when the selective combining method, maximum ratio combining method, ORC, MRC, or MMSEC is used. As shown in FIG. 16, the weight controllers 308 and 408 collectively acquire antenna weight data and sub-carrier weight data from reception signals 7 which have been multiplied using spreading codes at the spreading code multipliers 52e and which have not yet been multiplied by collective weights at the collective weight multipliers 352f. This simplifies the processing performed by the weight controllers 308 and 408. Further, the weight controllers 308 and 408 may acquire antenna weight data and sub-carrier weight data from reception signals 7 which have been multiplied using spreading codes to eliminate the influence of multiplication of the same using spreading codes at the transmitter. Thus, the weight controllers 308 and 408 can obtain appropriate collective weights.

The weight controllers 308 and 408 may acquire antenna weight data and sub-carrier weight data from reception signals 7 located between the time/frequency converter 52c and the spreading code multipliers 52e. The weight controllers 308 and 408 may acquire antenna weight data and sub-carrier weight data from reception signals 7 from which guard intervals have been deleted by the guard interval deleting units 52b and which have not yet been subjected to time/frequency conversion at the time/frequency converter 52c. This allows the weight controllers 308 and 408 to acquire antenna weight data and sub-carrier weight data from a single reception signal 7 of each of the antennas $51_1$ to 51n before the signal is demultiplexed into a reception signal 7 on each sub-carrier by the time/frequency converter 52c, and the processes performed by the weight controllers 308 and 408 are thereby simplified.

The weight controllers 308 and 408 may adjust sub-carrier weights to determine collective weights using pilot symbols 72 after despreading or a reception signal 7 after despreading as done by the sub-carrier weight controllers 824, 825, 827, and 828 shown in FIGS. 12D, 13D, 13F, and 13G. In such cases, the weight controllers 308 and 408 preferably acquire sub-carrier weight data from a reception signal 7 that has been despread by the antenna signal symbol combining unit 353. This makes it possible to simplify the process at the sub-carrier weight controller 82 because the acquired sub-carrier weight data can be used as it is.

The weight controllers 308 and 408 may adjust sub-carrier weights to determine collective weights as done by the sub-carrier weight controller 826 shown in FIG. 13E. In this case, the weight controllers 308 and 408 preferably acquire sub-carrier weight data from a reception signal 7 which has been demultiplexed on a sub-carrier-by-sub-carrier bases. This allows the channel estimator 826a, the noise power estimator 826b, and the number of multiplexed codes estimator 826c to respectively obtain a channel estimate value, an estimated value of noise power, and an estimated value of the number of multiplexed codes for each sub-carrier.

The weight controllers 308 and 408 may acquire antenna weight data and sub-carrier weight data from different positions. This allows the weight controllers 308 and 408 to acquire data for determining antenna weights and sub-carrier weights in optimum positions, which allows highly accurate control.

(Method of Communication)

Figure 18:
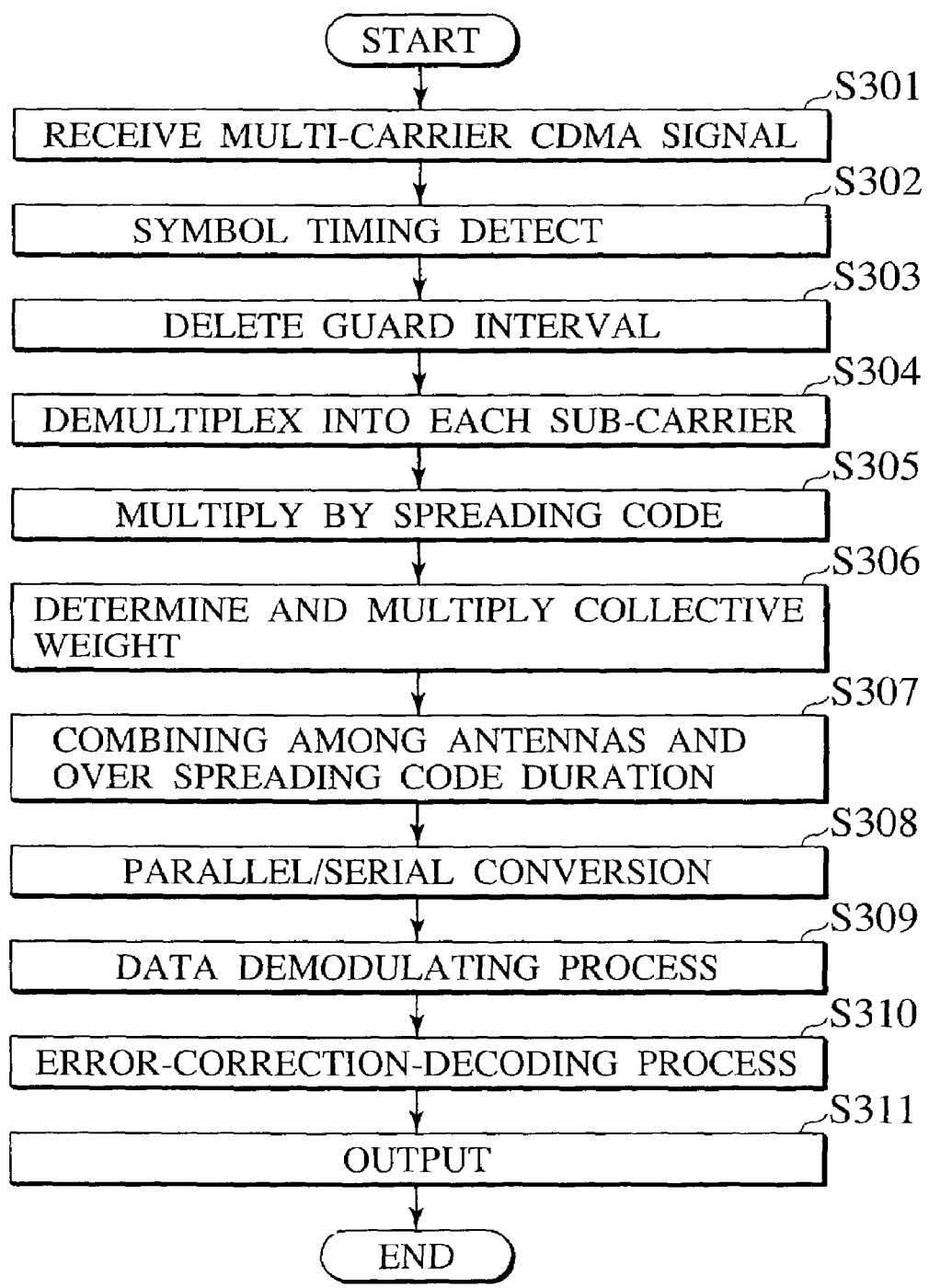
FIG. 18 is a flow chart showing a procedure of receiving a reception signal according to the second embodiment of the present invention.

A description will now be made for the reception of a reception signal using the receiver 305 shown in FIG. 16. As shown in FIG. 18, the receiver 305 performs steps S301 to S305. Steps S301 to S305 are substantially similar to steps S201 to S205 shown in FIG. 15.

Next, the receiver 305 determines collective weight and collectively multiplies a reception signal 7 on each sub-carrier of each of the antennas $51_1$ to 51n by a collective weight thus determined (S306). The receiver 305 collectively combines the reception signals 7 multiplied by the collective weight among the antennas $51_1$ to 51n and over the spreading code duration of spreading codes (S307). Thus, antenna diversity combining and despreading is performed on a collective basis. Thus, data symbols are recovered to their states before being multiplied using spreading codes at the transmitter. Next, the receiver 305 performs steps S308 to S311 as shown in FIG. 18. Steps S308 to S311 are substantially similar to steps S210 to S213 shown in FIG. 15.

The following advantages can be provided by the communication system, the receiver 305, and the method of communication described above. The weight controller 308 adjusts antenna weight and sub-carrier weight such that the spreading codes for the plurality of data channels #1 to #n are orthogonal to each other and determines the collective weight by which the reception signals 7 are to be collectively multiplied. The collective weight multipliers 352f multiply the reception signal 7 on each of the sub-carriers of each of the antennas $51_1$ to 51n by the collective weight. The antenna signal symbol combining unit 353 collectively combines the reception signals 7 multiplied by the collective weights among the antennas $51_1$ to 51n and over the spreading code duration of the spreading codes.

Therefore, the reception signals 7 are multiplied by the collective weight which have been adjusted such that the spreading codes for the plurality of data channels #1 to #n are orthogonal to each other at the weight controller 308. Thus, the spreading codes for the respective data channels #1 to #n by which the reception signals 7 are multiplied are orthogonal to each other. As a result, data symbols obtained by the receiver 305 are less affected by interference between the data channels #1 to #n caused by the destruction of orthogonality between the spreading codes. In the receiver 305, antenna diversity combining can be thus appropriately applied in the multi-carrier CDMA transmission method. As a result, a great signal power to noise power ratio can be achieved for a reception signal 7 on each sub-carrier in the receiver 305, thus providing improved signal transmission characteristics.

Further, the receiver 305 can collectively perform the process of determining collective weights, the process of performing multiplication by the collective weights, and the process of combing reception signals. This allows the processing performed by the receiver 305 to be simplified. The configuration of the receiver 305 can also kept simple.

THIRD EMBODIMENT

A description will now be made for a communication system and a method of communication according to a third embodiment of the invention. The communication system of the third embodiment has a receiver 505 as shown in FIG. 19.

(Receiver)

Figure 19:
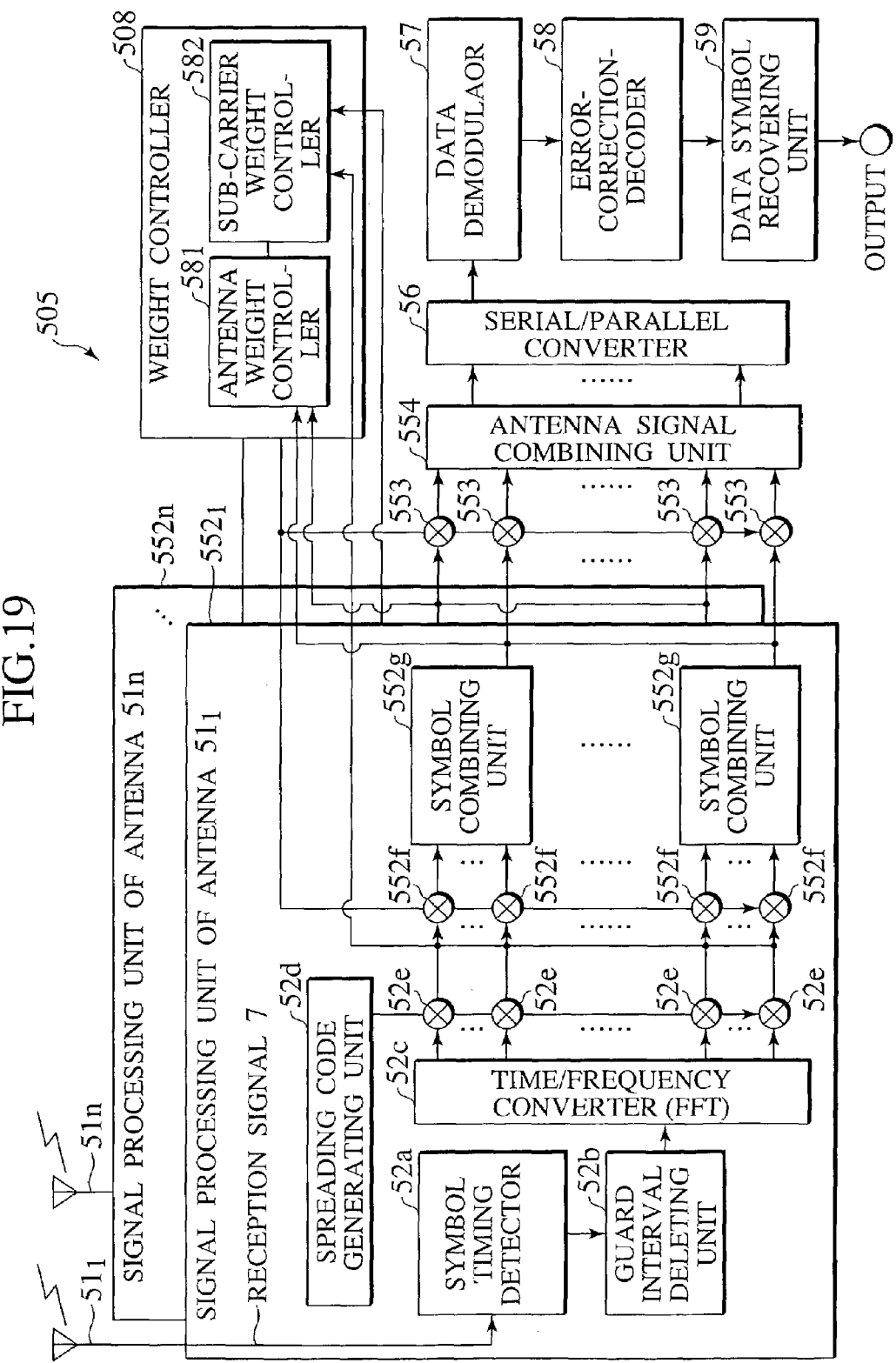
FIG. 19 is a block diagram illustrating the configuration of a receiver according to a third embodiment of the present invention.

As shown in FIG. 19, the receiver 505 comprises a plurality of antennas $51_1$ to 51n, a plurality of signal processing units $552_1$ to 552n, a weight controller 508, a plurality of antenna weight multipliers 553, an antenna signal combining unit 554, a serial/parallel converter 56, a data demodulator 57, an error-correction-decoder 58, and a data symbol recovering unit 59. The signal processing units $552_1$ to 552n have a symbol timing detector 52a, a guard interval deleting unit 52b, a time/frequency converter 52c, a spreading code generating unit 52d, a plurality of spreading codes multipliers 52e, a plurality of sub-carrier weight multipliers 552f, and a plurality of symbol combining units 552g. The plurality of antennas $51_1$ to 51n, the serial/parallel converter 56, the data demodulator 57, the error-correction-decoder 58, the data symbol recovering unit 59, the symbol timing detector 52a, the guard interval deleting unit 52b, the time/frequency converter 52c, the spreading code generating unit 52d, and the spreading code multipliers 52e are substantially similar to those in the receiver 5 shown in FIG. 8. Therefore, they are indicated by like symbols in FIG. 19 and will not be described here.

After a transmission signal 6 is received by the plurality of antennas $51_1$ to $51n$, processing similar to that for the receiver 5 shown in FIG. 8 is performed up to the multiplication of reception signals 7 using spreading codes at the spreading code multipliers 52e. The spreading code multipliers 52e input the reception signals 7 to the sub-carrier weight multipliers 552f after multiplying them using spreading codes.

The weight controller 508 comprises an antenna weight controller 581 and a sub-carrier weight controller 582. The weight controller 508 adjusts antenna weight and sub-carrier weight such that the spreading codes for the plurality of data channels #1 to #n are orthogonal to each other. The weight controller 508 preferably adjusts antenna weight and sub-carrier weight such that the spreading codes for the plurality of data channels #1 to #n are orthogonal to each other and such that a great signal power to noise power ratio is achieved. The weight controller 508 adjusts antenna weight and sub-carrier weight and determines antenna weight and sub-carrier weight separately.

The antenna weight controller 581 determines antenna weight using the selective combining method, EGC method, or MRC method etc. The antenna weight controllers 811 to 813 shown in FIGS. 10A, 10B, and 10C may be used as the antenna weight controller 581. The sub-carrier weight controller 582 determines sub-carrier weight using ORC, MRC, EGC, or MMSEC etc. The sub-carrier weight controllers 821 to 828 shown in FIG. 12D and FIGS. 13A to 13G may be used as the sub-carrier weight controller 582.

The sub-carrier weight multipliers 552f of the respective signal processing units $552_1$ to $552n$ multiply reception signals 7 on respective sub-carriers received by the antennas $51_1$ to $51n$ to be processed by the signal processing units $552_1$ to $552n$ by sub-carrier weights. The sub-carrier weight multipliers 552f are provided in a quantity equal to the number of sub-carriers. The respective sub-carrier weight multipliers 552f multiply the reception signals 7 on the respective sub-carriers input from the respective spreading code multipliers 52e by the sub-carrier weights. Each of the sub-carrier weight multipliers 552f inputs the reception signal 7 on the respective sub-carriers multiplied by the sub-carrier weight to the symbol combining units 552g.

The symbol combining units 552g of the respective signal processing units $552_1$ to $552n$ combine the reception signals 7 on the respective sub-carriers received by the antennas $51_1$ to $51n$ to be processed by the signal processing units $552_1$ to $552n$ over the spreading code duration of the spreading codes for the data channels #1 to #n associated with the reception signals 7. The symbol combining units 552g combine the reception signals 7 on the respective sub-carriers multiplied by the sub-carrier weights and input from the sub-carrier weight multipliers 552f over the spreading code duration. Despreading is thus performed. The symbol combining units 552g input a reception signal 7 obtained through the combining to antenna weight multipliers 553.

The antenna weight multipliers 553 multiply the reception signals 7 after despreading input from the symbol combining units 552g of the respective signal processing units $552_1$ to $552n$ by antenna weights. The antenna weight multipliers 553 are provided in a quantity equal to the number of symbol combining units 552g of all of signal processing units $552_1$ to $552n$. The respective antenna weight multipliers 553 input the reception signals 7 multiplied by the antenna weights to the antenna signal combining unit 554. The antenna signal combining unit 554 combines the reception signals 7 input from the antenna weight multipliers 553 among the antennas $51_1$ to $51n$. Antenna diversity combining is thus performed.

In the receiver 505, the spreading code multipliers 52e multiply the reception signals 7 on the respective sub-carriers using the spreading codes, and the sub-carrier weight multipliers 552f multiply the reception signals 7 on the respective sub-carriers by sub-carrier weights. Next, the symbol combining units 552g combine the reception signals 7 multiplied by the sub-carrier weights over the spreading code duration of the spreading codes to despread the same. Data symbols are recovered to their states before multiplication using spreading codes at the transmitter 4. Thereafter, the antenna weight multipliers 553 multiply the reception signals 7 at the respective antennas $51_1$ to $51n$, which have been combined over the spreading code duration by the antenna weights. The antenna signal combining unit 554 performs antenna diversity combining to combine the reception signals 7 which have been multiplied by the antenna weights after being despread among the antennas $51_1$ to $51n$.

The reception signal 7 combined by the antenna signal combining unit 554 is input to the serial/parallel converter 56. Thereafter, processing similar to that for the receiver 5 shown in FIG. 8 is performed to output data symbols.

In the receiver 305 shown in FIG. 19, the sub-carrier weight multipliers 552f multiply the reception signals 7 which have been multiplied using the spreading codes on each of the sub-carriers by the sub-carrier weights; the symbol combining units 552g performs despreading to combine the reception signals 7 multiplied by the sub-carrier weights over the spreading code duration of the spreading codes; the antenna weight multipliers 553 thereafter multiply the reception signals 7 of each of the antennas $51_1$ to $51n$ by the antenna weights; and the antenna signal combining unit 554 performs antenna diversity combining to combine the reception signals 7 among the antennas. In this case, the antenna weight controller 581 determines to whether maintain a state of the reception signals multiplied by the sub-carrier weights or to adjust the state of the reception signals again, based on the sub-carrier weights by which the reception signals 7 are first multiplied. The antenna weight controller 581 preferably adjusts the antenna weights based on a result of determination. In this case, the sub-carrier weight controller 582 preferably determines the sub-carrier weights by using the MMSEC method, and the antenna weight controller 581 preferably determines the antenna weights by using the EGC method.

The weight controller 508 acquires antenna weight data and sub-carrier weight data form reception signals 7 when the selective combining method, maximum ratio combining method, ORC, MRC, or MMSEC is used. As shown in FIG. 19, the antenna weight controller 581 acquires antenna weight data from reception signal 7 at each antenna that has been combined over the spreading code duration by the symbol combining units 552g. The antenna weight controller 581 determines the antenna weight based on the reception signal 7 at each antenna, which has been combined by the symbol combining units 552g over the spreading code duration. Thus, the antenna weight controller 581 can determine the antenna weights in consideration to the influence of interference between the data channels on the reception signal 7 which has actually been multiplied by the sub-carrier weights and combined over the spreading code duration. This makes it possible to reduce the influence of interference between the data channels on data symbols more appropriately and to achieve higher transmission characteristics.

The antenna weight controller 581 may acquire antenna weight data from reception signals 7 which have been multiplied by sub-carrier weights by the sub-carrier weight multipliers 552f and which have not yet been combined by the symbol combining units 552g. This eliminates the influence of multiplication using spreading codes at the transmitter and makes it possible to determine antenna weights based on antenna weight data after the multiplication by the sub-carrier weights. Therefore, the antenna weight controller 582 can determine the antenna weights in consideration for the influence of multiplication of the reception signals 7 by the sub-carrier weights, and more appropriate antenna weights can be obtained because reception signals 7 free from the influence of multiplication using spreading codes are used.

The antenna weight controller 581 may acquire antenna weight data from reception signals 7 which have been multiplied using spreading codes at the spreading code multipliers 52e and which have not yet been multiplied by sub-carrier weights at the sub-carrier weight multipliers 552f, reception signals 7 from which guard intervals have been deleted by the guard interval deleting units 52b and which have not yet been subjected to a time/frequency conversion process at the time/frequency converters 52c, or reception signals 7 which have been demultiplexed into reception signals 7 on the respective sub-carriers by the time/frequency converters 52c and which have not yet been multiplied using spreading codes at the spreading code multipliers 52e.

As shown in FIG. 19, the sub-carrier weight controller 582 acquires sub-carrier weight data from reception signals 7 which have been multiplied using spreading codes at the spreading code multipliers 52e and which have not been multiplied by sub-carrier weights at the sub-carrier weight multipliers 552f.

Thus, the sub-carrier weight controller 582 can determine more appropriate antenna weights based on sub-carrier data acquired from the reception signals 7 from which the influence of multiplication using spreading codes at the transmitter 4 has been eliminated. The sub-carrier weight controller 582 may acquire sub-carrier eight data between the time/frequency converters 52c and the spreading code multipliers 52e.

When any of the sub-carrier weight controller 824, 825, 827, and 828 shown in FIGS. 12D, 13D, 13F, and 13G are used as the sub-carrier weight controller 582, sub-carrier weight data is acquired from reception signals 7 which have been despread by the symbol combining units 552g. Thus, the processing at the sub-carrier weight controller 582 can be simplified because it can use the acquired sub-carrier data as it is.

When the sub-carrier weight controller 826 shown in FIG. 13E is used as the sub-carrier weight controller 582, sub-carrier weight data is preferably acquired from reception signals 7 which have been demultiplexed on a sub-carrier-by-sub-carrier basis. The sub-carrier weight controller 582 then preferably determines sub-carrier weights based on the reception signal 7 on each sub-carrier. Thus, the channel estimator 826a, noise power estimator 826b, and the number of multiplexed codes estimator 826c can obtain a channel estimate, an estimated value of noise power, and an estimated value of the number of multiplexed codes, respectively, on a sub-carrier-by-sub-carrier basis.

(Method of Communication)

A description will now be made on reception of a reception signal using the receiver 505 shown in FIG. 19. As shown in FIG. 19, the receiver 505 performs steps S401 to S405. Steps S401 to S405 are substantially similar to steps S201 to S205 shown in FIG. 15.

Figure 20:
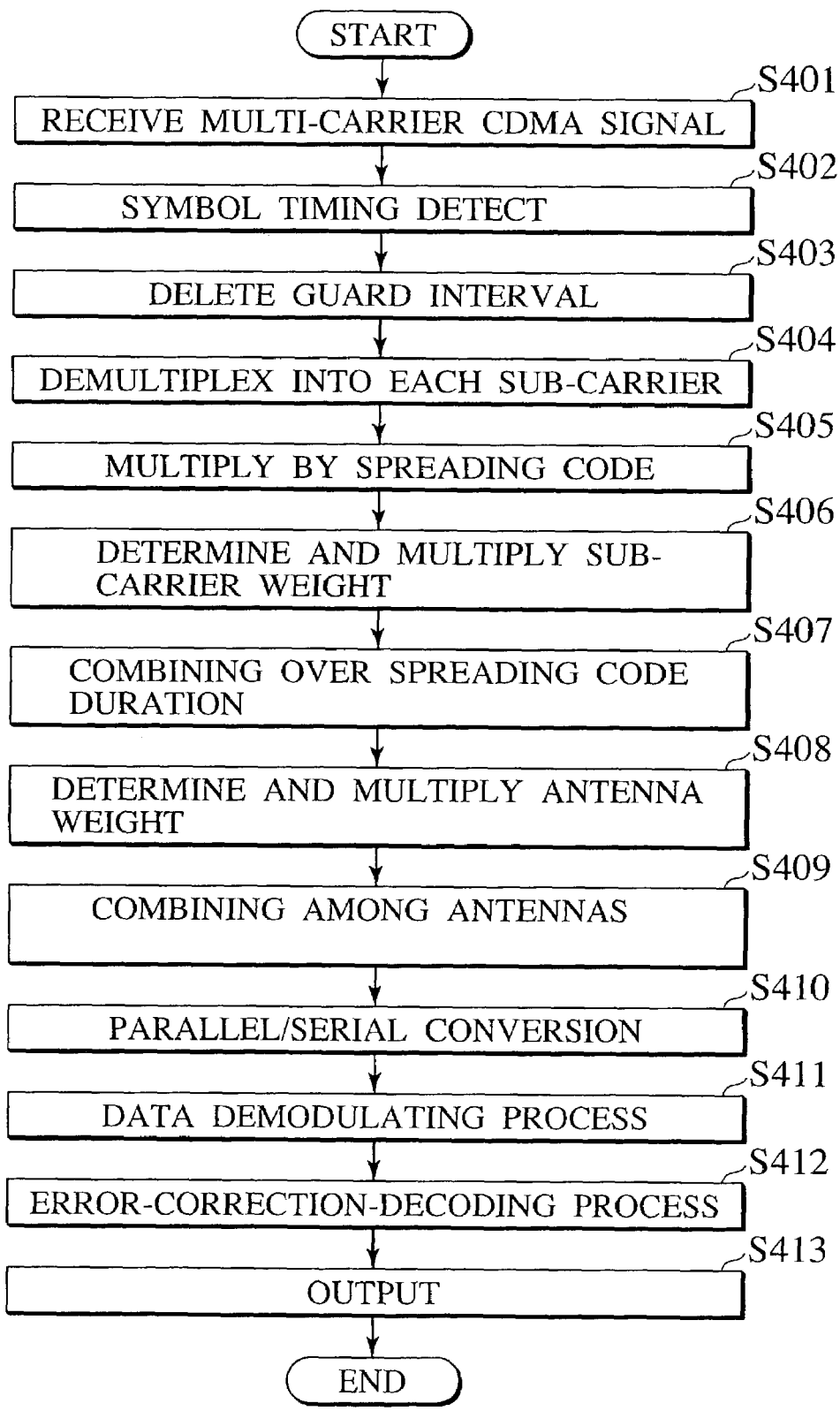
FIG. 20 is a flow chart showing a procedure of receiving a reception signal according to the third embodiment of the present invention.

Next, the receiver 505 determines sub-carrier weights and multiplies a reception signal 7 on each sub-carrier received by the antennas $51_1$ to $51n$ by a sub-carrier weight thus determined (S406). Then, the receiver 505 combines the reception signals 7 over the spreading code duration of spreading codes (S407). Despreading is thus performed. Thus, data symbols are recovered to their states from before multiplication using the spreading codes at the transmitter. Next, the receiver 505 determines antenna weights and multiplies the reception signal 7 of each of the antennas $51_1$ to $51n$ by an antenna weight thus determined. Then, the receiver 505 combines the reception signals 7 among the antennas $51_1$ to $51n$. Thus, antenna diversity combining is performed (S409). Next, the receiver 505 performs steps S410 to S413 as shown in FIG. 20. The steps S410 to S413 are substantially similar to steps S210 to S213 shown in FIG. 15.

Such a communication system, receiver 505, and method of communication can provide advantages substantially similar to those achieved by the communication system 1, receiver 5, and method of communication shown in FIGS. 2, 8, and 15. Further, the antenna weight multipliers 553 multiply the reception signals 7 of each of the antennas $51_1$ to $51n$ by the antenna weights after the spreading code multipliers 52e multiply the reception signals 7 using the spreading codes for the data channels #1 to #n corresponding to the reception signals 7; the sub-carrier weight multipliers 552f multiply the reception signals 7 on each of the sub-carriers by sub-carrier weights; and the symbol combining units 552g performs despreading by combining the reception signals 7 multiplied by the sub-carrier weights over the spreading code duration of the spreading codes. The antenna signal combining unit 554 performs antenna diversity combining by combining the reception signals 7 multiplied by the antenna weights among the antennas after the dispreading is performed.

Therefore, the antenna weight controller 581 can determine antenna weights in consideration of the influence of interference between the data channels on the reception signals 7 which have been multiplied using the spreading codes, multiplied by the sub-carrier weights, and combined over the spreading code duration of the spreading codes, i.e., the reception signals 7 which have been despread. Then, the antenna weight multipliers 553 multiply the signals by the antenna weights. Finally, the antenna signal combining unit 554 combines the reception signals 7 which have been multiplied by the antenna weights determined in consideration of the influence of interference between the data channels #1 to #n among the antennas. Thus, the receiver 505 can adequately reduce the influence of interference between the data channels on data symbols, thus achieving improved signal transmission characteristics.

FOURTH EMBODIMENT

A description will now be made for a communication system and a method of communication according to a fourth embodiment of the invention. The communication system of the fourth embodiment has a receiver 605 as shown in FIG. 21.

(Receiver)

Figure 21:
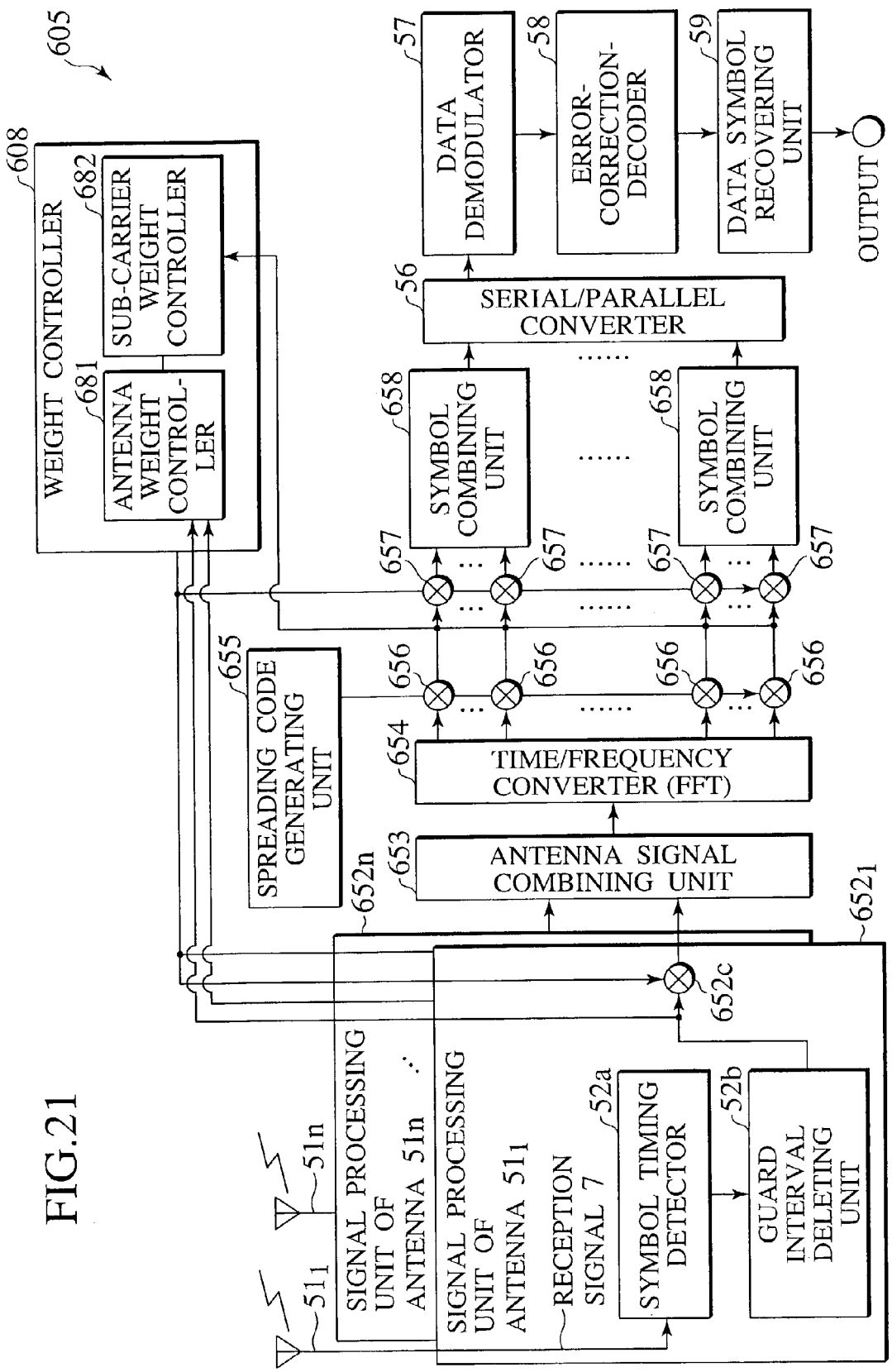
FIG. 21 is a block diagram illustrating the configuration of a receiver according to a fourth embodiment of the present invention.

As shown in FIG. 21, the receiver 605 has a plurality of antennas $51_1$ to $51n$, a plurality of signal processing units $652_1$ to $652n$, a weight controller 608, antenna signal combining unit 653, a time/frequency converter 654, a spreading code generating unit 655, a plurality of spreading code multipliers 656, a plurality of sub-carrier weight multipliers 657, a plurality of symbol combining units 658, a serial/parallel converter 56, a data demodulator 57, an error-correction-decoder 58, and a data symbol recovering unit 59. The signal processing units $652_1$ to $652n$ have a symbol timing detector 52a, a guard interval deleting unit 52b, and an antenna weight multiplier 652c. The plurality of antennas $51_1$ to $51n$, the serial/parallel converter 56, the data demodulator 57, the error-correction-decoder 58, the data symbol recovering unit 59, the symbol timing detector 52a, and the guard interval deleting unit 52b are substantially similar to those of the receiver 5 shown in FIG. 8. Therefore, they are indicated by like reference numerals in FIG. 21 and will not be described here.

After a transmission signal 6 is received by the plurality of antennas $51_1$ to $51n$, processes similar to those in the receiver 5 shown in FIG. 8 are performed up to the removal of guard intervals from reception signals 7 at the guard interval deleting unit 52b.

The weight controller 608 has an antenna weight controller 681 and a sub-carrier weight controller 682. The weight controller 508 adjusts antenna weights and sub-carrier weights such that the spreading codes for the plurality of data channels #1 to #n are orthogonal to each other. The weight controller 608 preferably adjusts antenna weights and sub-carrier weights such that the spreading codes for the plurality of data channels #1 to #n are orthogonal to each other and such that a great SNR is achieved. The weight controller 608 adjusts antenna weights and sub-carrier weights and determines antenna weights and sub-carrier weights separately.

The antenna weight controller 681 determines antenna weights using the selective combining method, the EGC method, or the maximum ratio combining method. The antenna weight controllers 811 to 813 shown in FIGS. 10A, 10B, and 10C may be used as the antenna weight controller 681. The sub-carrier weight controller 682 determines sub-carrier weights using ORC, MRC, EGC, or MMSEC. The sub-carrier weight controllers 821 to 828 shown in FIG. 12D and FIGS. 13A to 13G may be used as the sub-carrier weight controller 682. The antenna weight controller 681 inputs antenna weights to the antenna weight multipliers 652c of the respective signal processing units $652_1$ to $652n$. The sub-carrier weight controller 682 inputs sub-carrier weights to the sub-carrier weight multipliers 657.

The antenna weight multipliers 652c of each of the signal processing units $652_1$ to $652n$ multiply reception signals 7 received by the antennas to be processed by the signal processing units $652_1$ to $652n$ by the sub-carrier weights. The sub-carrier weight multiplier 652c of each of the antenna signal processing units $652_1$ to $652n$ is required only to multiply one reception signal 7 received by the respective one of the antennas $51_1$ to $51n$ by the antenna weight. Therefore, it is necessary to provide only one such unit in each of the signal processing units $652_1$ to $652n$. The configuration of the signal processing units $652_1$ to $652n$ is thus simplified. The antenna weight multiplier 652c of each of the signal processing units $652_1$ to $652n$ inputs the reception signal 7 multiplied by the antenna weight to the antenna signal combining unit 653.

The antenna signal combining unit 653 combines the reception signals 7 input from the antenna weight multipliers 652c of each of the signal processing units $652_1$ to $652n$ among the antennas $51_1$ to $51n$. Antenna diversity combining is thus performed. The antenna signal combining unit 653 inputs the reception signals 7 combined among the antennas $51_1$ to $51n$ to the time/frequency converter 654.

The time/frequency converter 654 performs time/frequency conversion on the reception signals 7 after combining among the antennas $51_1$ to $51n$ input from the antenna signal combining unit 653 to demultiplex them into a reception signal 7 on each of the sub-carriers. The time/frequency converter 654 inputs the reception signals 7 demultiplexed on a sub-carrier-by-sub-carrier basis to the spreading code multipliers 656.

The spreading code generating unit 655 generates spreading codes similar to the spreading codes by which the reception signals have been multiplied. The spreading code generating unit 655 inputs the generated spreading codes to the spreading code multipliers 656. The spreading code multipliers 656 multiply the reception signal 7 on each sub-carrier after the combining among the antennas $51_1$ to $51n$ which has been demultiplexed by the time/frequency converter 654 using the spreading codes of the data channels #1 to #n over which the reception signal 7 has been transmitted in the direction of the frequency axis. By thus multiplying the reception signal 7 using the spreading codes, the influence of the multiplication using the spreading codes at the transmitter is eliminated from the signal. The spreading code multipliers 656 are provided in a quantity equal to the number of the sub-carriers. Each of the spreading code multipliers 656 multiplies the reception signal 7 on the respective sub-carrier after the combining among the antennas $51_1$ to $51n$ by a spreading code. The spreading code multipliers 656 inputs the reception signals 7 multiplied using the spreading codes to the sub-carrier weight multipliers 657.

The sub-carrier weight multiplier 657 multiplies the reception signal 7 on each sub-carrier input from the respective spreading code multipliers 52e by a sub-carrier weight. The sub-carrier weight multipliers 657 are provided in a quantity equal to the number of sub-carriers. Each of the sub-carrier weight multipliers 657 inputs the reception signal 7 on each sub-carrier multiplied by the sub-carrier weight to the symbol combining units 658. The symbol combining units 658 combine the reception signal 7 on each sub-carrier after the combining among the antennas input from the sub-carrier weight multiplier 657 over the spreading code duration of the spreading codes for the data channels #1 to #n associated with the reception signal 7. Despreading is thus performed.

In the receiver 605, the antenna weight multipliers 652c of the respective signal processing units $652_1$ to $652n$ multiply the reception signals 7 by the antenna weights, and the antenna signal combining unit 653 combines them among the antennas $51_1$ to $51n$. Then, the time/frequency converter 654 demultiplex the reception signals 7 after the combining among the antennas into a reception signal on each sub-carrier. The spreading code multipliers 656 multiply the reception signal 7 on each sub-carrier after the combining among the antennas $51_1$ to $51n$ using the spreading codes. Finally, the sub-carrier weight multipliers 657 multiply the reception signals 7 on the respective sub-carriers after the combining among the antennas $51_1$ to $51n$ by the sub-carrier weights, and the symbol combining units 658 combine them over the spreading code duration of the spreading codes. Despreading is thus performed. As a result of the combining at the symbol combining units 658, data symbols are recovered to their states before the multiplication using spreading codes at the transmitter.

The reception signal 7 combined by the symbol combining units 658 is input to the serial/parallel converter 56. Thereafter, processes similar to those in the receiver 5 shown in FIG. 8 are performed to output data symbols.

In the receiver 605 shown in FIG. 21, the antenna weight multipliers 652c multiply the reception signals 7 of each of the antennas $51_1$ to 51n by the antenna weights; the antenna signal combining units 653 perform antenna diversity combining to combine the reception signals 7 multiplied by the antenna weights among the antennas; the sub-carrier weight multipliers 657 thereafter multiply the reception signals 7 which have been multiplied by the spreading codes on each of the sub-carriers by the sub-carrier weights; and the symbol combining units 658 perform despreading to combine the reception signals 7 multiplied by the sub-carrier weights over the spreading code duration of the spreading codes.

In this case, the sub-carrier weight controller 682 determines to whether maintain the state of the reception signals 7 multiplied by the antenna weights or to adjust the state of the reception signals multiplied by the antenna weights again, based on the antenna weights by which the reception signals 7 are first multiplied. The sub-carrier weight controller 682 preferably adjusts the sub-carrier weights based on a result of determination. In this case, the antenna weight controller 681 preferably determines the antenna weights by using the EGC method, and the sub-carrier weight controller 682 preferably determines the sub-carrier weights by using either the MMSEC method or EGC method.

The weight controller 608 acquires antenna weight data and sub-carrier weight data from reception signals 7 when the selective combining method, maximum ratio combining method, ORC, MRC, or MMSEC is used. As shown in FIG. 21, the antenna weight controller 681 acquires antenna weight data from a reception signal 7 from which guard intervals have been deleted by the guard interval deleting unit 52b and which has not been multiplied by an antenna weight at the antenna weight multiplier 652c yet.

The sub-carrier weight controller 682 determines sub-carrier weights based on reception signals 7 which have been combined among the antennas $51_1$ to 51n at the antenna signal combining unit 653, demultiplexed into a reception signal on each sub-carrier at the time/frequency converter 654, and multiplied using spreading codes at the spreading code multipliers 656 and which have not been multiplied by sub-carrier weights at the sub-carrier weight multipliers 657 yet. Thus, the sub-carrier weight controller 682 can determine the sub-carrier weights in consideration to the influence of the multiplication of the reception signals 7 by the antenna weights and combining of them among the antennas $51_1$ to 51n. Further, the sub-carrier weight controller 682 can use sub-carrier weight data acquired from reception signals 7 from which the influence of the multiplication using spreading codes at the transmitter has been eliminated. Therefore, more appropriate sub-carrier weights can be obtained. The sub-carrier weight controller 682 may acquire sub-carrier weight data from reception signals 7 which have been demultiplexed into a reception signal on each sub-carrier at the time/frequency converter 654 and which have not been multiplied using spreading codes at the spreading code multipliers 656 yet.

When any of the sub-carrier weight controllers 824, 825, 827, and 828 shown in FIGS. 12D, 13D, 13F, and 13G are used as the sub-carrier weight controller 682, sub-carrier weight data is acquired from reception signals 7 which have been despread by the symbol combining units 658. This makes it possible to simplify the process at the sub-carrier weight controller 682 because it can use sub-carrier weight data thus acquired as it is.

When the sub-carrier weight controller 826 shown in FIG. 13E is used as the sub-carrier weight controller 682, sub-carrier weight data is preferably acquired from reception signals 7 demultiplexed on a sub-carrier-by-sub-carrier basis. The sub-carrier weight controller 682 preferably determines a sub-carrier weight based on the reception signal 7 on each sub-carrier. This allows the channel estimator 826a, the noise power estimator 826b, and the number of multiplexed codes estimator 826c can obtain a channel estimate, an estimated value of noise power, and an estimated value of the number of multiplexed codes respectively for each sub-carrier.

In the receiver 605, the time/frequency converter 654 may be provided downstream of the antenna weight multiplier 652c in each of the signal processing units $652_1$ to 652n. In this case, the time/frequency converters of the respective signal processing units $652_1$ to 652n input reception signals 7 demultilexed on a sub-carrier-by-sub-carrier basis to the antenna signal combining unit 653. In such a configuration, an antenna weight multiplier 652c is only required to multiply one reception signal 7 received by the respective one of the antennas $51_1$ to 51n, and it is required to provide only one such unit in each of the signal processing units $652_1$ to 652n. This allows the configuration of the signal processing units $652_1$ to 652n to be simplified.

(Method of Communication)

Figure 22:
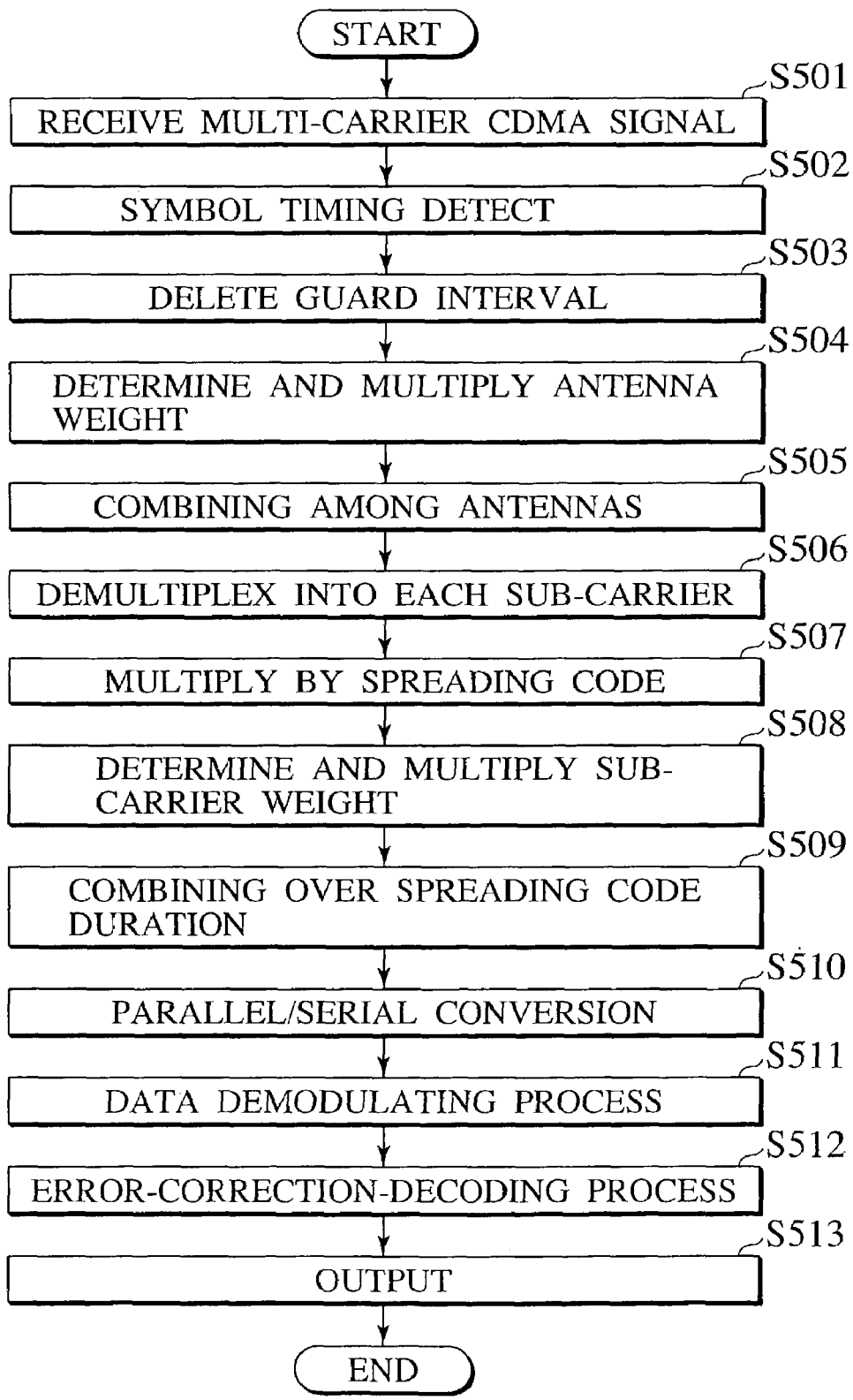
FIG. 22 is a flow chart showing a procedure of receiving a reception signal according to the fourth embodiment of the present invention.

A description will now be made on reception of a reception signal using the receiver 605 shown in FIG. 21. As shown in FIG. 22, the receiver 605 performs steps S501 to S503. Steps S501 to S503 are substantially similar to steps S201 to S203 shown in FIG. 15.

Next, the receiver 605 determines antenna weights and multiplies a reception signal 7 of each of the antennas $51_1$ to 51n by the antenna weight thus determined (S504). Then, the receiver 605 combines the reception signals 7 among the antennas $51_1$ to 51n (S505). Antenna diversity combining is thus performed. Next, the receiver 605 performs time/frequency conversion on the reception signals 7 to demultiplex the reception signals 7 spread among a plurality of sub-carriers having different frequencies into reception signals on a sub-carrier-by-sub-carrier basis (S506). The receiver 605 generates spreading codes similar to the spreading codes by which the reception signals 7 have been multiplied. Then, the receiver 605 multiplies the reception signals 7 received by the plurality of antennas $51_1$ to 51n using the spreading codes for the data channels associated with the reception signals 7 (S507).

Next, the receiver 605 determines sub-carrier weights and multiplies the reception signal on each sub-carrier by the determined sub-carrier weights (S508). The receiver 605 then combines the reception signals 7 over the spreading code duration of the spreading codes (S509). Despreading is thus performed. Data symbols are thus recovered to their states before the multiplication of the spreading codes at the transmitter. Next, the receiver 605 performs steps S510 to S513 as shown in FIG. 22. Steps S510 to S513 are substantially similar to steps S210 to S213 shown in FIG. 15.

Such a communication system, receiver 605, and method of communication can provide advantages substantially similar to those achieved by the communication system 1, receiver 5, and method of communication shown in FIGS. 2, 8, and 15. Further, the antenna weight multipliers 652c multiply the reception signals 7 of each of the antennas $51_1$ to 51n by antenna weight before the reception signals 7 are demultiplexed by the time/frequency converters 654 into a reception signal on each of the sub-carriers, and the antenna signal combining unit 653 combines the reception signals 7 multiplied by the antenna weight among the antennas $51_1$ to 51n. Thereafter, the time/frequency converter 654 demultiplexes them into the reception signal on each of the sub-carriers. The sub-carrier weight multipliers 657 multiply the reception signals 7 on the respective sub-carriers by sub-carrier weights. Finally, the symbol combining units 658 combine the reception signals 7 multiplied by the sub-carrier weights over the spreading code duration of spreading codes.

Therefore, the time/frequency converter 654, the sub-carrier weight multipliers 657, and the symbol combining units 658 are not required to perform the process of demultiplexing reception signals 7 into a reception signal 7 on each sub-carrier, the process of multiplying them by sub-carrier weights, and the process of combining the reception signals 7 over the spreading code duration of the spreading codes separately on each of signals received by the plurality of antennas $51_1$ to 51n. That is, the time/frequency converter 654, the sub-carrier weight multipliers 657, and the symbol combining units 658 can perform the process of demultiplexing reception signals 7 into a reception signal 7 on each sub-carrier, the process of multiplying them by sub-carrier weights, and the process of combining the reception signals 7 over the spreading code duration of the spreading codes on a reception signal 7 obtained through combining between the plurality of antennas $51_1$ to 51n collectively.

FIFTH EMBODIMENT

Figure 25:
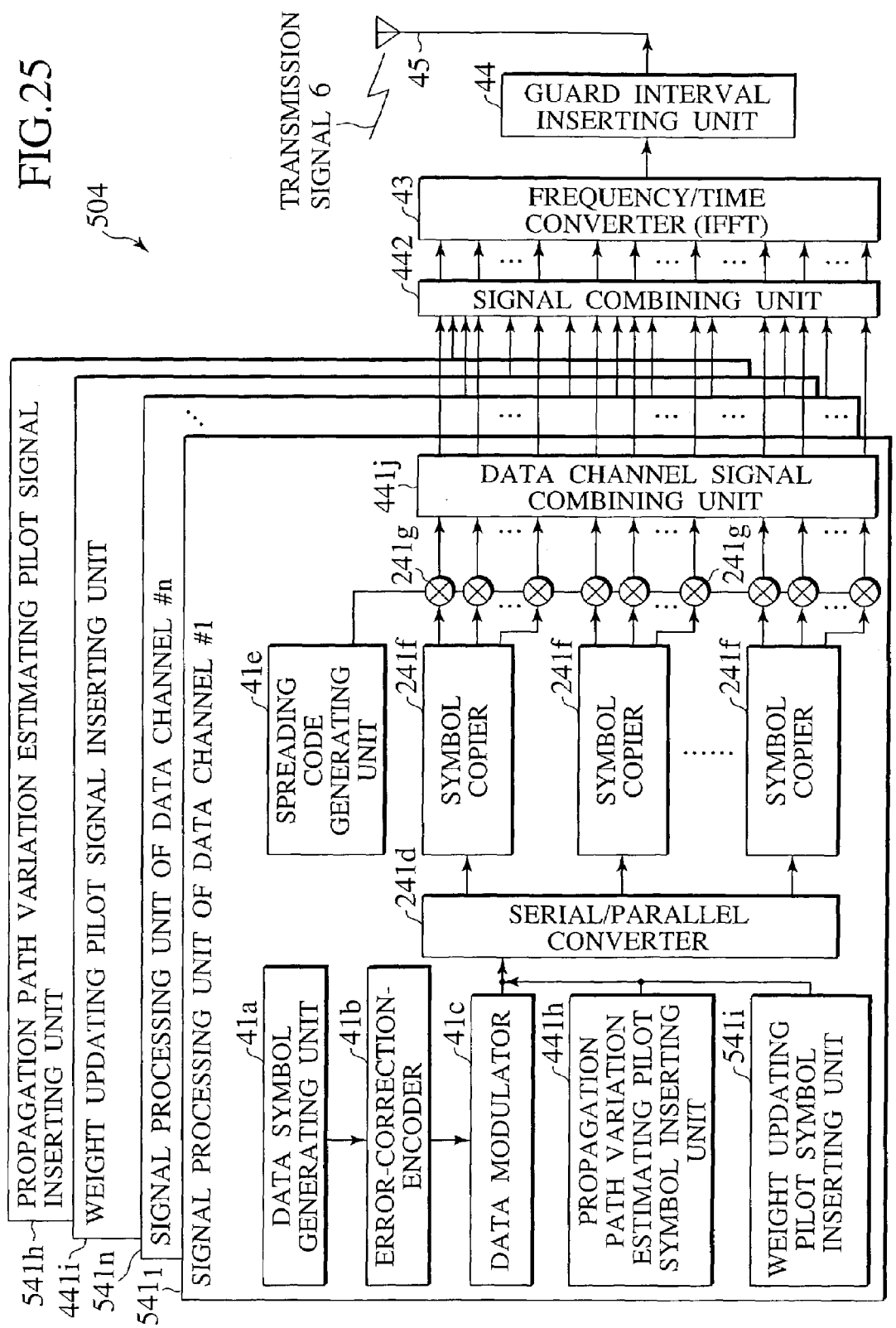
FIG. 25 is a block diagram illustrating the configuration of another transmitter according to the fifth embodiment of the present invention.

A communication system according to a fifth embodiment of the invention will now be described. The communication according to the fifth embodiment of the invention has a transmitter 404 as shown in FIG. 23 or a transmitter 504 as shown in FIG. 25.

(Transmitter)

Figure 23:
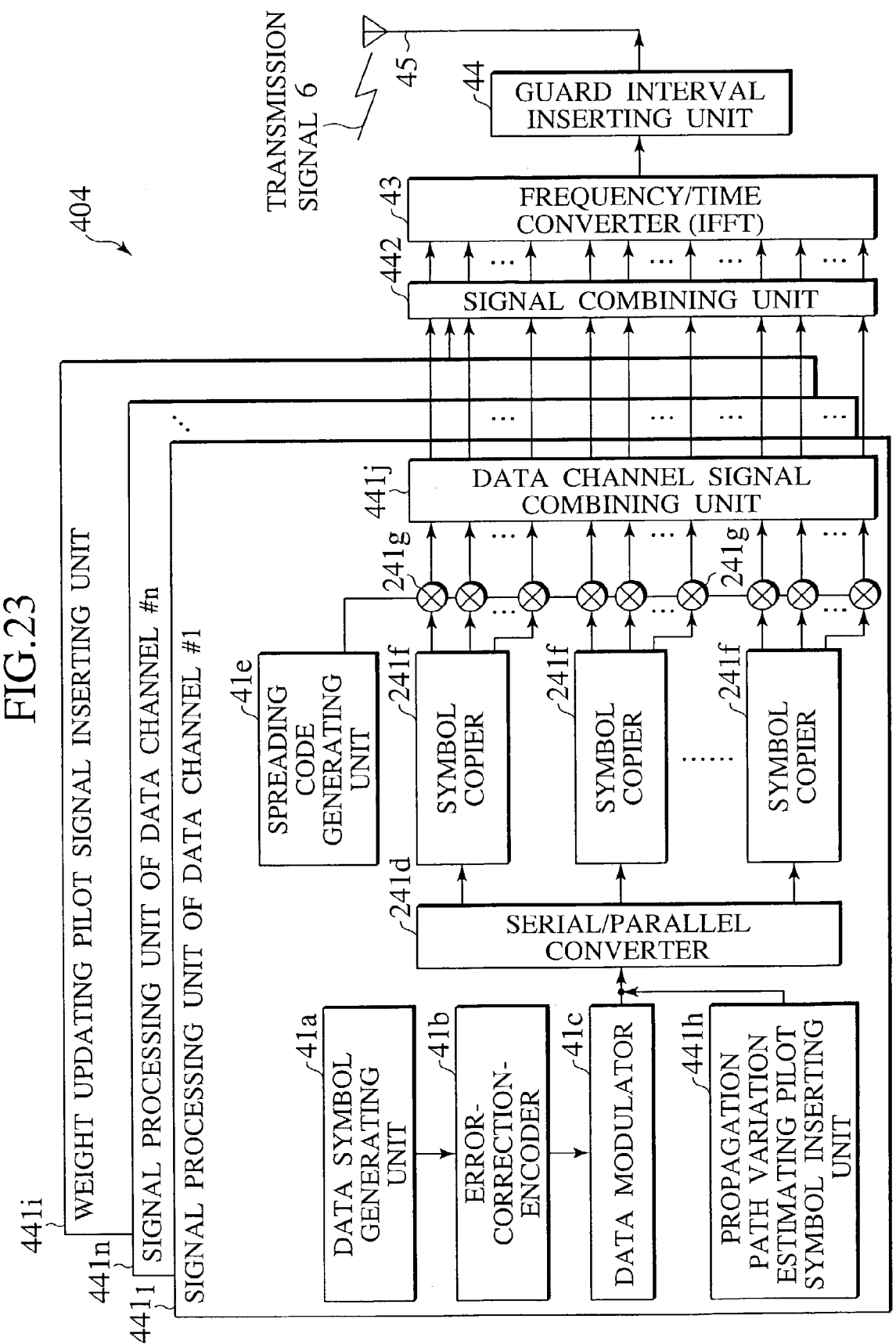
FIG. 23 is a block diagram illustrating the configuration of a transmitter according to a fifth embodiment of the present invention.

As shown in FIG. 23, the transmitter 404 has a plurality of signal processing units $441_1$ to 441n, a signal combining unit 442, a frequency/time converter 43, a guard interval inserting unit 44, and an antenna 45. The signal processing units $441_1$ to 441n have a data symbol generating unit 41a, an error-correction-encoder 41b, a data modulator 41c, a serial/parallel converter 241d, a spreading code generating unit 41e, a plurality of symbol copiers 241f, a plurality of spreading code multipliers 241g, a propagation path variation estimating pilot symbol inserting unit 441h, a weight updating pilot signal inserting unit 441i, and a data channel signal combining unit 441j.

The data symbol generating units 41e, the error-correction-encoders 41b, the data modulators 41c, the spreading code generating units 41e, the frequency/time converter 43, and the guard interval inserting unit 44 are substantially similar to those in the transmitter 4 shown in FIG. 3. The serial/parallel converters 241d, the plurality of symbol copiers 241f and the plurality of spreading code multipliers 241g are substantially similar to those in the transmitter 204 shown in FIG. 5. Therefore, description on them is omitted in FIG. 23.

Propagation path variation estimating pilot symbol inserting unit 441h inserts pilot symbols for estimating a propagation path variation into the data symbols. Thus, a transmission signal 6 is generated in which a data signal and a pilot signal for estimating propagation path variations are multiplexed. Symbols whose amplitude and phase are known to a receiver 5 are used as the pilot symbols for estimating a propagation path variation. The pilot symbols for estimating propagation path variation are used by the receiver for estimating a propagation path variation of the reception signal.

The weight updating pilot signal inserting unit 441i inserts pilot signals for updating weight into the data signals. Thus, a transmission signal 6 is generated in which a data signal and a pilot signal for updating weights are multiplexed. Symbols whose amplitude and phase are known to the receiver 5 are used as the pilot symbols for updating weights. The pilot signals for updating weights are used by the receiver for estimating errors between a reception signal after despreading and a transmission signal to update sub-carrier weights. Common pilot symbols may be used in the plurality of data channels #1 to #n as the pilot symbols for estimating propagation path variations and the pilot symbols for updating weights, and different pilot symbols may alternatively be used in each of the data channels #1 to #n.

The data channel signal combining units 441j combine a data signal, a pilot signal for estimating propagation path variation and a pilot signals for updating weight in each of the data channels #1 to #n. In the transmitter 404, the pilot signal for updating weight and the data signal are multiplexed using code-division multiplexing in which they are multiplexed in the direction of a spreading code axis. In the transmitter 404, the pilot signal for updating weights and data signal which have been code-division-multiplexed are multiplexed with the pilot signal for estimating propagation path variation using time-division-multiplexing in which they are multiplexed in the direction of a time axis.

The data symbol generating units 41a through data modulators 41c perform processes similar to those in the transmitter 4 shown in FIG. 3. The data modulators 41c and the propagation path variation estimating pilot symbol inserting unit 441h inputs data symbols and pilot symbols for estimating propagation path variation to the serial/parallel converters 241d at different times. Thus, the data symbols and the pilot symbols for estimating propagation path variations are time-division-multiplexed. Specifically, the data symbols and the pilot symbols for estimating propagation path variations are input to the serial/parallel converters 241d at different times by switching units that switch the input of data symbols from the data modulators 41c to the serial/parallel converters 241d and the input of pilot symbols for estimating propagation path variations from propagation path variation estimating pilot symbol inserting unit 441h to the serial/parallel converters 241d.

The serial/parallel converters 241d through spreading code multipliers 241g perform processes similar to those in the receiver 204 shown in FIG. 5 except that the spreading code multipliers 241g multiply the pilot symbols for estimating path variations and the data symbols by different spreading codes. The spreading code multipliers 241g input data signals and pilot signals for estimating propagation path variations which have been multiplied using spreading codes and which have been time-division-multiplexed to the data channel signal combining units 441j.

The data channel signal combining units 441j combine the data signals and the pilot signals for estimating propagation path variation to be transmitted over the respective data channels #1 to #n. The data channel signal combining units 441j input the combined data signals and pilot signals for estimating propagation path variation to the signal combining unit 442.

The weight updating pilot signal inserting unit 441i inputs pilot signals for updating weights to the signal combining unit 442, the signals being obtained by multiplying the pilot symbols for updating weights by the same spreading codes as those multiplied on the pilot symbols for estimating a propagation path variation at the signal processing units $441_1$ to 441n. The signal combining unit 442 multiplex the time-division-multiplexed data signals and pilot signals for estimating propagation path variations input from the data channel signal combining units 441j of the signal processing units 441₁ to 441n of the respective data channels #1 to #n with the pilot signals for estimating propagation path variations input from the data channel signal combining unit 441j on a code-division-multiplex basis. Thereafter, the frequency/time converter 43 through antenna 45 performs processes similar to those in the transmitter 4 shown in FIG. 3.

Figure 24:
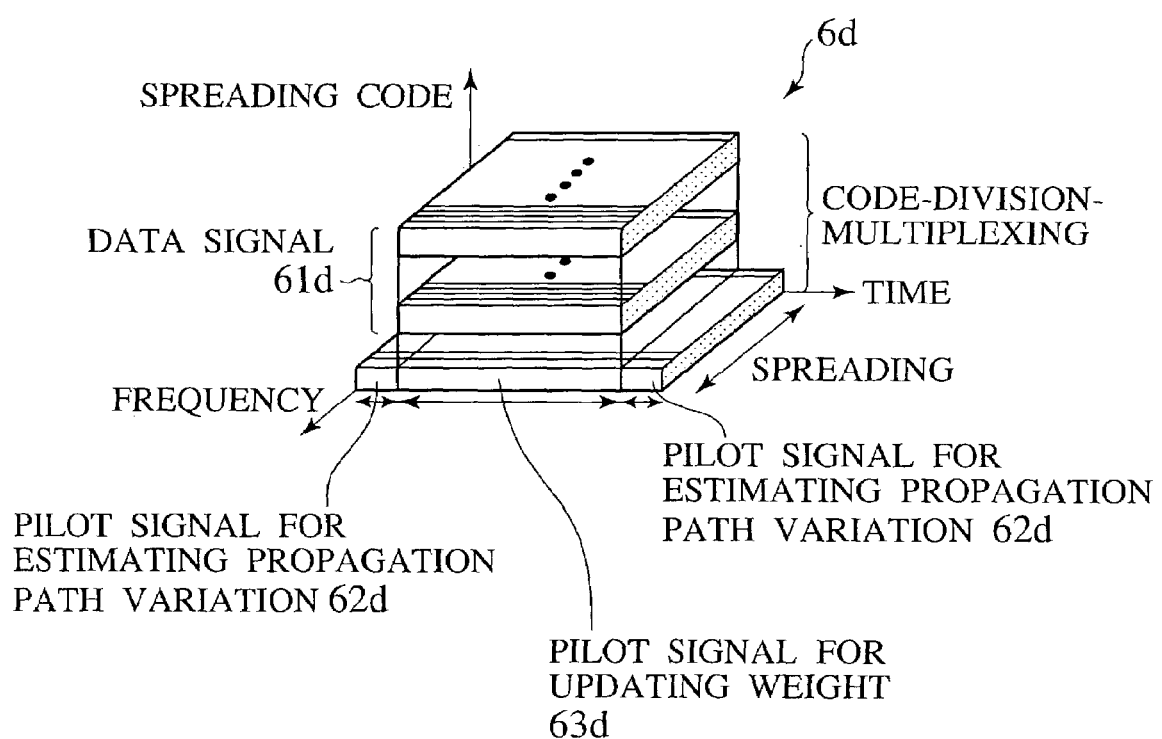
FIG. 24 illustrates a transmission signal according to the fifth embodiment of the present invention.

As a result, a transmission signal 6d as shown in FIG. 24 is obtained. In the transmission signal 6d, pilot signals 63d for updating weights and data signals 61d are code-division-multiplexed in the direction of the spreading code axis, and the pilot signals 63d for updating weights and the data signals 61d are multiplexed with pilot signals 62d for estimating propagation path variations on a time-division multiplex basis in the direction of a time axis. The pilot signals 62d for estimating propagation path variations and the pilot signals 63 for updating weights are time-division multiplexed using the same spreading codes. The transmission signal 6d is spread in the direction of a frequency axis to become a multi-carrier CDMA signal.

Thus, propagation path variation estimating pilot symbol inserting unit 441h and the weight updating pilot signal inserting unit 441i are separately provided in the transmitter 404. Therefore, the transmitter 404 is capable of separately transmitting optimum pilot symbols for estimating propagation path variations and optimum pilot symbols for updating weights that allow errors between a reception signal after despreading and a transmission signal. Further, the transmitter 404 can generate the transmission signal 6 using a method of multiplexing suitable for each of the pilot symbols. For example, since the pilot signals 63d for updating weights have a long duration as shown in FIG. 24, they will reduce frame efficiency when time-division-multiplexed with the data signals 61d. Therefore, frame efficiency can be improved by using code-division-multiplexing for the pilot signals 63d for updating weights. The pilot signals 62d for estimating propagation path variations have a short duration. Therefore, time-division-multiplexing may be used for the pilot signals 62d for estimating propagation path variations to prevent inter-code interference at the pilot signals 62d for estimating propagation path variations. This makes it possible to improve the accuracy of estimation of propagation path variations performed by a receiver.

As seen in a transmitter 504 shown in FIG. 25, in order to time-division-multiplex data signals with pilot signals for estimating propagation path variations and pilot signals for updating weights, the signal processing units 541₁ to 541n of the respective data channels #1 to #n may be provided with a propagation path variation estimating pilot symbol inserting unit 441h to insert pilot symbols for estimating propagation path variation in the serial/parallel converter 241d and a weight updating pilot symbol inserting unit 541i to insert pilot symbols for updating weights in the serial/parallel converter 241d. Further, in order to code-division-multiplex data signals with pilot signals for estimating propagation path variations and pilot signals for updating weights, there may be provided a propagation path variation estimating pilot signal inserting unit 541h to be inserted between pilot symbols for estimating propagation path variations in the signal combining unit 442 and a weight updating pilot signal inserting unit 441i to be inserted between pilot signals for updating weight in the signal combining unit 442.

In such a transmitter 504, appropriate methods of multiplexing can be selected and combined to multiplex data signals, pilot signals for updating weights, and pilot signals for estimating propagation path variations. The transmitter 504 is thus capable of generating an optimum transmission signal.

(Receiver)

Figure 26:
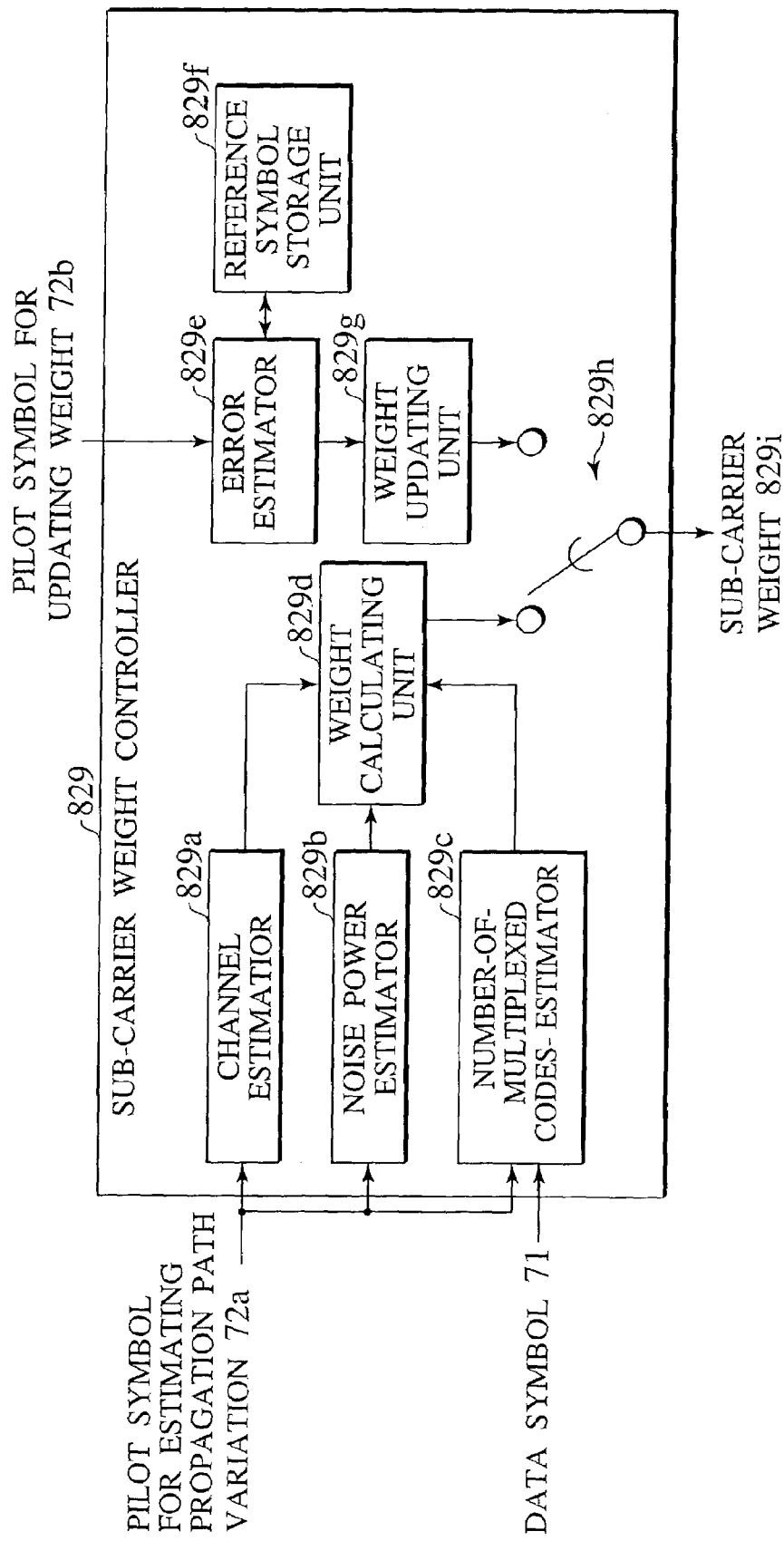
FIG. 26 is a block diagram illustrating the configuration of a sub-carrier weight controller according to the fifth embodiment of the present invention.

When any of the receivers 5, 205, 505, and 605 shown in FIGS. 8, 11, 19, and 21 receives a reception signal 7 including pilot symbols for estimating propagation path variations and pilot symbols for updating weights from the transmitter 404 or 504, a sub-carrier weight controller 829 as shown in FIG. 26 may be used as the sub-carrier weight controller 82, 282, 482, 582, or 682. The features of the sub-carrier weight controller 829 may be provided in the weight controller 308 shown in FIG. 16.

As shown in FIG. 26, the sub-carrier weight controller 829 has a channel estimator 829a, a noise power estimator 829b, a number of multiplexed codes estimator 829c, a weight calculating unit 829d, an error estimator 829e, a reference symbol storage unit 829, a weight updating unit 829g, and a switching unit 829h.

The channel estimator 829a, noise power estimator 829b, and number of multiplexed codes estimator 829c are substantially similar to the channel estimator 826a, noise power estimator 826b, and number of multiplexed codes estimator 826c of the sub-carrier weight controller 826 shown in FIG. 13E except that they use pilot symbols 72a for estimating propagation path variations to estimate respective values of interest. The weight calculating unit 829d is substantially similar to the weight calculating unit 826d shown in FIG. 13 except that it inputs sub-carrier weights determined by the same to the switching unit 829h.

The error estimator 829e is substantially similar to the error estimator 827a of the sub-carrier weight controller 827 shown in FIG. 13F except that it uses pilot symbols 72b for updating weights to estimate errors. The reference symbol storage unit 829f holds pilot symbols for updating weights to be transmitted by the transmitter 304 or 404 as reference symbols. The weight updating unit 829g inputs sub-carrier weights determined by the same to the switching unit 829h. The weight updating unit 829g does not determine sub-carrier weights when it first receives a reception signal 7 because there is no pilot symbol after despreading required estimating an error. The weight updating unit 829g is otherwise substantially similar to the weight updating unit 827c of the sub-carrier weight controller 827 shown in FIG. 13F.

The switching unit 829h inputs sub-carrier weights input from the weight calculating unit 829d and sub-carrier weights input from the weight updating unit 829g to the sub-carrier weight multipliers 54, 552f, and 657 of the receivers 5, 205, 505, and 605 shown in FIGS. 8, 11, 19, and 21 and the collective weight multiplier 352f of the receiver 305 shown in FIG. 16 on a switched basis.

When a reception signal 7 is first received, since there is no pilot symbol after despreading required for estimating an error, the switching unit 829h inputs sub-carrier weights determined by the weight calculating unit 829d to the sub-carrier weight multiplier 54, 552f or 657 or the collective weight multiplier 352f as initial values. Thereafter, it inputs sub-carrier weights determined by the weight updating unit 829g to the sub-carrier weight multiplier 54, 552f or 657 or the collective weight multiplier 352f. This makes it possible to multiply the reception signal 7 by more appropriate initial values as sub-carrier weights.

The switching unit 829h may be appropriately set to input sub-carrier weights obtained by the weight calculating unit 829d or the weight updating unit 829g to the sub-carrier weight multipliers 54, 552f, or 657 or the collective weight multiplier 352f. Accordingly, the switching system is not restricted to one described above.

Such a sub-carrier weight controller 829 makes it possible to obtain a channel estimate, a noise power estimate, and an estimate of the number of multiplexed codes more adequately using pilot symbols for estimating propagation path variations that are optimum for estimating propagation path variations. The sub-carrier weight controller 829 can estimate an error more adequately by using pilot symbols for weight updating that are optimum for estimating an error between a reception signal after despreading and a transmission signal. The sub-carrier weight controller 829 may properly use sub-carrier weights determined by the sub-carrier weight calculating unit 829d or the weight updating unit 829g depending on situations.

The sub-carrier weight controllers 824, 825, 827, and 828 can use the pilot symbols 72b for weigh updating, and the sub-carrier weight controller 826 can use the pilot symbols 72a for estimating propagation path variations when any of the sub-carrier weight controller 824 to 828 shown in FIG. 12D and FIGS. 13D to 13G is used as any of the sub-carrier weight controller 82, 282, 482, 582, and 682 of the receiver 5, 205, 505, and 605 shown in FIGS. 8, 11, 19 and 21 or when the weight controller 382 of the receiver 305 shown in FIG. 16 has the features of any of the sub-carrier weight controllers 824 to 828.

The communication system and transmitters 404 and 504 thus described can provide advantages substantially similar to those of the communication system 1 and the transmitters 4, 204, and 304 shown in FIGS. 2, 3, 5, and 7. Further, since the propagation path variation estimating pilot symbol inserting unit 411h and propagation path variation estimating pilot signal inserting unit 541h are provided separately from the weight updating pilot signal inserting unit 441i and weight updating pilot symbol inserting unit 541i, the transmitters 404 and 505 can transmit the pilot symbols for estimating propagation path variations and the pilot symbols for updating weights separately. Further, the transmitters 404 and 504 can generate a transmission signal 6d using a method of multiplexing suitable for each type of pilot symbols. The receiver can obtain a channel estimate, an estimate of noise power, and an estimate of the number of multiplexed codes using the pilot symbols for estimating propagation path variations more adequately and can more estimate an error using the pilot symbols for updating weights more adequately.

SIXTH EMBODIMENT

Figure 27:
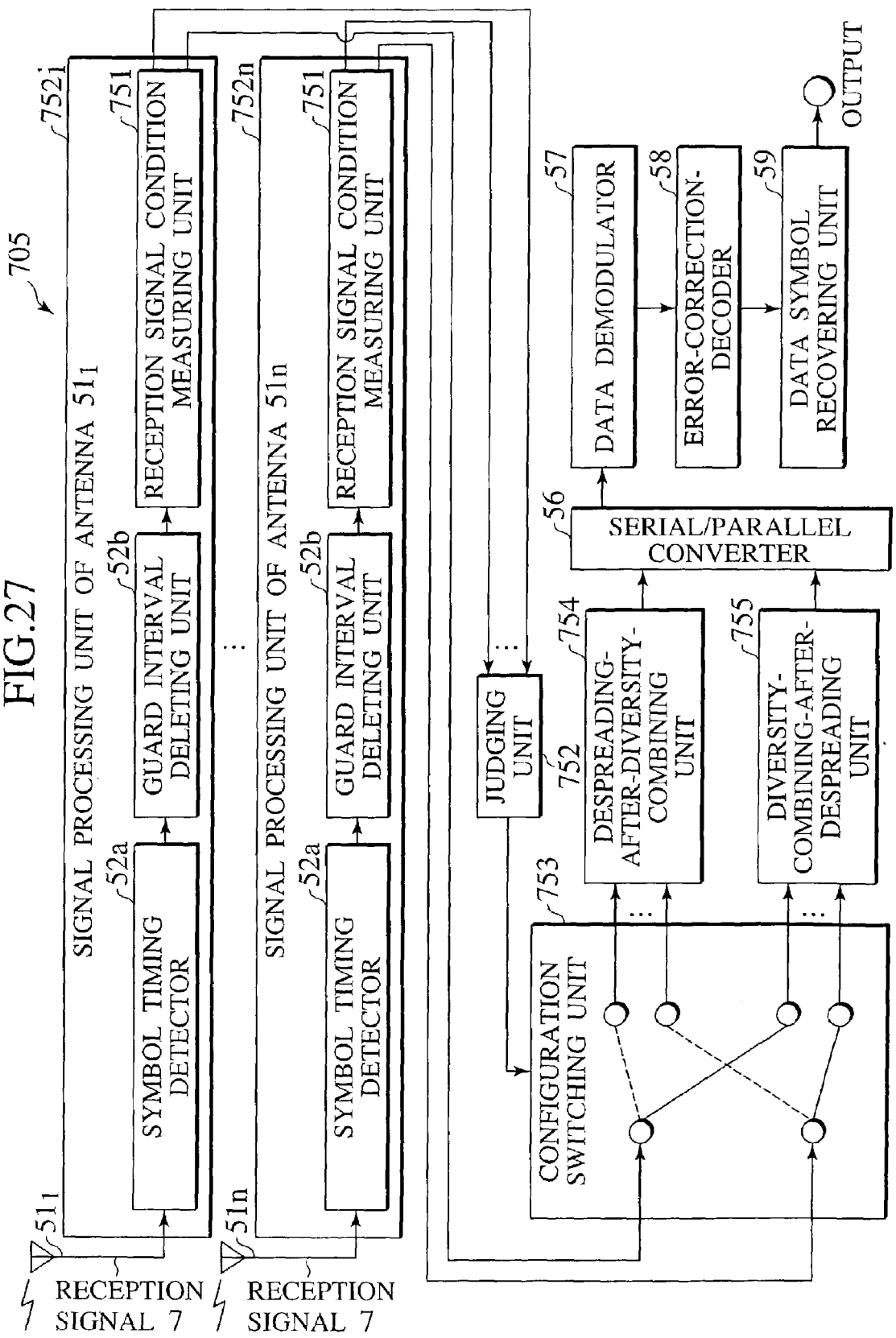
FIG. 27 is a block diagram illustrating the configuration of a receiver according to a sixth embodiment of the present invention.

A description will now be made on a communication system according to a sixth embodiment of the invention. The communication system of the sixth embodiment has a receiver 705 as shown in FIG. 27.

(Receiver)

receiver 705 has a plurality of antennas $51_1$ to $51n$, a plurality of signal processing units $752_1$ to $752n$, a judging unit 752, a configuration switching unit 753, a despreading-after-diversity-combining unit 754, a diversity-combining-after-despreading unit 755, a serial/parallel converter 56, a data demodulator 57, an error-correction-encoder 58, and a data symbol recovering unit 59. The signal processing units $752_1$ to $752n$ have a symbol timing detector 52a, a guard interval deleting unit 52b, and a reception signal condition measuring unit 751.

The plurality of antennas $51_1$ to $51n$, serial/parallel converter 56, data demodulator 57, error-correction-encoder 58, data symbol recovering unit 59, symbol timing detectors 52a, and guard interval deleting units 52b are substantially similar to those in the receiver 5 shown in FIG. 8. Therefore, they are indicated by like reference numerals in FIG. 27 and will not be described here.

The reception signal condition measuring units 751 are measuring portions for measuring the state of reception signal 7. The reception signal condition measuring units 751 measures the power and fading correlation of the reception signals 7 as the condition of the reception signal 7. The reception signal condition measuring units 751 are provided in a quantity equal to the number of antennas $51_1$ to $51n$. In the receiver 705, the signal processing units $752_1$ to $752n$ associated with the antennas $51_1$ to $51n$ have the reception signal condition measuring units 751 configured to measure a condition of the reception signals 7 received by the plurality antennas $51_1$ to $51n$. The reception signal condition measuring units 751 may measure either power or fading correlation of the reception signals 7, and other parameters indicating the condition of the reception signals 7 may be measured.

The reception signal condition measuring units 751 of the signal processing units $752_1$ to $752n$ measure the power and fading correlation factors of the reception signals 7 received by the antennas $51_1$ to $51n$, respectively. The reception signal condition measuring units 751 input measured values of the power and correlation factors of the reception signals 7 to the judging unit 752. The reception signal condition measuring units 751 of the signal processing units $752_1$ to $752n$ input the reception signals 7 received by the antennas $51_1$ to $51n$ to the configuration switching unit 753.

The judging unit 752 controls an order of multiplying a reception signal on each of the sub-carriers that has been multiplied using the spreading codes by the sub-carrier weights, combining the reception signal on each of the sub-carriers over the spreading code duration, multiplying a reception signal of each of the antennas by the antenna weights, and combining the reception signal of each of the antennas among the antennas. The judging unit 752 controls the order of despreading and antenna diversity combining. Specifically, the judging unit 752 controls the order of the process of multiplying a reception signal 7 on each sub-carrier by sub-carrier weights at the sub-carrier weight multiplier and combining the reception signals 7 multiplied by the sub-carrier weights over the spreading code duration of the spreading codes at the symbol combining unit (despreading) and the process of multiplying a reception signal 7 of each of the antennas $51_1$ to $51n$ by antenna weights at the antenna weight multiplier and combining the reception signals 7 multiplied by the antenna weights among the antennas $51_1$ to $51n$ at the antenna signal combining unit (antenna diversity combining).

The judging unit 752 controls the order of despreading and antenna diversity combining based on the condition of the reception signals 7 received by the antennas $51_1$ to $51n$ that are input from the reception signal condition measuring units 751 of the signal processing units $752_1$ to $752n$.

The judging unit 752 controls the order based on the measured values of the fading correlation factors of the reception signals 7 at the antennas $51_1$ to $51n$. Specifically, when the reception signals 7 at the antennas $51_1$ to $51n$ have great fading correlation factors, the judging unit 752 judges that despreading is to follow antenna diversity combining. When the reception signals 7 at the antennas 51₁ to 51n have small fading correlation factors, the judging unit 752 judges that antenna diversity combining is to follow despreading.

Thus, when there is high fading correlation that reduces the gain of antenna diversity combining, the accuracy of channel estimation can be improved by performing despreading after antenna diversity combining. Therefore, the sub-carrier weight controller can perform channel estimation with high accuracy even if there is a reduction in the gain of antenna diversity, which makes it possible to determine optimum sub-carrier weights. Thus, the receiver 705 can improve the final signal transmission characteristics. When there is low fading correlation, antenna diversity combining is performed after despreading, which allows the antenna weight controller to determine antenna weights in consideration to the influence of interference between the data channels on the reception signals 7 after despreading, i.e., the influence on the orthogonality of the spreading codes. Thus, the receiver 705 can improve the signal transmission characteristics.

The judging unit 752 may control the order based on the measured values of the power of the reception signals 7 at the antennas 51₁ to 51n. Specifically, when the power of the reception signals 7 at the antennas 51₁ to 51n is small, the judging unit 752 judges that despreading is to follow antenna diversity combining. When the reception signals 7 at the antennas 51₁ to 51n have high power, the judging unit 752 judges that antenna diversity combining is to follow despreading.

Thus, when the reception signals 7 have low power that reduces the accuracy of channel estimation, the accuracy of channel estimation can be improved by performing despreading after antenna diversity combining. This allows the sub-carrier weight controller to perform channel estimation with high accuracy to determine optimum sub-carrier weights. Thus, the receiver 705 can improve the final signal transmission characteristics. When the power of the reception signals 7 is high, the accuracy of channel estimation is already high. Therefore, antenna diversity combining is performed after despreading to allow the antenna weight controller to determine antenna weights in consideration to the influence of interference between the data channels on the reception signals 7 after despreading, i.e., the influence on the orthogonality of the spreading codes. Thus, the receiver 705 can improve the signal transmission characteristics.

The judging unit 752 may control the order of despreading and antenna diversity combining based on both of the fading correlation factors of the reception signals 7 and the power of the reception signals. For example, the judging unit 752 stores a threshold value for the fading correlation factors and a threshold value for power that be used as criteria in determining the order of the despreading and antenna diversity combining. First, the judging unit 752 compares measured values of the fading correlation factors of the reception signals 7 received by the antennas 51₁ to 51n that are input from the reception signal condition measuring unit 751 with the threshold value for fading correlation factors. When the measured values of the fading correlation factors of the reception signals 7 received by the antennas 51₁ to 51n are greater than the threshold value for fading correlation factors, the judging unit 752 judges that despreading is to follow antenna diversity combining.

When the measured values of the fading correlation factors of the reception signals 7 received by the antennas 51₁ to 51n that are input from the reception signal condition measuring units 751 are equal to or smaller than the threshold value for fading correlation factors, the judging unit 752 determines to judge the order based on the power of the reception signals 7. When the measured values of the fading correlation factors of the reception signals 7 are equal to or smaller than the threshold value, the judging unit 752 compares measured values of the power of the reception signals 7 received by all of the antennas 51₁ to 51n that are input from the reception signal condition measuring units 751 with the threshold value for power. When the measured values of the power of the reception signals 7 received by all of the antennas 511 to 51n are smaller than the threshold for power, the judging unit 752 judges that despreading is to follow antenna diversity combining. When any of the measured values of the power of the reception signals 7 received by all of the antennas 51₁ to 51n that are input from the reception signal condition measuring units 751 is equal to or greater than the threshold value for power, the judging unit 752 judges that antenna diversity combining is to follow despreading. The judging unit 752 inputs the determined order of despreading and antenna diversity combining to the configuration switching unit 753.

The configuration switching unit 753 switches input of the reception signals 7. The reception signals 7 received by the antennas 51₁ to 51n are input to the configuration switching unit 753 from the reception signal condition measuring units 751 of the signal processing units 752₁ to 752n. The order of despreading and antenna diversity combining determined by the judging unit 752 is also input to the configuration switching unit 753. Based on the order of despreading and antenna diversity combining input from the judging unit 752, the configuration switching unit 753 inputs the reception signals 7 at the antennas 51₁ to 51n to either of the despreading-after-diversity-combining unit 754 and the diversity-combining-after despreading unit 755.

In the case of the order in which antenna diversity combining is to follow despreading, the configuration switching unit 753 inputs the reception signals 7 at the antennas 51₁ to 51n to the diversity-combining-after despreading unit 755, as indicated by the solid line in FIG. 27. In the case of the order in which despreading is to follow antenna diversity combining, the configuration switching unit 753 inputs the reception signals 7 at the antennas 51₁ to 51n to the despreading-after-diversity-combining unit 754, as indicated by the dotted line in FIG. 27.

The despreading-after-diversity-combining unit 754 comprises a configuration for performing despreading after antenna diversity combining. The despreading-after-diversity-combining unit 754 comprises a time/frequency converter, a spreading code generating unit, a plurality of spreading code multipliers, a weight controller, a plurality of antenna weight multipliers, an antenna signal combining unit, a plurality of sub-carrier weight multipliers, and a plurality of symbol combining units. The weight controller comprises an antenna weight controller and a sub-carrier weight controller. In the despreading-after-diversity-combining unit 754, those features are arranged to allow despreading to be performed after antenna diversity combining. Specifically, the time/frequency converter, the spreading code generating unit, the plurality of spreading code multipliers, the weight controller, the plurality of antenna weight multipliers, the antenna signal combining unit, the plurality of sub-carrier weight multipliers, and the plurality of symbol combining units may be arranged similarly to those in the receivers 5, 205, and 605 shown in FIGS. 8, 11, and 21.

When the reception signals 7 at the antennas $51_1$ to $51n$ are input from the configuration switching unit 753 under the control of the judging unit 752, the despreading-after-diversity-combining unit 754 processes the reception signals 7. Specifically, the antenna weight multipliers of the despreading-after-diversity combining unit 754 multiply the reception signal 7 of each of the antennas $51_1$ to $51n$ by an antenna weight, and the antenna signal combining unit combines the reception signals 7 multiplied by the antenna weights among the antennas $51_1$ to $51n$ to perform antenna diversity combining. Next, the sub-carrier weight multipliers of the despreading-after-diversity-combining unit 754 multiply the reception signal 7 on each sub-carrier multiplied by a spreading code by a sub-carrier weight, and the symbol combining units combine the reception signals multiplied by the sub-carrier weights over the spreading code duration to perform despreading.

The despreading-after-diversity-combining unit 754 inputs the combined reception signal to the serial/parallel converter 56. Thereafter, processes similar to those in the receiver 5 shown in FIG. 8 are performed to output data symbols.

The diversity-combining-after despreading unit 755 comprises a configuration for performing antenna diversity combining after despreading. The diversity-combining-after despreading unit 755 has a time/frequency converter, a spreading code generating unit, a plurality of spreading code multipliers, a weight controller, a plurality of antenna weight multipliers, an antenna signal combining unit, a plurality of sub-carrier weight multipliers, and a plurality of symbol combining units. The weight controller has an antenna weight controller and a sub-carrier weight controller. In the diversity-combining-after despreading unit 755, these features are arranged to allow antenna diversity combining to be performed after despreading. Specifically, the time/frequency converter, the spreading code generating unit, the plurality of spreading code multipliers, the weight controller, the plurality of antenna weight multipliers, the antenna signal combining unit, the plurality of sub-carrier weight multipliers, and the plurality of symbol combining units may be arranged similarly to those in the receivers 505 shown in FIG. 19.

When the reception signals 7 at the antennas $51_1$ to $51n$ are input from the configuration switching unit 753 under the control of the judging unit 752, the diversity-combining-after despreading unit 755 processes the reception signals 7. Specifically, the sub-carrier weight multipliers of the diversity-combining-after despreading unit 755 multiply the reception signal 7 on each sub-carrier multiplied by a spread code by sub-carrier weights, and the symbol combining units combine the reception signals 7 multiplied by the sub-carrier weights over the spreading code duration to perform dispreading. Next, the antenna weight multipliers multiply the reception signal of each of the antennas $51_1$ to $51n$ by antenna weights, and the antenna signal combining unit combines the reception signals 7 multiplied by the antenna weights among the antennas $51_1$ to $51n$ to perform antenna diversity combining. The diversity-combining-after despreading unit 755 inputs the combined reception signal 7 to the serial/parallel converter 56. Thereafter, processes similar to those in the receiver 5 shown in FIG. 8 are performed to output data symbols.

While the judging unit 752 controls the order of despreading and antenna diversity combining, this is not limiting the invention. The judging unit 752 may control the order of the processes involved in despreading, i.e., the process of multiplying a reception signal on each sub-carrier multiplied by a spreading code by a sub-carrier weight and combining over the spreading code duration (combining in despreading) and processes involved in antenna diversity combining, i.e., the process of multiplying a reception signal at each antenna by an antenna weight and combining among the antennas (combining in antenna diversity combining)/

(Method of Communication)

Figure 28:
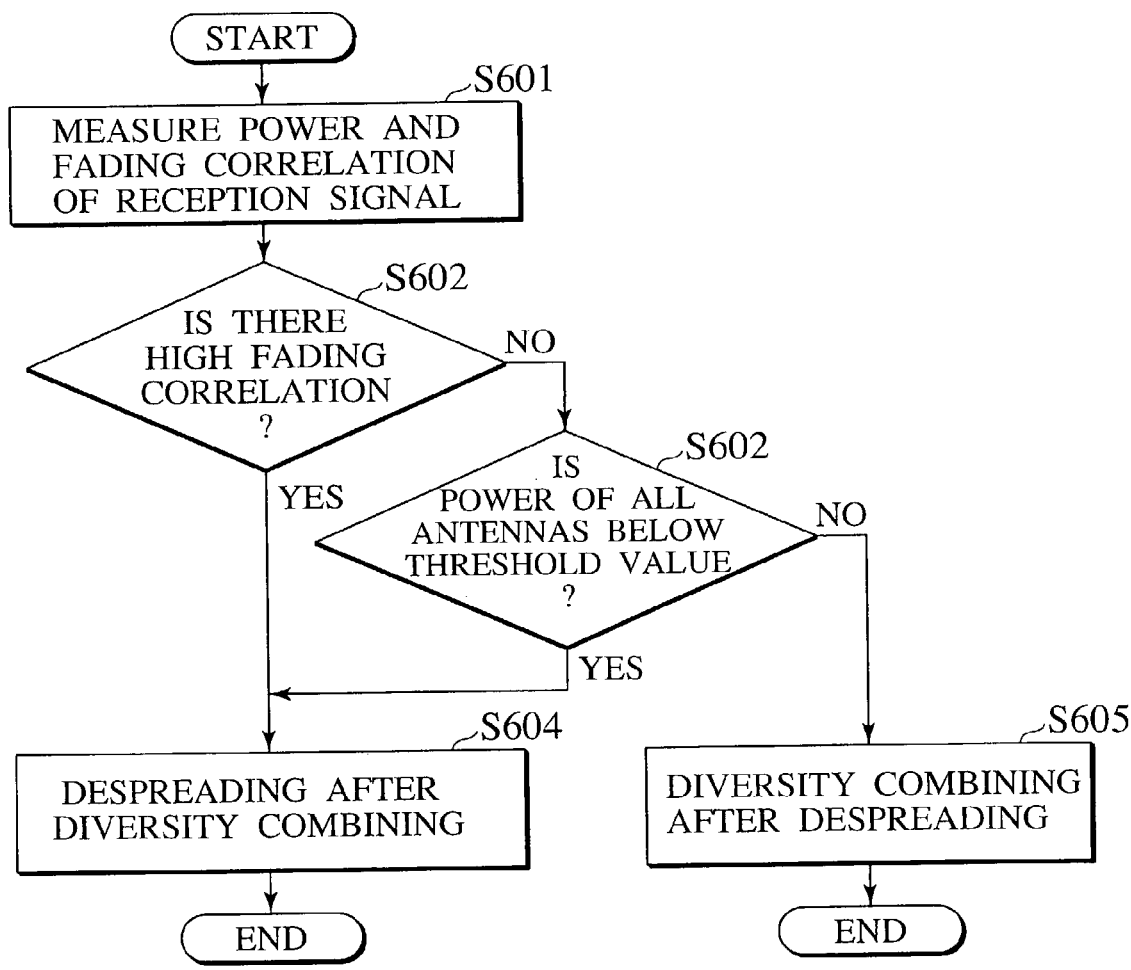
FIG. 28 is a flow chart showing a procedure of receiving a reception signal according to the sixth embodiment of the present invention.

A description will now be made on reception of a reception signal using the receiver 705 shown in FIG. 27. As shown in FIG. 28, the receiver 705 measures the power and fading correlation factor of each of reception signals 7 received by the antennas $51_1$ to $51n$ (S601). The receiver 705 compares measured values of the fading correlation factors of the reception signals 7 and a threshold value for fading correlation factors that is to be used as a criterion in determining the order of despreading and antenna diversity combining (S602). When the measured values of the fading correlation factors of the reception signals 7 are greater than the threshold value for the fading correlation factors at step S602, the receiver 705 judges that despreading is to follow antenna diversity combining. Then, the receiver 705 performs despreading after antenna diversity combining (S604).

When the measured values of the fading correlation factors of the reception signals 7 are equal to or smaller than the threshold value for the fading correlation factors at step S602, the receiver 705 compares measured values of the power of the reception signals 7 received by the antennas $51_1$ to $51n$ with the threshold value for power (s603). When the measured values of the power of the reception signals 7 received by all of the antennas $51_1$ to $51n$ are smaller than the threshold value for power at step S603, the receiver 705 judges that despreading is to follow antenna diversity combining. Then, the receiver 705 performs despreading after antenna diversity combining (S604). When any of the measured values of the power of the reception signals 7 received by all of the antennas $51_1$ to $51n$ is equal to or greater than the threshold value for power at step S603, the receiver 705 judges that antenna diversity combining is to follow despreading. Then, the receiver 705 performs antenna diversity combining after despreading (S605).

In the communication system, the receiver 705, and the method of communication as thus described, the judging unit 752 controls the order of despreading and antenna diversity combining based on the condition of the reception signals 7 measured by the reception signal condition measuring units 751. Under the control of the judging unit 752, the configuration switching unit 753 inputs the reception signals 7 from the antennas $51_1$ to $51n$ to the despreading-after-diversity-combining unit 754 and the diversity-combining-after-despreading unit 755. The despreading-after-diversity-combining unit 754 and the diversity-combining-after despreading unit 755 perform dispreading and antenna diversity combining in the order in accordance with the control of the judging unit 752.

Thus, the receiver 705 can perform despreading and antenna diversity combining in an adequate order depending on the condition of the reception signals 7 from the antennas $51_1$ to $51n$. Therefore, the receiver 705 can further improve signal transmission characteristics.

SEVENTH EMBODIMENT

A description will now be made on a communication system and a method of communication according to a seventh embodiment of the invention. The communication system of the seventh embodiment has a receiver 805 as shown in FIG. 29.

(Receiver)

Figure 29:
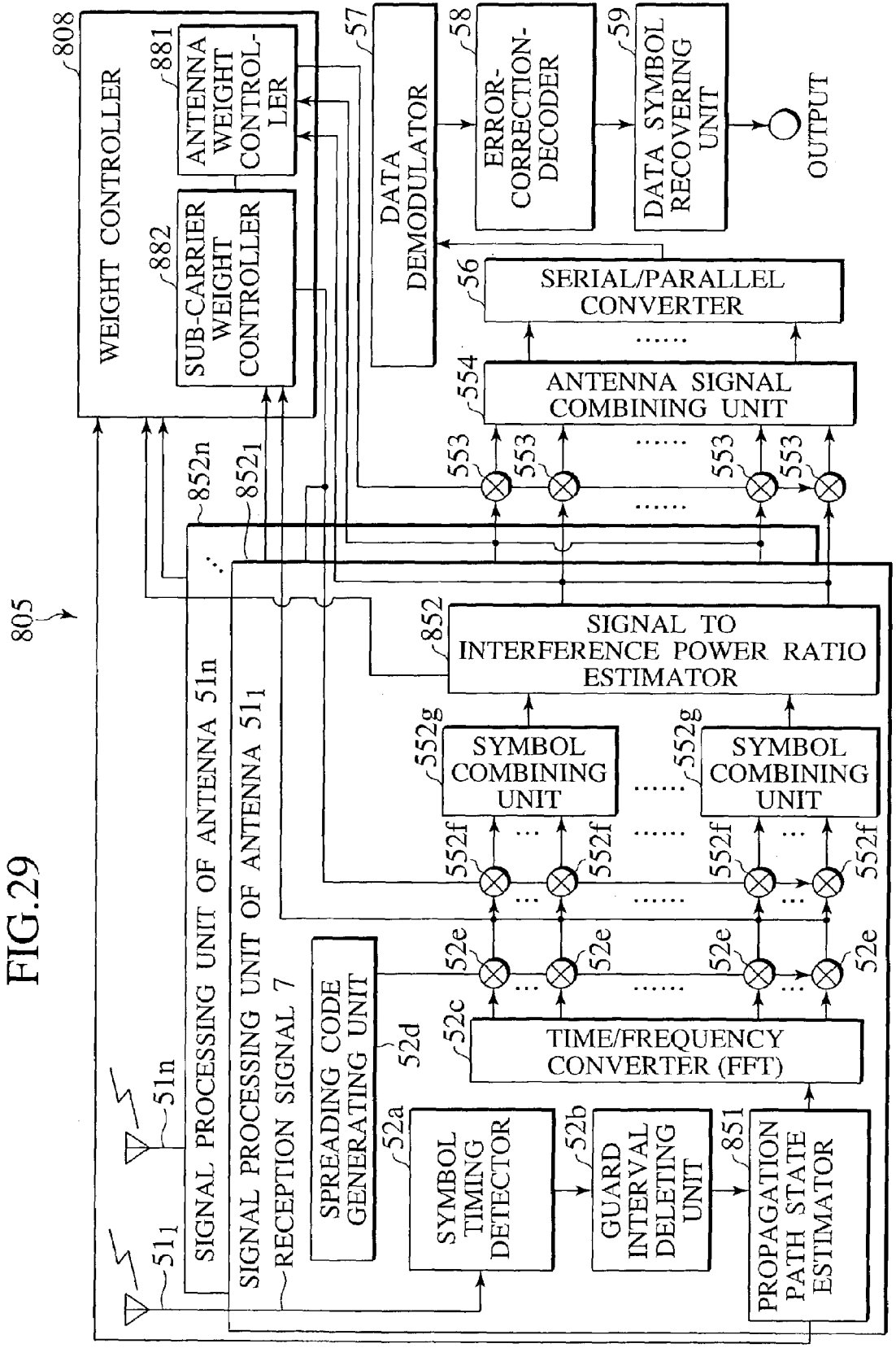
FIG. 29 is a block diagram illustrating the configuration of a receiver according to a seventh embodiment of the present invention.

As shown in FIG. 29, the receiver 805 has a plurality of antennas $51_1$ to 51n, a plurality of signal processing units $852_1$ to 852n, a weight controller 808, a plurality of antenna weight multipliers 553, an antenna signal symbol combining unit 554, a serial/parallel converter 56, a data demodulator 57, an error-correction-decoder 58, and a data symbol recovering unit 59. The signal processing units $852_1$ to 852n have a symbol timing detector 52a, a guard interval deleting unit 52b, a propagation path state estimator 851, a time/frequency converter 52c, a spreading code generating unit 52d, a plurality of spreading code multipliers 52e, a plurality of sub-carrier weight multipliers 552f, a plurality of symbol combining units 552g, and a signal to interference power ratio estimator 852.

The plurality of antennas $51_1$ to 51n, the plurality of antenna weight multipliers 553, the antenna signal combining unit 554, the serial/parallel converter 56, the data demodulator 57, the error-correction-decoder 58, the data symbol recovering unit 59, the symbol timing detector 52a, the guard interval deleting unit 52b, the time/frequency converter 52c, the spreading code generating unit 52d, the plurality of spreading code multipliers 52e, the plurality of sub-carrier weight multipliers 552f, and the symbol combining units 552g are substantially similar to those in the receiver 505 shown in FIG. 19. Therefore, they are indicated by like reference numerals in FIG. 29 and will not be described here.

After a transmission signal 6 is received by the plurality of antennas $51_1$ to 51n, processes similar to those in the receiver 505 shown in FIG. 19 are performed up to the removal of guard interval from reception signals 7 performed by the guard interval deleting units 52b.

The propagation path state estimators 851 estimates a propagation path state in which signals transmitted by a transmitter has been propagated or the propagation path state between the transmitter and the receiver 805. The propagation path state estimators 851 estimate delay spread, the number of paths, and the maximum Doppler frequency as a propagation path state. The propagation path state estimators 851 are provided in a quantity equal to the number of the antennas $51_1$ to 51n. In the receiver 805, the signal processing units $852_1$ to 852n associated with the antennas $51_1$ to 51n have propagation path state estimators 851 for estimating the state of paths in which reception signals 7 received by the antennas $51_1$ to 51n have been propagated. The propagation path state estimators 851 estimate the propagation path state in which the reception signals 7 received by the antennas $51_1$ to 51n have been propagated based on the reception signals 7 received by the antennas $51_1$ to 51n. The propagation path state estimators 851 input an estimated value of the propagation path state to the weight controller 808. The propagation path state estimators 851 input reception signals 7 to the time/frequency converters 52c.

After the time/frequency converters 52 demultiplex the reception signals 7 into the reception signal 7 on each sub-carrier, processes similar to those in the receiver 505 shown in FIG. 19 are performed up to the combining of the reception signal on each sub-carrier over the spreading code duration.

The signal to interference power ratio estimators 852 are interference state estimators for estimating the interference state between the reception signals 7. The signal to interference power ratio estimators 852 estimate the SIR of the reception signals 7 as the interference state of reception signal 7. The signal to interference power ratio estimators 852 estimate the SIR of reception signals 7 which have been combined over the spreading code duration by the symbol combining units 552g. The signal to interference power ratio estimator 852 are provided in a quantity equal to a number of the plurality of antennas $51_1$ to 51n. In the receiver 805, the signal processing units 8521 to 852n associated with the antennas 511 to 51n have signal to interference power ratio estimators 852 for estimating the SIR of the reception signals 7 received by the antennas $51_1$ to 51n. The signal to interference power ratio estimators 852 estimate the SIR of the reception signals 7 received by the antennas $51_1$ to 51n based on the reception signals 7 received by the antennas $51_1$ to 51n. The signal to interference power ratio estimators 852 input an estimated value of the SIR of the reception signals 7 to the weight controller 808. The signal to interference power ratio estimators 852 also input the reception signals 7 to the antenna weight multipliers 553.

The weight controller 808 comprises an antenna weight controller 881 and a sub-carrier weight controller 882. The weight controller 808 adjusts antenna weights and sub-carrier weights such that spreading codes for the plurality of data channels #1 to #n are orthogonal to each other. The weight controller 808 preferably adjusts the antenna weights and sub-carrier weights such that spreading codes for the plurality of data channels #1 to #n are orthogonal to each other and such that the SNR is increased. The weight controller 808 adjusts the antenna weights and sub-carrier weights to determine the antenna weights and sub-carrier weights separately.

The weight controller 808 adjusts the antenna weights and sub-carrier weights based on an estimated value of the propagation path state obtained by the propagation path state estimators 851. The weight controller 808 adjusts the antenna weights and sub-carrier weights based on the estimated value of SIR that is an estimated value of the interference state obtained by the signal to interference power ratio estimators 852.

First, the sub-carrier weight controller 882 determines sub-carrier weights using ORC, MRC, EGC, or MMSEC. The sub-carrier control portions 821 to 828 shown in FIG. 12D and FIGS. 13A to 13G maybe used as the sub-carrier weight controller 882. The sub-carrier weight controller 882 preferably determines sub-carrier weights using MMSEC and, in particular, it is preferable to use the sub-carrier weight controller 826 shown in FIG. 13E.

Next, the antenna weight controller 881 determines antenna weights based on the estimated value of the propagation path state. Specifically, the antenna weight controller 881 first controls a threshold value of the propagation path state to be used as a criterion for an adjustment of antenna weights and the sub-carrier weights. As a threshold value of the propagation path state to be used as a criterion for the adjustment of antenna weights and sub-carrier weights, the antenna weight controller 881 controls a threshold value be using as a criterion for determining antenna weights such that an antenna weight by which a reception signal 7 is multiplied becomes appropriate for a sub-carrier weight by which the reception signal 7 is previously multiplied.

The threshold value of the propagation path state is preferably controlled such that an antenna weight will be determined using EGC or MRC in the case of a poor propagation path state and such that an antenna weight will be proportionate to an estimated value of SIR in the case of a good propagation path state. For example, when a delay spread is estimated as the propagation path state, control is performed such that an antenna weight is determined using EGC or MRC in the case of an estimated delay spread greater than the threshold value and such that an antenna weight proportionate to an estimated value of SIR is provided in the case of an estimated delay spread equal to or smaller than the threshold value.

The antenna weight controller 881 preferably controls the threshold value for the propagation path state based on at least any of the type of modulation of the reception signals 7, the spreading code duration of the same, the number of multiplexed codes, and an other cell interference. The antenna weight controller 881 acquires the type of modulation, the spreading code duration, the number of multiplexed codes or the other cell interference from reception signals 7. The other cell interference is the quantity of interference with the receiver 805 from a cell other than the cell in which the receiver 805 resides.

In the case of a propagation path state parameter that indicates a better propagation path state as its value decreases, e.g., a delay spread, the antenna weight controller 881 decreases the threshold value for the propagation path state, the smaller the number of multi-values of the modulation method, the spreading code duration, the number of multiplexed codes, and the other cell interference. The threshold value for the propagation path state is increased, the greater the number of multi-values of the modulation method, the spreading code duration, the number of multiplexed codes, and the other cell interference.

Therefore, in the case of modulation methods involving a small number of multi-values such as QPSK and BPSK, the threshold value for the propagation path state decreases. In the case of modulation methods involving a large number of multi-values such as 16QAM and 64QAM, the threshold value for the propagation path state increases. On the contrary, in the case of a propagation path state parameter that indicates a better propagation path state as its value increases, the threshold value for the propagation path state is increased, the smaller the number of multi-values of the modulation method, the spreading code duration, the number of multiplexed codes, and the other cell interference. The threshold value for the propagation path state is decreased, the greater the number of multi-values of the modulation method, the spreading code duration, the number of multiplexed codes, and the other cell interference.

Since the antenna weight controller 881 thus controls the threshold value for the propagation path state to be used as a criterion for the adjustment of the antenna weights and sub-carrier weights based on the modulation method, the spreading code duration, the number of multiplexed codes, and the other cell interference, the antenna weights and sub-carrier weights can be adjusted in consideration to the modulation method, the spreading code duration, the number of multiplexed codes, and the other cell interference.

Next, the antenna weight controller 881 compares the controlled threshold value for the propagation path state with an estimated value of the propagation path state of each of the antennas $51_1$ to $51n$ input from the propagation path state estimators 851. The antenna weight controller 881 determines antenna weights based on the result of the comparison.

For example, when the propagation path state is undesirable, e.g., when an estimated value of delay spread is greater than the threshold value, the antenna weight controller 881 determines antenna weights using EGC or MRC. For example, the antenna weight controllers 812 and 813 shown in FIGS. 10B and 10C may be used as the antenna weight controller 881.

When the propagation path state is good, e.g., an estimated value of delay spread is equal to or smaller than the threshold value, the antenna weight controller 881 determines an antenna weight for each of the antennas $51_1$ to $51n$ proportionate to an estimated value of the SIR of each of the antennas $51_1$ to $51n$. The antenna weight controller 881 uses an estimated value of the SIR of each of the antennas $51_1$ to $51n$ input from the signal to interference power ratio estimator 852 to determine an antenna weight that is proportionate to the estimated value of SIR.

As thus described, the weight controller 808 adjusts an antenna weight by which the antenna weight multiplier 881 multiplies a reception signal 7 which has been multiplied by a sub-carrier weight previously determined by the sub-carrier weight controller 882 based on an estimated values of the propagation path state and an estimated value of the interference state such as SIR. Thus, the weight controller 808 can adjust antenna weights and sub-carrier weights based on estimated values of the propagation path state and an estimated value of the interference state such as SIR.

Thereafter, the antenna weight multipliers 553 multiply the reception signal 7 of each of the antennas $51_1$ to $51n$, which has been combined over the spreading code duration by an antenna weight. The antenna signal combining unit 554 combines the reception signals 7 multiplied by the antenna weights among the antennas $51_1$ to $51n$. The reception signal 7 combined by the antenna signal combining unit 554 is input to the serial/parallel converter 56. Thereafter, processes similar to those in the receiver 505 shown in FIG. 19 are performed to output data symbols.

The receiver 805 may include an interference state estimating unit for estimating CIR of reception signals or interference power of reception signals 7 as the interference state between reception signals 7 instead of the signal to interference power ratio estimators 852. In this case, when the propagation path state is good, e.g., when an estimated value of delay spread is equal to or smaller than a threshold value, the antenna weight controller 881 determines an antenna weight proportionate to an estimated value of CIR or an antenna weight proportionate to the inverse number of interference power. In the receiver 805, since antenna diversity combining is performed after despreading, sub-carrier weights are determined first. When the receiver performs despreading after antenna diversity combining, the antenna weight controller determines antenna weights first. Then, the antenna signal combining unit combines the reception signals 7 multiplied by the antenna weights among the antennas. The signal to interference power ratio estimators 852 estimate the SIR of the reception signals 7 combined among the antennas. Then, the sub-carrier weight controller adjusts the sub-carrier weights by which the reception signals 7 multiplied by antenna weight are to be multiplied based on an estimated value of the propagation path state and an estimated value of SIR.

The signal to interference power ratio estimators 852 may estimate the SIR of reception signals 7 on each sub-carrier before being combined over the spreading code duration by the symbol combining units 552g instead of the SIR of the reception signals 7 which have been combined over the spreading code duration by the symbol combining units 552g. Alternatively, the signal to interference power ratio estimators 852 may estimate the SIR of the reception signals 7 combined over the spreading code duration by the symbol combining units 552 and the SIR of the reception signal 7 on each sub-carrier before being combined. The weight controller 808 may compare the estimated SIR values before and after combining to control the antenna weights and sub-carrier weights using the SIR of higher accuracy.

In the receiver 805, the antenna weight controller 881 acquires the modulation method of the reception signals 7, the spreading code duration, the number of multiplexed codes, the other cell interference, an estimated value of propagation path state, and estimated values of the interference state such as SIR as antenna weight data. When the antenna weight controller 881 determines antenna weights using EGC or MMSEC, it acquires antenna weight data from the reception signal 7 from each of the antennas which has been combined over the spreading code duration by the symbol combining units 552g, similar to the receiver 505 shown in FIG. 19. The sub-carrier weight controller 882 can acquire sub-carrier weight data in the same way as done in the receiver 505 shown in FIG. 19.

(Method of Communication)

Figure 30:
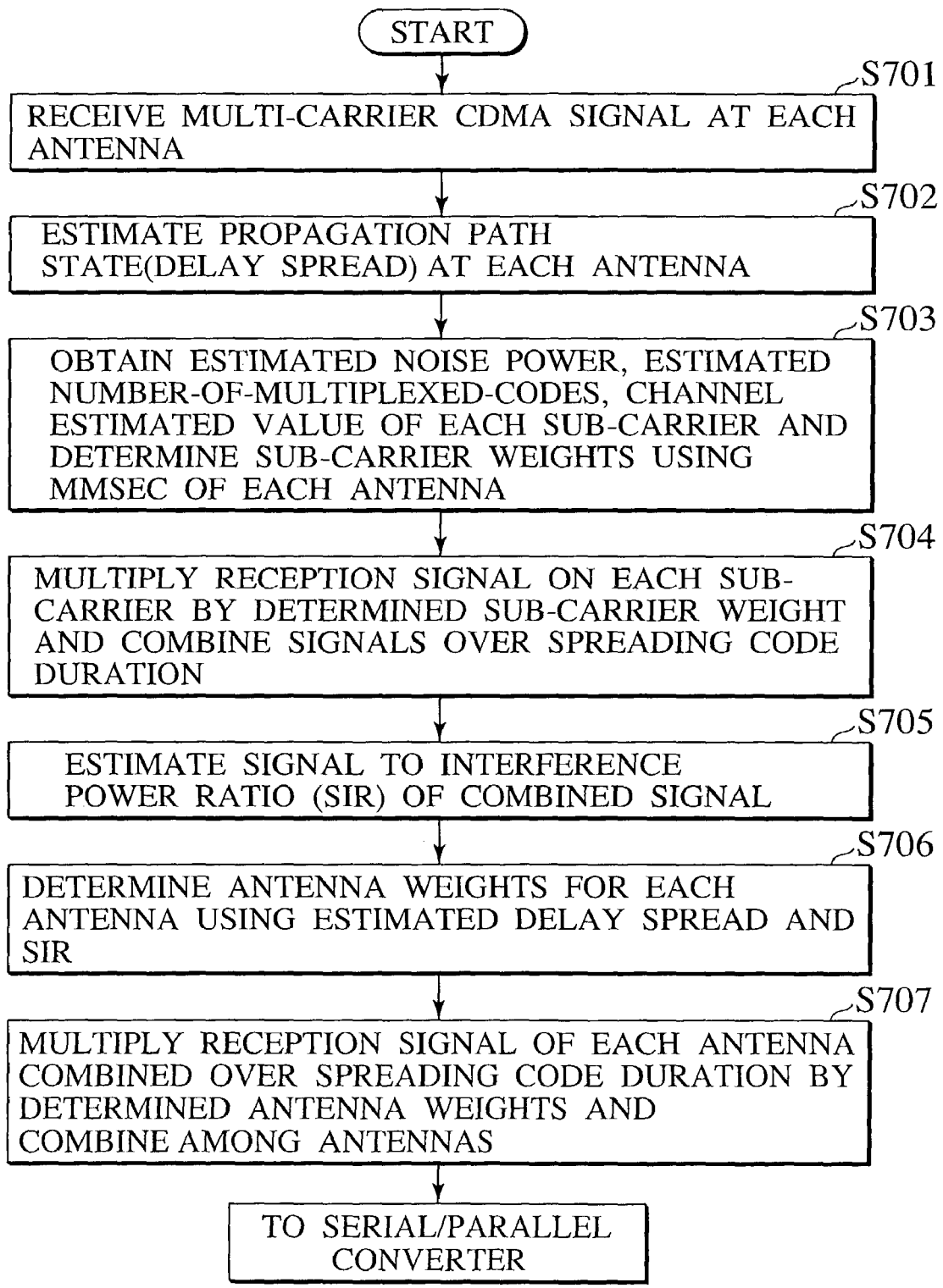
FIG. 30 is a flow chart showing a procedure of receiving a reception signal according to the seventh embodiment of the present invention.

A description will now be made on reception of a reception signal using the receiver 805 shown in FIG. 29. As shown in FIG. 30, the antennas 51$_1$ to 51n of the receiver 805 receive a transmission signal 6 that is a multi-carrier CDMA signal (S701). Next, based on reception signals 7 received by the antennas 51$_1$ to 51n, the receiver 805 estimates delay spread as the propagation path state in which the reception signals 7 received by the antennas 51$_1$ to 51n have been propagated (S702). Next, the receiver 805 obtains estimated value of noise power, an estimated value of the number of multiplexed codes, and a channel estimate on a sub-carrier-by-sub-carrier basis for each of the reception signals 7 received by the antennas 51$_1$ to 51n. Then, the receiver 805 determines sub-carrier weights using MMSEC (S703).

The receiver 805 multiplies the reception signal 7 on each sub-carrier received by the antennas 51$_1$ to 51n by a sub-carrier weight thus determined. The receiver 805 combines the reception signals over the spreading code duration (S704). The receiver 805 estimates the SIR of the reception signal 7 combined over the spreading code duration (S705). The receiver 805 determines an antenna weight for each of the antennas 51$_1$ to 51n using the estimated delay spread and SIR (S706). Specifically, the receiver 805 compares a threshold value for delay spread and the estimated value of delay spread. When the estimated value of delay spread is greater than the threshold value for delay spread, the receiver 805 determines the antenna weight using EGC or MRC. When the estimated value of delay spread is equal to or smaller than the threshold value for delay spread, the receiver 805 determines antenna weights proportionate to estimated values of the SIR of the reception signals 7 at the antennas 51$_1$ to 51n. Finally, the receiver 805 multiplies the reception signal 7 at each of the antennas 51$_1$ to 51n that have been combined over the spreading code duration by an antenna weight thus determined to perform combining among the antennas 51$_1$ to 51n (S707).

The communication system, the receiver 805, and the method of communication as thus described can provide advantages substantially similar to those of the communication system 1, receiver 5, and the method of communication shown in FIGS. 2, 8, and 15. Further, the propagation path state estimators 851 estimate the propagation path state. The signal power to interference power ratio estimating portion 852 estimates the interference state such as the SIR of the reception signals 7. The weight controller 808 adjusts the antenna weights and sub-carrier weights based on estimated values of the propagation path state and estimated values of the interference state. Thus, the receiver 805 can adequately determine the antenna weights and sub-carrier weights based on the propagation path state and the interference state between the reception signals 7. This allows the receiver 805 to improve the signal transmission characteristics further. The receiver 805 can be provided with a relatively simple configuration and can be easily controlled with a small control delay.

EIGHTH EMBODIMENT

A description will now be made on a communication system and a method of communication according to an eighth embodiment of the invention. The communication system of the eighth embodiment has a receiver 905 as shown in FIG. 31.

(Receiver)

Figure 31:
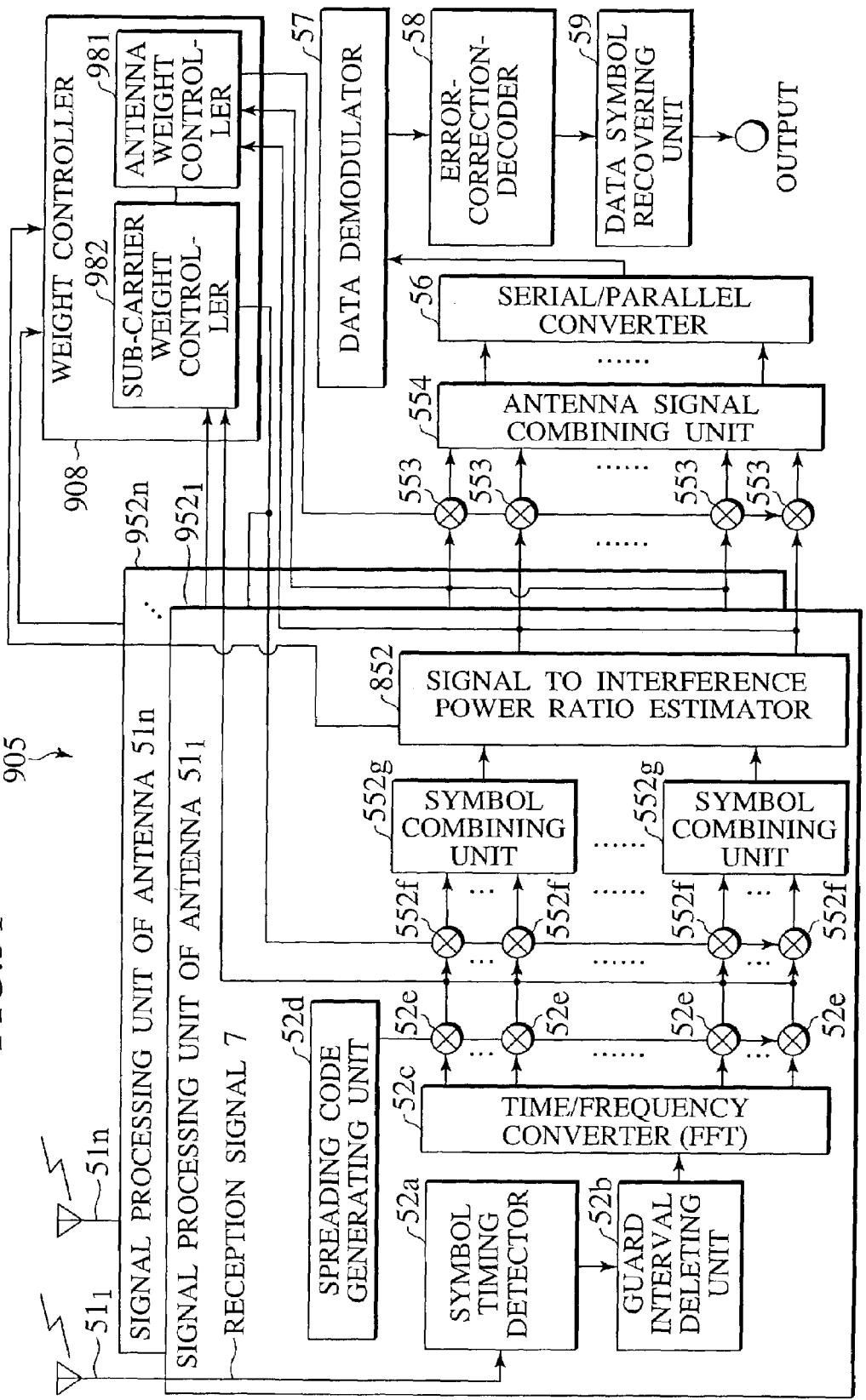
FIG. 31 is a block diagram illustrating the configuration of a receiver according to an eighth embodiment of the present invention.

As shown in FIG. 31, the receiver 905 has a plurality of antennas 51$_1$ to 51n, a plurality of signal processing units 952$_1$ to 952n, a weight controller 908, a plurality of antenna weight multipliers 553, an antenna signal combining unit 554, a serial/parallel converter 56, a data demodulator 57, an error-correction-decoder 58, and a data symbol recovering unit 59. The signal processing units 952$_1$ to 952n have a symbol timing detector 52a, a guard interval deleting unit 52b, a time/frequency converter 52c, a spreading code generating unit 52d, a plurality of spreading code multipliers 52e, a plurality of sub-carrier weight multiplier 552f, a plurality of symbol combining portions 552g, and a signal to interference power ratio estimator 852.

The plurality of antennas 51$_1$ to 51n, the plurality of antenna weight multipliers 553, the antenna signal combining unit 554, the serial/parallel converter 56, the data demodulator 57, the error-correction-decoder 58, the data symbol recovering unit 59, the symbol timing detectors 52a, the guard interval deleting units 52b, the time/frequency converters 52c, the spreading code generating units 52d, the plurality of spreading code multiplier 52e, the plurality of sub-carrier weight multiplier 552f, and the symbol combining units 552g are substantially similar to those in the receiver 505 shown in FIG. 19. The signal to interference power ratio estimators 852 are substantially similar to those in the receiver 805 shown in FIG. 29. Therefore, they are indicated by like reference numerals in FIG. 31 and will not be described here.

After a transmission signal 6 is received by the plurality of antennas 51$_1$ to 51n, processes similar to those in the receiver 505 shown in FIG. 19 are performed up to the combining of reception signals 7 over the spreading code durations at the symbol combining units 552g. Next, the signal to interference power ratio estimators 852 estimate the SIR of the reception signals 7 combined over the spreading code durations by the symbol combining units 552g and input estimated SIR values of the reception signals 7 to the weight controller 908. The signal to interference power ratio estimators 852 input the reception signals 7 to the antenna weight multipliers 553.

The weight controller 908 has an antenna weight controller 981 and a sub-carrier weight controller 982. The weight controller 908 adjusts antenna weights and sub-carrier weights such that the spreading codes for the plurality of data channels #1 to #n are orthogonal to each other. The weight controller 908 preferably adjusts antenna weights and sub-carrier weights such that the spreading codes for the plurality of data channels #1 to #n are orthogonal to each other and such that a great SNR is achieved. The weight controller 908 adjusts antenna weights and sub-carrier weights and determines antenna weights and sub-carrier weights separately.

The weight controller 908 adjusts antenna weights and sub-carrier weights based on the estimated values of SIR obtained by the signal to interference power ratio estimators 852. First, the sub-carrier weight controller 982 determines sub-carrier weights using ORC, MRC, EGC, or MMSEC. The sub-carrier weight controllers 821 to 828 shown in FIG. 12D, and FIGS. 13A to 13G may be used as the sub-carrier weight controller 982. The sub-carrier weight controller 982 preferably determines sub-carrier weights using MMSEC and, in particular, it is preferable to use the sub-carrier weight controller 826 shown in FIG. 13E.

Then, the antenna weight controller 981 determines antenna weights based on estimated values of SIR. Specifically, the antenna weight controller 981 first controls a threshold value for SIR differences between the antennas to be used as a criterion for the adjustment of antenna weights and sub-carrier weights. As a threshold value for SIR differences between the antennas to be used as a criterion for the adjustment of antenna weights and sub-carrier weights, the antenna weight controller 981 controls a threshold value that be used as a criterion in determining antenna weights such that antenna weights by which reception signals 7 are multiplied will be appropriate for sub-carrier weights by which the reception signals have been previously multiplied. The threshold value for SIR differences between antennas is preferably controlled such that antenna weights are determined using EGC or MRC in the case of small SIR differences among the antennas and such that antenna weights are proportionate to SIR in the case of great SIR differences among the antennas.

The antenna weight controller 981 preferably controls the threshold value for SIR differences between the antennas based on at least any of the modulation method of the reception signals 7, the spreading code duration, the number of multiplexed codes, and the other cell interference. The antenna weight controller 981 acquires the modulation method, the spreading code duration, the number of multiplexed codes or the other cell interference from the reception signals 7. The antenna weight controller 981 decreases the threshold value for SIR differences between the antennas, the smaller the number of multi-values of the modulation method, the spreading code duration, the number of multiplexed codes, and the other cell interference. It increases the threshold value, the greater the number of multi-values of the modulation method, the spreading code duration, the number of multiplexed codes, and the other cell interference.

Since the antenna weight controller 981 controls the threshold value for SIR differences between the antennas to be used as a criterion for the adjustment of antenna weights and sub-carrier weights based on the modulation method, the spreading code duration, the number of multiplexed codes, and the other cell interference as thus described, antenna weights and sub-carrier weights can be adjusted in consideration to the modulation method, the spreading code duration, the number of multiplexed codes, and the other cell interference.

Next, the antenna weight controller 981 calculates differences between SIRs of the antennas $51_1$ to $51n$ based on an estimated SIR value of each of the antennas $51_1$ to $51n$ input from the signal to interference power ratio estimators 852. For example, the antenna weight controller 981 calculates the difference between the maximum and minimum estimated SIR values of the antennas $51_1$ to $51n$. Next, the antenna weight controller 981 compares the controlled threshold value for SIR differences between the antennas with the calculated differences between estimated SIR values of the antennas $51_1$ to $51n$. The antenna weight controller 981 determines antenna weights based on the result of the comparison.

The antenna weight controller 981 determines antenna weights using EGC or MRC when calculated differences between estimated SIR values of the antennas $51_1$ to $51n$ are equal to or smaller than the threshold value for SIR differences between the antennas. When a calculated difference between estimated SIR values of the antennas $51_1$ to $51n$ is in the excess of the threshold value for SIR differences between the antennas, the antenna weight controller 981 determines an antenna weight for each of the antennas $51_1$ to $51n$ that is proportionate to the estimated SIR value of the respective one of the antennas $51_1$ to $51n$.

For example, when the calculated difference between the maximum and minimum estimated SIR values of the antennas $51_1$ to $51n$ is equal to or smaller than the threshold value for SIR difference between the antennas, the antenna weight controller 981 determines antenna weights using EGC or MRC. For example, the antenna weight controllers 812 and 813 shown in FIGS. 10B and 10C may be used as the antenna weight controller 981. When the calculated difference between the maximum and minimum estimated SIR values of the antennas $51_1$ to $51n$ is in the excess of the threshold value for SIR difference between the antennas, the antenna weight controller 981 determines an antenna weights for each of the antennas $51_1$ to $51n$ that is proportionate to the estimated SIR value of the respective one of the antennas $51_1$ to $51n$.

Thus, the weight controller 908 adjusts antenna weights to be multiplied at the antenna controller 981 on the reception signals 7 which have been multiplied by sub-carrier weights determined by the sub-carrier weight controller 982 in advance, based on estimated SIR values. This allows the weight controller 908 to adjust antenna weights and sub-carrier weights based on estimated SIR values.

Thereafter, the antenna weight multipliers 553 multiply the reception signal 7 at each of the antennas $51_1$ to $51n$, which has been combined over the spreading code duration by an antenna weight. The antenna signal combining unit 554 combines the reception signals 7 multiplied by the antenna weights among the antennas $51_1$ to $51n$. The reception signal 7 combined by the antenna signal combining unit 554 is input to the serial/parallel converter 56. Processes similar to those in the receiver 505 shown in FIG. 19 are thereafter performed to output data symbols.

The receiver 905 may have an interference state estimator for estimating CIRs of the reception signals 7 or interference power of the reception signals 7 as the interference state between the reception signals 7 instead of the signal to interference power ratio estimators 852. In this case, the antenna weight controller 981 calculates CIR differences or differences in interference power among the antennas $51_1$ to $51n$. When calculated values of CIR differences or interference power differences between the antennas $51_1$ to $51n$ are equal to or smaller than a threshold value for CIR differences among the antennas or a threshold value for differences in interference power among the antennas, the antenna weight controller 981 determines antenna weights using EGC or MRC. When a calculated values of CIR differences or interference power differences among the antennas $51_1$ to $51n$ is in the excess of the threshold value for CIR differences among the antennas or the threshold value for differences in interference power among the antennas, the antenna weight controller 981 determines antenna weights proportionate to estimated CIR values or antenna weights proportionate to the inverse numbers of interference power.

In the receiver 905, sub-carrier weights are determined first because antenna diversity combining is performed after despreading. When the receiver performs despreading after antenna diversity combining, the antenna weight controller determines antenna weights first. Then, the antenna signal combining unit combines reception signals 7 multiplied by the antenna weights among the antennas. The signal to interference power ratio estimators 852 estimate SIRs of the reception signals 7 which have been combined among the antennas. The sub-carrier weight controller adjusts the sub-carrier weights by which the reception signals 7 multiplied by the antenna weights are to be multiplied based on estimated SIR values.

In the receiver 905, the antenna weight controller 981 acquires the modulation method of the reception signals 7, the spreading code duration, the number of multiplexed codes, the other cell interference, and estimated values of the interference state such as SIR as antenna weight data. When the antenna weight controller 981 determines antenna weights using EGC or MRC, it acquires antenna weight data from the reception signal 7 at each antenna which have been combined over the spreading code duration by the symbol combining units 552g as done in the receiver 505 shown in FIG. 19. The sub-carrier weight controller 982 may acquire sub-carrier weight data as done in the receiver 505 shown in FIG. 19.

(Method of Communication)

Figure 32:
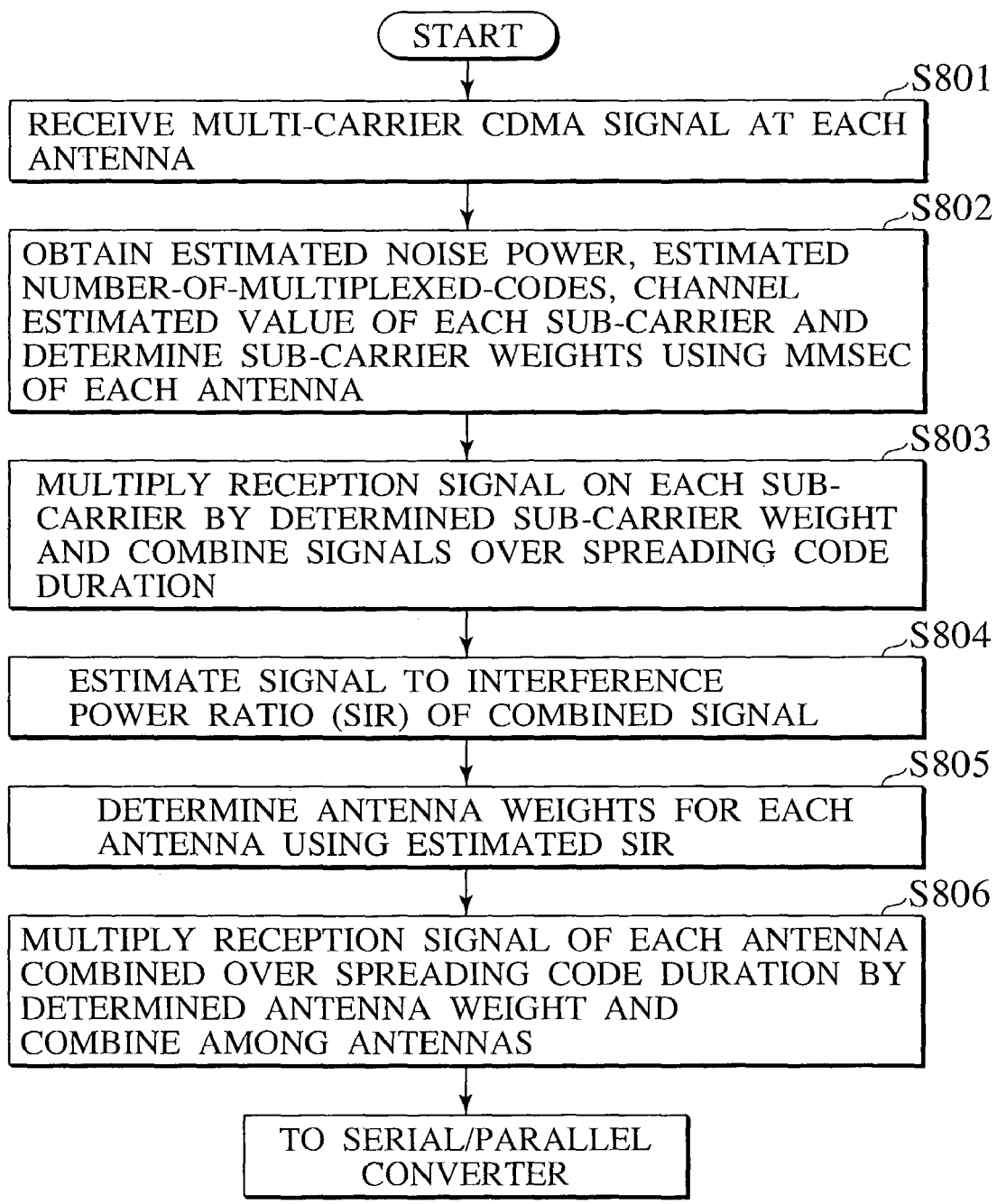
FIG. 32 is a flow chart showing a procedure of receiving a reception signal according to the eighth embodiment of the present invention.

A description will now be made on reception of a reception signal using the receiver 905 shown in FIG. 31. As shown in FIG. 32, the receiver 905 performs steps S801 to S804. Steps S801 to S804 are substantially similar to steps S701 and S703 to S705 shown in FIG. 30.

Next, the receiver 905 determines an antenna weight for each of the antennas $51_1$ to 51n using the estimated SIRs (S805). Specifically, the receiver 905 compares the threshold value for SIR differences among the antennas and the difference between the estimated SIR values among the antennas. When the difference between the estimated SIR values between the antennas is equal to or smaller than the threshold value, the receiver 905 determines antenna weights using EGC or MRC. When the difference between the estimated SIR values among the antennas is in the excess of the threshold value, the receiver 905 determines an antenna weights that is proportionate to the estimated SIR value of the reception signal 7 at each of the antennas $51_1$ to 51n. Finally, the receiver 905 multiplies the reception signal 7 at each of the antennas $51_1$ to 51n that has been combined over the spreading code duration by the antenna weight thus determined and performs combining among the antennas $51_1$ to 51n (S806).

The communication system, the receiver 905, and the method of communication as thus described can provide advantages substantially similar to those of the communication system 1, receiver 5, and the method of communication shown in FIGS. 2, 8, and 15. Further, the signal to interference power ratio estimators 852 estimate SIRs of the reception signals. The weight controller 908 adjusts the antenna weights and the sub-carrier weights based on the estimated SIR values. Therefore, the receiver 905 can determine adequate antenna weights and sub-carrier weights depending on the interference state such as the SIRs of the reception signals 7. This allows the receiver 905 to improve the signal transmission characteristics further. Since the receiver 905 adjusts antenna weights and sub-carrier weights using estimated SIR values of the reception signals 7 which have been combined over the spreading code duration, adjustment can be performed with high accuracy. The receiver 905 can be provided with a relatively simple configuration and can be easily controlled with a small control delay.

NINTH EMBODIMENT

A description will now be made on a communication system and a method of communication according to a ninth embodiment of the invention. The communication system of the ninth embodiment has a receiver 105 as shown in FIG. 33.

(Receiver)

Figure 33:
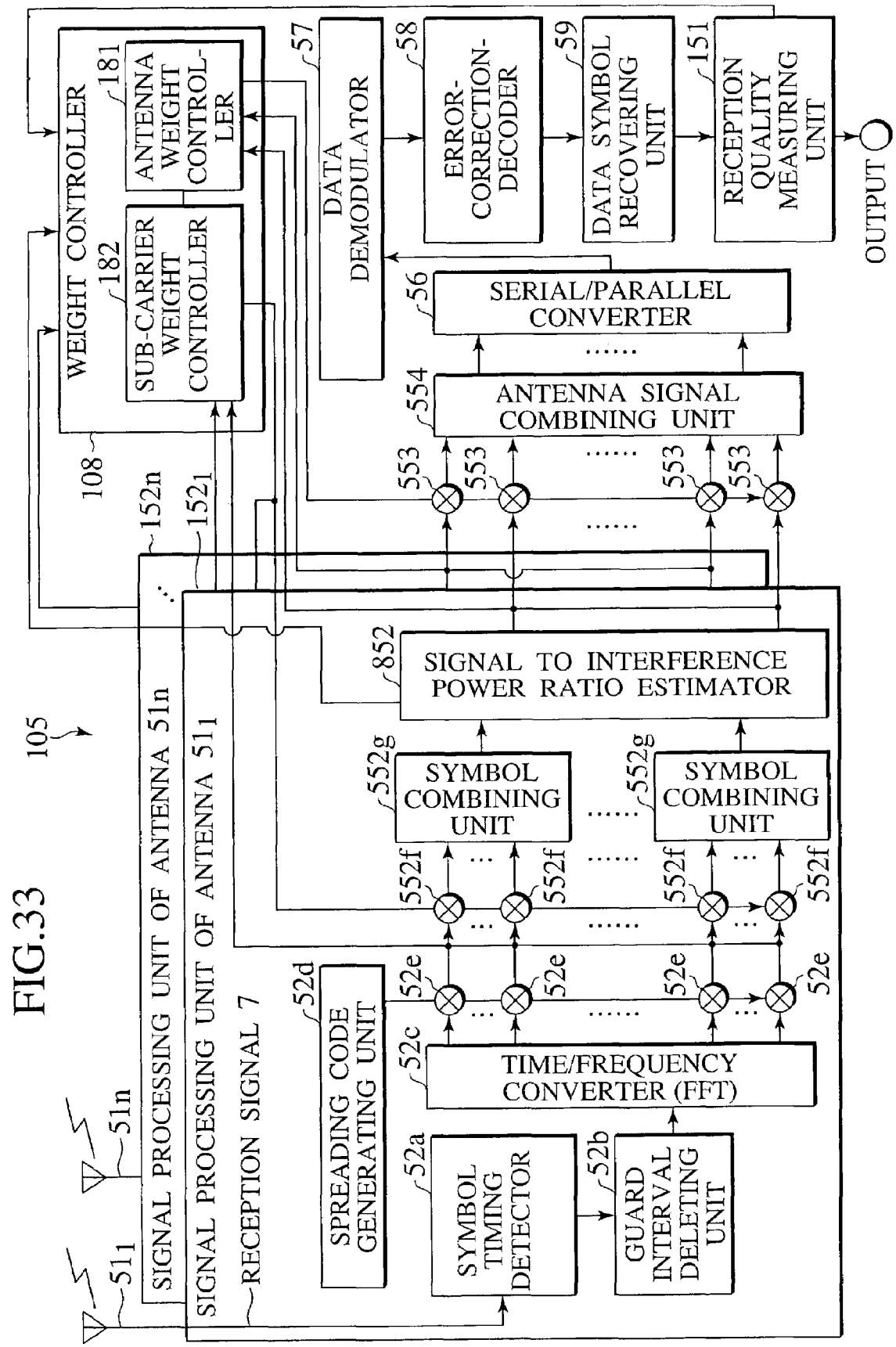
FIG. 33 is a block diagram illustrating the configuration of a receiver according to a ninth embodiment of the present invention.

As shown in FIG. 33, the receiver 105 has a plurality of antennas $51_1$ to 51n, a plurality of signal processing units $152_1$ to 152n, a weight controller 108, a plurality of antenna weight multipliers 553, an antenna signal combining unit 554, a serial/parallel converter 56, a data demodulator 57, an error-correction-decoder 58, a data symbol recovering unit 59, and a reception quality measuring unit 151. The signal processing units $152_1$ to 152n have a symbol timing detector 52a, a guard interval deleting unit 52b, a time/frequency converter 52c, a spreading code generating unit 52d, a plurality of spreading code multiplier 52e, a plurality of sub-carrier weight multiplier 552f, a plurality of symbol combining units 552g and a signal to interference power ratio estimators 852.

The plurality of antennas $51_1$ to 51n, the plurality of antenna weight multipliers 553, the antenna signal combining unit 554, the serial/parallel converter 56, the data demodulator 57, the error-correction-decoder 58, the data symbol recovering unit 59, the symbol timing detector 52a, the guard interval deleting unit 52b, the time/frequency converter 52c, the spreading code generating unit 52d, the plurality of spreading code multipliers 52e, the plurality of sub-carrier weight multiplier 552f, and the symbol combining units 552g are substantially similar to those in the receiver 505 shown in FIG. 19. The signal to interference power ratio estimators 852 are substantially similar to those in the receiver 805 shown in FIG. 29. Therefore, they are indicated by like reference numerals in FIG. 33 and will not be described here.

After a transmission signal 6 is received by the plurality of antennas $51_1$ to 51n, processes similar to those in the receiver 505 shown in FIG. 19 are performed up to the combining of reception signals 7 over the spreading code duration at the symbol combining units 552g. Next, the signal to interference power ratio estimators 852 estimate SIRs of the reception signals 7 combined over the spreading code duration at the symbol combining units 552g and input estimated SIR values of the reception signals 7 to the weight controller 108. The signal to interference power ratio estimators 852 input the reception signals 7 to the antenna weight multipliers 553.

Thereafter, the antenna weight multipliers 553 multiply the reception signal 7 at each of the antennas $51_1$ to 51n combined over the spreading code duration by an antenna weight. The antenna signal combining unit 554 combines the reception signals 7 multiplied by the antenna weights among the antennas $51_1$ to 51n. The reception signal 7 combined by the antenna signal combining unit 554 is input to the serial/parallel converter 56. Thereafter, processes similar to those in the receiver 505 shown in FIG. 19 until the data symbol recovering unit 59 is reached. The data symbol recovering unit 59 recovers data symbols which have been subjected to an error-correction-decoding process into a state in which they can be output to an output apparatus and inputs them to the reception quality measuring unit 151.

The reception quality measuring unit 151 measures the reception quality of the data symbols recovered from the reception signals 7. The reception quality measuring unit 151 measures the bit error rate (BER) and frame error rate (FER) of the data symbols as the reception quality of the data symbols. The reception quality measuring unit 151 inputs measured values of the data symbols to the weight controller 108. The reception quality measuring unit 151 also outputs the data symbols.

The weight controller 108 has an antenna weight controller 181 and a sub-carrier weight controller 182. The weight controller 108 adjusts antenna weights and sub-carrier weights such that the spreading codes for the plurality of data channels #1 to #n are orthogonal to each other. The weight controller 108 preferably adjusts antenna weights and sub-carrier weights such that the spreading codes for the plurality of data channels #1 to #n are orthogonal to each other and such that a great SNR will be achieved. The weight controller 108 adjusts antenna weights and sub-carrier weights and determines antenna weights and sub-carrier weights separately.

The weight controller 108 adjusts the antenna weights and sub-carrier weights based on the measured value of reception quality obtained by the reception quality measuring unit 151. The weight controller 108 adjusts the antenna weights and sub-carrier weights based on the estimated SIR values obtained by the signal to interference power ratio estimators 852.

First, the sub-carrier weight controller 182 determines sub-carrier weight using ORC, MRC, EGC, or MMSEC. The sub-carrier weight controllers 821 to 828 shown in FIG. 12D, and FIGS. 13A to 13G may be used as the sub-carrier weight controller 182. The sub-carrier weight controller 182 preferably determines sub-carrier weights using MMSEC and, in particular, it is preferable to use the sub-carrier weight controller 826 shown in FIG. 13.

Next, the antenna weight controller 181 determines antenna weights based on a measured value of reception quality. Specifically, the antenna weight controller 181 first controls a threshold value for variations of reception quality that is to serve as a criterion for the adjustment of antenna weights and sub-carrier weights. As a threshold value for variations of reception quality to serve as a criterion for the adjustment of antenna weights and sub-carrier weights, the antenna weight controller 181 controls a threshold value that uses as a criterion in determining antenna weights such that antenna weights by which reception signals 7 are multiplied will be appropriate for sub-carrier weights by which the reception signals 7 have been previously multiplied.

When a greater increase of reception quality indicates a greater reduction of reception quality, the threshold value for variations of reception quality is preferably controlled such that antenna weights different from the previously determined antenna weights can be determined in the case of a great increase of reception quality and such that the same antenna weights as the previously determined antenna weights can be determined in the case of a small increase of reception quality. For example, when BER or FER is measured as reception quality, control is performed such that antenna weights different from the previously determined antenna weights can be determined in the case of an increase of BER or FER in the excess of the threshold value and such that the same antenna weights as the previously determined antenna weights can be determined in the case of an increase of BER or FER equal to or smaller than the threshold value. On the contrary, when a greater decrease of reception quality indicates a greater reduction of reception quality, the threshold value for variations of reception quality is preferably controlled such that antenna weights different from the previously determined antenna weights can be determined in the case of a great decrease of reception quality and such that the same antenna weights as the previously determined antenna weights can be determined in the case of a small increase of reception quality.

The antenna weight controller 181 preferably controls the threshold value for variations of reception quality based on at least any of the modulation method, the spreading code duration, the number of multiplexed codes, or the other cell interference of reception signals 7. The antenna weight controller 181 acquires the spreading code duration, the number of multiplexed codes, or the other cell interference of reception signals 7. When a greater increase of reception quality indicates a greater reduction of reception quality as BER or FER does, the antenna weight controller 181 sets a smaller threshold value for a increase of reception quality, the smaller the number of multi-values in the modulation method, the spreading code duration, the number of multiplexed codes, or the other cell interference. It sets a greater threshold value for variations of reception quality, the greater the number of multi-values in the modulation method, the spreading code duration, the number of multiplexed codes, or the other cell interference. On the contrary, when a greater decrease of reception quality indicates a greater reduction of reception quality, the antenna weight controller 181 sets a smaller threshold value for a decrease of reception quality, the smaller the number of multi-values in the modulation method, the spreading code duration, the number of multiplexed codes, or the other cell interference. It sets a greater threshold value for a decrease of reception quality, the greater the number of multi-values in the modulation method, the spreading code duration, the number of multiplexed codes, or the other cell interference.

Thus, the antenna weight controller 181 controls the threshold value for variations of reception quality to serve as a criterion for the adjustment of antenna weights and sub-carrier weights based on the modulation method, the spreading code duration, the number of multiplexed codes, or the other cell interference, which allows antenna weights and sub-carrier weights to be adjusted in consideration to the modulation method, the spreading code duration, the number of multiplexed codes, or the other cell interference. The antenna weight controller 181 also holds a reference value for reception quality.

Next, the antenna weight controller 181 compares the reference value of reception quality with a measured value of reception quality of data symbols input from the reception quality measuring unit 151. When the measured value of reception quality satisfies the reference value for reception quality, the antenna weight controller 181 determines antenna weights that are the same as the previously determined antenna weights. When the measured value of reception quality does not satisfy the reference value for reception quality, the antenna weight controller 181 calculates the variation of the measured value of reception quality. The antenna weight controller 181 holds the previous measured value of reception quality and calculates the difference between a measured value of reception quality newly input from the reception quality measuring unit 151 and the previous value.

Next, the antenna weight controller 181 compares the controlled threshold value for variations of reception quality and the calculated variation of the measured value of reception quality. The antenna weight controller 181 determines antenna weights based on the result of the comparison. When an increase of a measured value of reception quality such as BER or FER is greater than the threshold value for variations of reception quality, the antenna weight controller 181 determines antenna weights that are different from the previously determined antenna weights. For example, when the previous antenna weights have been determined using EGC or MRC, the antenna weight controller 181 uses an estimated SIR value for each of the antennas $51_1$ to $51n$ input from the signal to interference power ratio estimators 852 and determines an antenna weight proportionate to the estimated SIR value. When the previous antenna weights have been determined in proportion to estimated SIR values, the antenna weight controller 181 determines antenna weights using EGC or MRC.

When an increase of a measured value of reception quality such as BER or FER is equal to or smaller than the threshold value for variations of reception quality, the antenna weight controller 181 determines antenna weights that are the same as the previously determined antenna weights. For example, when the previous antenna weights have been determined using EGC or MRC, the antenna weight controller 181 determines antenna weights using EGC or MRC. When the previous antenna weights have been determined in proportion to estimated SIR values, the antenna weight controller 181 uses an estimated SIR value for each of the antennas $51_1$ to $51n$ input from the signal to interference power ratio estimators 852 and determines an antenna weight proportionate to the estimated SIR value.

Thus, the weight controller 108 adjusts the antenna weights by which the antenna weight controller 181 is to multiply reception signals which have been multiplied by the sub-carrier weights determined by the sub-carrier weight controller 182 in advance, based on a measured value of reception quality of data symbols or estimated SIR values. This allows the weight controller to adjust antenna weights and sub-carrier weights based on a measured value of reception quality of data symbols or estimated SIR values.

The receiver 105 may have an interference state estimator for estimating CIRs of the reception signals 7 or interference power of the reception signals 7 as the interference state between the reception signals 7 instead of the signal to interference power ratio estimators 852. In this case, the antenna weight controller 181 determines antenna weights that are proportionate to estimated CIR values or antenna weights that are proportionate to the inverse number of interference power.

In the receiver 105, sub-carrier weights are determined first because antenna diversity combining is performed after despreading. When the receiver performs despreading after antenna diversity combining, the antenna weight controller determines antenna weights first. Then, the antenna signal combining unit combines reception signals 7 multiplied by the antenna weights among the antennas. The signal to interference power ratio estimators 852 estimate SIRs of the reception signals 7 which have been combined among the antennas. The sub-carrier weight controller adjusts the sub-carrier weights by which the reception signals 7 multiplied by the antenna weights are to be multiplied based on a measured value of reception quality of data symbols or estimated SIR values.

In the receiver 105, the antenna weight controller 181 acquires the modulation method of the reception signals 7, the spreading code duration, the number of multiplexed codes, the other cell interference, and estimated values of the interference state such as SIR as antenna weight data. When the antenna weight controller 181 determines antenna weights using EGC or MRC, it acquires antenna weight data from the reception signal 7 at each antenna which has been combined over the spreading code duration by the symbol combining units 552g as done in the receiver 505 shown in FIG. 19. The sub-carrier weight controller 182 may acquire sub-carrier weight data as done in the receiver 505 shown in FIG. 19.

(Method of Communication)

Figure 34:
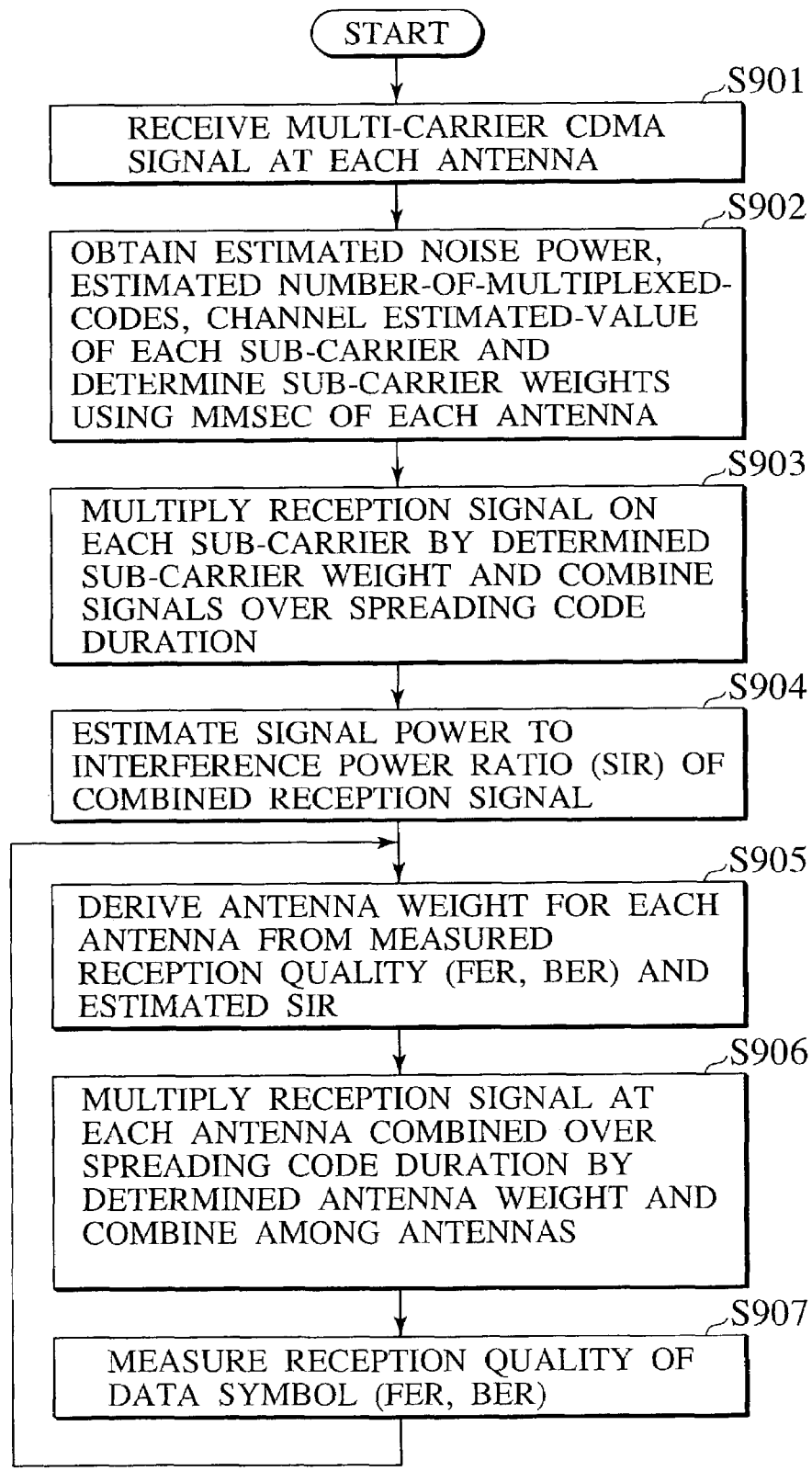
FIG. 34 is a flow chart showing a procedure of receiving a reception signal according to the ninth embodiment of the present invention.

A description will now be made on reception of a reception signal using the receiver 105 shown in FIG. 33. As shown in FIG. 34, the receiver 105 performs steps S901 to S904. Steps S901 to S904 are substantially similar to steps S801 and S804 shown in FIG. 32.

Next, he receiver 105 determines an antenna weight for each of the antennas $51_1$ to $51n$ using the measured value of reception quality of data symbols such as BER or FER and the estimated SIRs (S905). Specifically, the receiver 105 compares the reference value for reception quality and the measured value of reception quality of data symbols. When the measured value of reception quality satisfies the reference value for reception quality, the receiver 105 determines antenna weights that are the same as the previously determined antenna weights. When the measured value of reception quality does not satisfy the reference value for reception quality, the receiver 105 compares the threshold value for variations of reception quality and the variation of the measured value of reception quality.

When an increase of the measured value of reception quality such as BER or FER is greater than the threshold value for variations of reception quality, the receiver 105 determines antenna weights that are different from the previously determined antenna weights. When an increase of the measured value of reception quality such as BER or FER is equal to or smaller than the threshold value for variations of reception quality, the antenna weight controller 181 determines antenna weights that are the same as the previously determined antenna weights.

Then, the receiver 105 multiplies the reception signal 7 at each of the antennas $51_1$ to $51n$ by which has been combined over the spreading code duration by an antenna weight thus determined and performs combining among the antennas $51_1$ to $51n$ (S906). Finally, the receiver 105 measures the reception quality of data symbols, which have been recovered through despreading (S907). The measured value of reception quality obtained at step S07 is used at step S905 to determine the next antenna weights.

The communication system, the receiver 105, and the method of communication as thus described can provide advantages substantially similar to those of the communication system 1, receiver 5, and the method of communication shown in FIGS. 2, 8, and 15. Further, the reception quality measuring unit 151 measures reception quality of recovered data symbols. The signal to interference power ratio estimators 552 estimate SIRs of the reception signals 7. The weight controller 108 adjusts the antenna weights and the sub-carrier weights based on the estimated values of reception quality of data symbols and the estimated SIR values. Therefore, the receiver 105 can determine adequate antenna weights and sub-carrier weights depending on the reception quality of data symbols and the interference state such as the SIRs of the reception signals 7. This allows the receiver 105 to improve the signal transmission characteristics further. Especially, since the receiver 105 can determine antenna weights and sub-carrier weights with feedback of reception quality of recovered data symbols, antenna weights and sub-carrier weights can be more adequately determined.

TENTH EMBODIMENT

Simulations made by the inventors will now be described. Despreading is performed after antenna diversity combining using the receiver 5 shown in FIG. 8. Antenna diversity combining is performed using the maximum ratio combining method, and despreading is performed in three approaches, i.e., MMSEC, EGC, and ORC (the schemes are hereinafter expressed by MRC(Div.)/MMSEC(Desp.), MRC (Div.)/EGC(Desp.), and MRC(Div.)/ORC(Desp.), respectively). Antenna diversity combining is performed using the equal gain combining method, and despreading is performed in two approaches, i.e., MMSEC and EGC (the schemes are hereinafter expressed by EGC(Div)/MMSEC(Desp.) and EGC(Div)/EGC(Desp.). Antenna diversity is performed after despreading using the receiver 505 shown in FIG. 19. Despreading is performed using MMSEC, and antenna diversity combining is performed using the equal gain combining method (the scheme is hereinafter expressed by MMSEC(Desp.)/EGC(Div.). For the purpose of comparison, despreading is performed simply using MMSEC and EGC. The simulations are carried out based on a spreading factor SF=32, total number of paths L=24, and a delay spread s=0.29 μsec.

Figure 35:
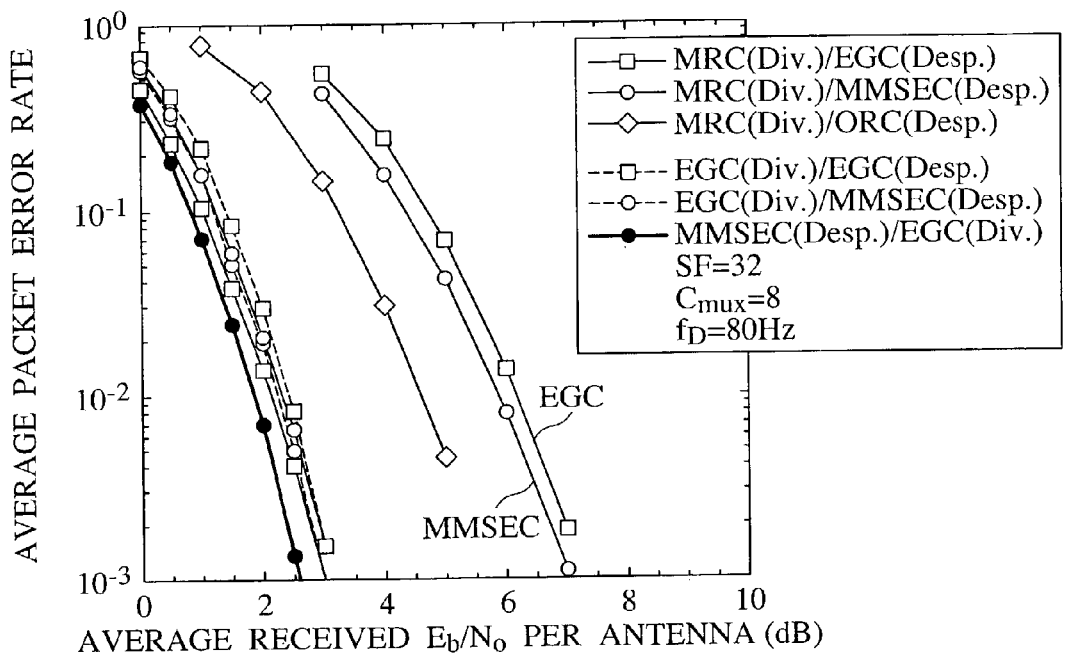
FIG. 35 is a graph showing an average packet error rate characteristic of a simulation according to a tenth embodiment of the present invention.

FIG. 35 shows average received $E_b/N_0$ (signal power to noise power density ratio per data bit) versus average packet error rate when the number of multiplexed codes Cmux=8. As shown in FIG. 35, the best characteristics are achieved by the MMSEC(Desp.)/EGC(Div.) scheme in which despreading is performed using the receiver 505 shown in FIG. 19 according to MMSEC and antenna diversity is thereafter performed according to the equal gain combining method. With the receiver 505, inter-code interference attributable to destruction of orthogonality between spreading codes can be reduced at each antenna independently by using despreading employing MMSEC at each antenna. The subsequent antenna diversity combining allows combining that reflects differences in inter-code interference among the antennas.

Compared to the simple despreading using MMSEC and EGC, high characteristics are achieved by any of the MRC (Div.)/MMSEC(Desp.), MRC(Div.)/EGC(Desp.),MRC(Div.)/ORC(Desp.), EGC(Div.)/MMSEC(Desp.), and EGC(Div.)/EGC(Desp.) schemes.

Figure 36:
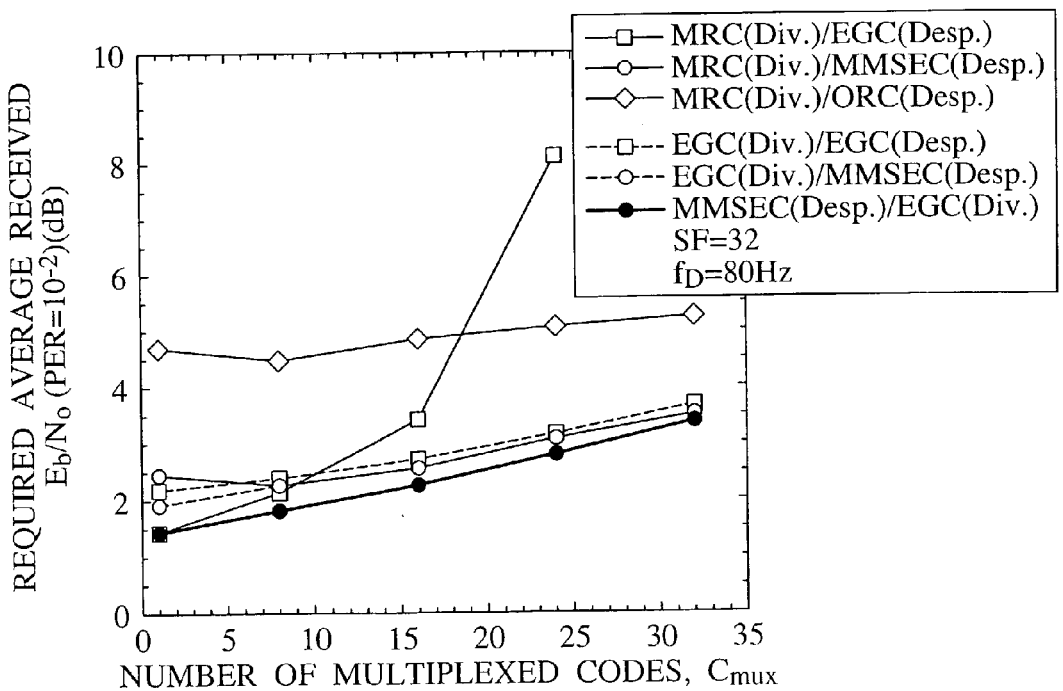
FIG. 36 is a graph showing a characteristic of the simulation according to the tenth embodiment of the present invention associated with a number of multiplexed codes.

FIG. 36 shows required average received $E_b/N_0$ per antenna characteristics that satisfy an average packet error rate=$10^{-2}$ relative to the number of multiplexed codes Cmux. As shown in FIG. 36, excellent characteristics can be achieved regardless of the number of multiplexed codes even when there is a great delay spread by the MMSEC (Desp./EGC(div.) scheme in which despreading is performed using the receiver 505 shown in FIG. 19 according to MMSEC and antenna diversity combining is thereafter performed according to EGC. Relatively good characteristics are achieved by the EGC(Div.)/EGC(Desp.), and EGC (Div.)/MMSEC(Desp.) schemes in which despreading is performed after antenna diversity combining.

In the region of Cmux<8 where the number of multiplexed codes is small, the MRC(Div.)/EGC(Desp.) scheme provides good characteristics in which despreading is performed after antenna diversity combining using the receiver 5 shown in FIG. 8. As apparent from the above, when the receiver 5 is used it is preferable to use MRC that provides a great diversity gain for diversity combining and to perform despreading using EGC for which no consideration is needed about noise power variation at each sub-carrier attributable to MRC in a region there is only small influence of inter-code interference.

Figure 37:
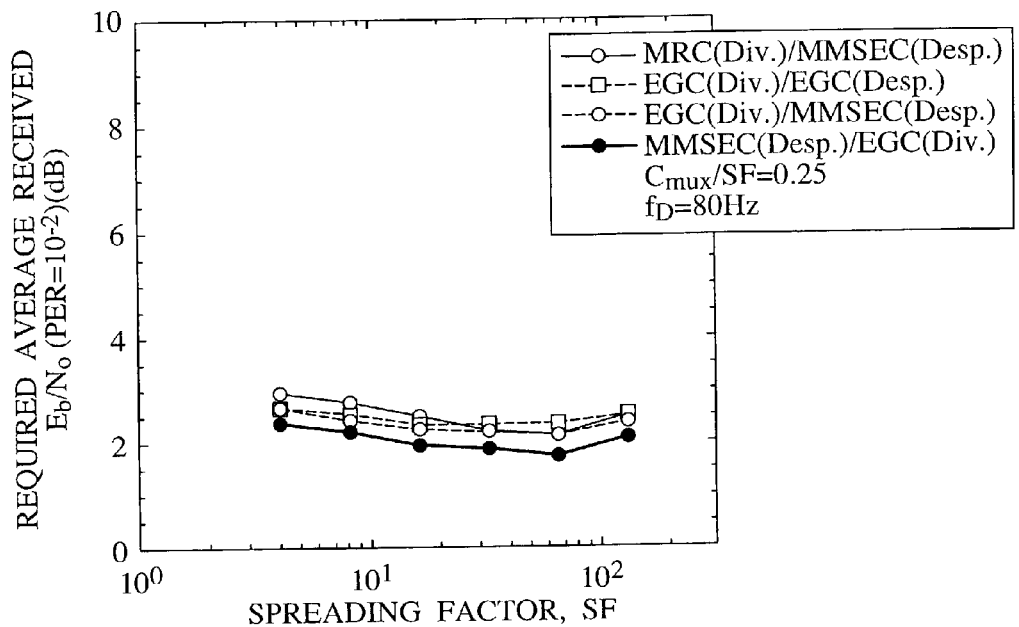
FIG. 37 is a graph showing a characteristic of the simulation according to the tenth embodiment of the present invention associated with a spreading factor.

FIG. 37 shows required average received $E_b/N_0$ characteristics that satisfy an average packet error rate=$10^{-2}$ relative to a spreading factor SF. FIG. 37 shows characteristics achieved when the number of multiplexed codes normalized by the spreading factor (Cmux/SF) is 1. As shown in FIG. 37, excellent characteristics can be achieved regardless of the spreading factor by the MMSEC(Desp.)/EGC(div.) scheme in which despreading is performed using the receiver 505 shown in FIG. 19 according to MMSEC and antenna diversity is thereafter performed using EGC. When the number of multiplexed codes is thus small compared to the spreading factor, significant improvement of characteristics is achieved by the MMSEC(Desp.)/EGC(Div.) scheme which is carried out using the receiver 505 and which reflects differences in inter-code interference among the antennas.

Figure 38:
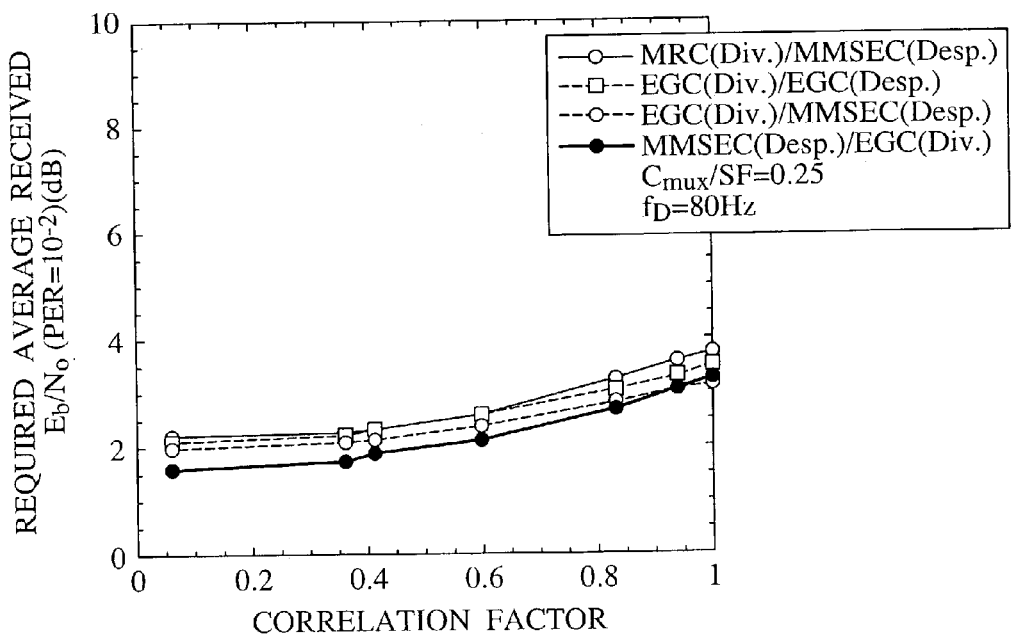
FIG. 38 is a graph showing a characteristic of the simulation according to the tenth embodiment of the present invention associated with a correlation factor.

FIG. 38 shows required average received $E_b/N_0$ characteristics that satisfy an average packet error rate=$10^{-2}$ relative to a fading correlation coefficient between antennas. FIG. 38 shows characteristics achieved when the number of multiplexed codes Cmux=8. As shown in FIG. 38, good characteristics can be achieved when the correlation coefficient is small with the MMSEC(Desp.)/EGC(div.) scheme in which despreading is performed using the receiver 505 shown in FIG. 19 according to MMSEC and antenna diversity is thereafter performed using EGC.

[Modification]

Figure 39:
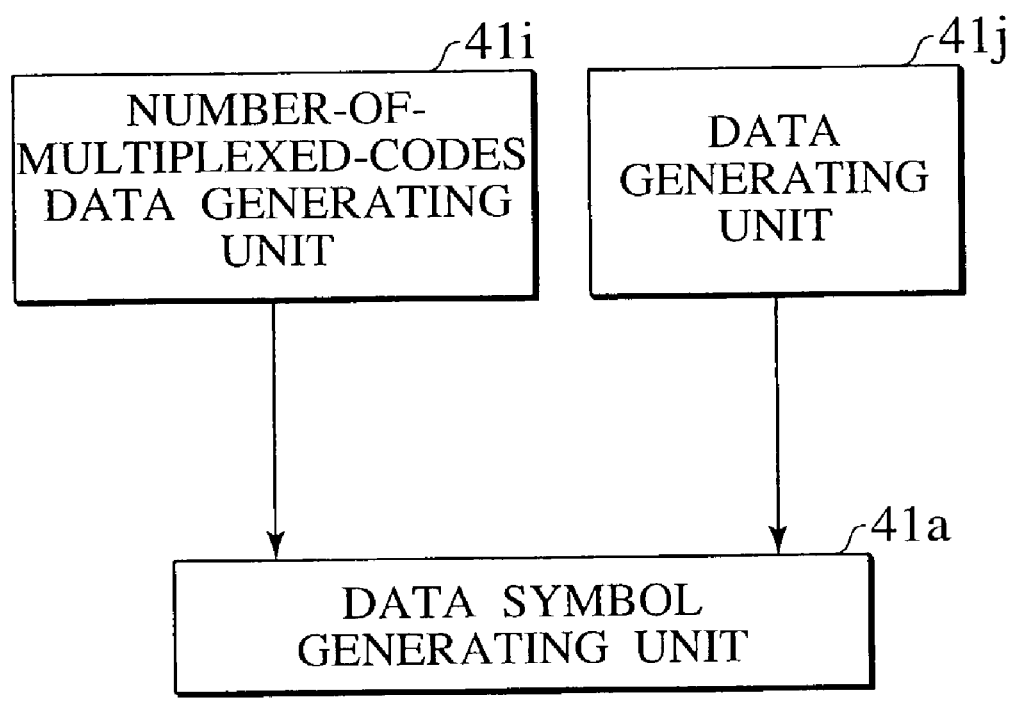
FIG. 39 illustrates a number of multiplexed codes data generating unit and a data generating unit according to a modification of the present invention.

The invention is not limited to the above-described first through tenth embodiments and may be modified in various ways. For example, a transmitter may have a number of multiplexed codes data generating unit 41*i* and a data generating unit 41*j* as shown in FIG. 39. The number of multiplexed codes data generating unit 41*i* generates data concerning the number of multiplexed codes corresponding to the number of the data channels #1 to #n that are to be code-division-multiplexed (hereinafter referred to as number of multiplexed codes data) and inputs it to the data symbol generating unit 41*a*.

The data generating unit 41*j* generates data other than the number of multiplexed codes data, i.e., data such as images and data such as sound transmitted to a terminal apparatus and inputs the same to the data symbol generating unit 41*a*. Based on the number of multiplexed codes data input from the number of multiplexed codes data generating unit 41*i* and the data other than the number of multiplexed codes data input from the data generating unit 41*j*, the data symbol generating unit 41*a* generates data symbols including both of the data. The transmitter transmits a data signal including the number of multiplexed codes data to a receiver.

Therefore, the receiver can acquire the number of multiplexed codes data from the data signal included in a reception signal 7. Since this eliminates the need for the process of estimating the number of multiplexed codes at the sub-carrier weight controllers 826 and 829 shown in FIGS. 13E and 26 and consequently eliminates the need for the number of multiplexed codes estimating parts 826*c* and 829*c*, the process and configuration can be simplified. The sub-carrier weight controllers 826 and 829 may obtain sub-carrier weights using an actual exact value of the number of multiplexed codes instead of an estimated value. This allows the sub-carrier weight controllers 826 and 829 to obtain more adequate sub-carrier weights.

Figure 40:
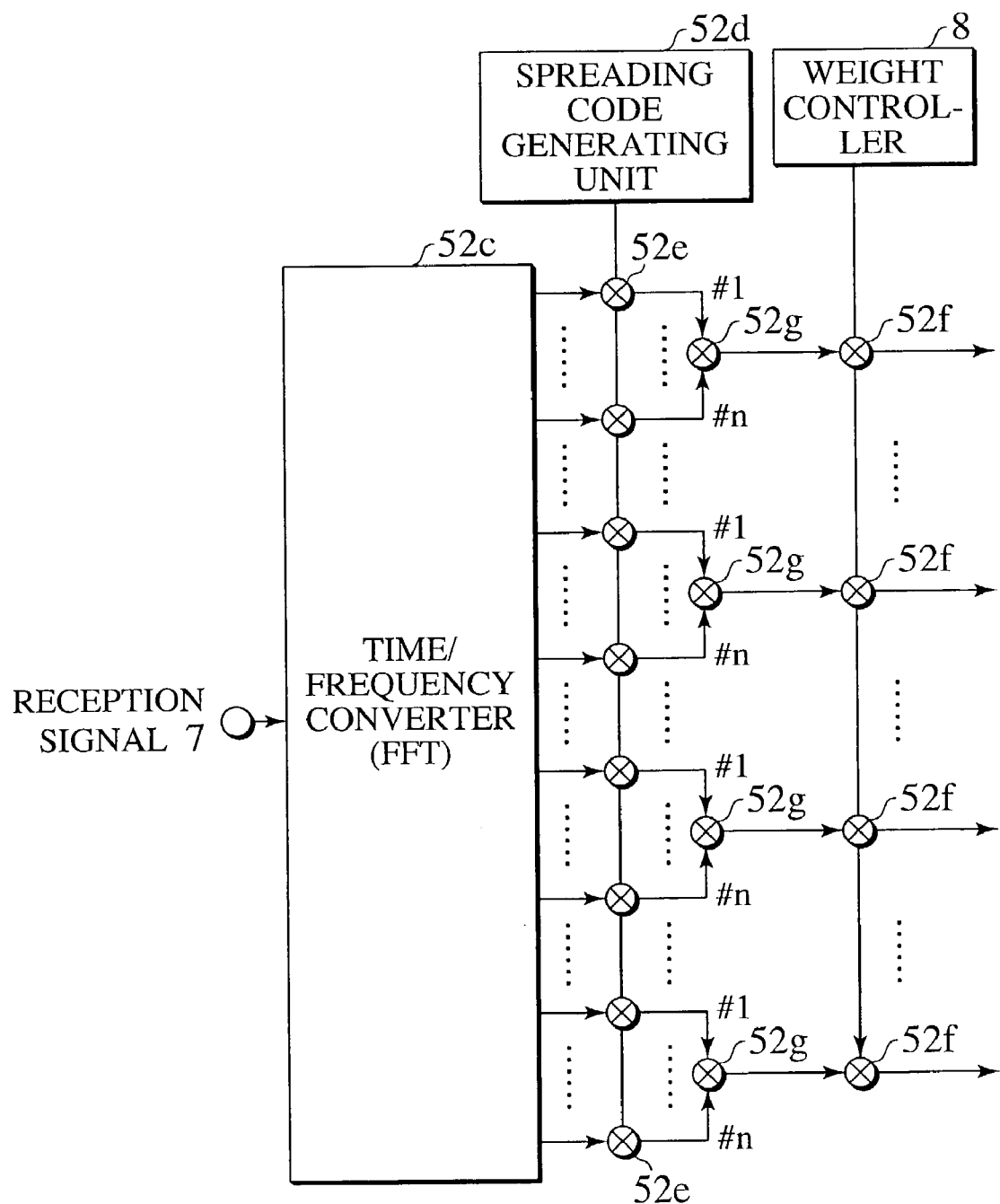
FIG. 40 illustrates a process of averaging a reception signal in the direction of a frequency axis according to the modification of the present invention.

As shown in FIG. 40, a receiver may have a plurality of adding units 52g. Each spreading code multiplier 52e inputs a reception signal 7 on the respective sub-carrier multiplied by a spreading code to the adding unit 52g. Let us assume that the reception signals 7 on a sub-carrier-by-sub-carrier basis input to the adding unit 52g are numbered by #1 to #n (n is a natural number). Each of the adding units 52g adds the reception signals 7 #1 to #n on a sub-carrier-by-sub-carrier basis input thereto and averages them in the direction of frequency. The adding units 52g input the added reception signals 7 to the antenna weight multiplier 52f. The number of reception signals 7 on a sub-carrier-by-sub-carrier basis input to the adding units 52g may be different for each adding unit 52g.

Thus, the adding units 52g add the reception signals 7 which have been multiplied by spreading codes at the spreading code multiplier 52e and average them in the direction of frequency. Therefore, after the reception signals 7 are added and averaged in the direction of frequency by the adding units 52g, the antenna weight multiplier, sub-carrier weight multiplier, and collective weight multiplier can multiply the reception signals 7 by sub-carrier weights, antenna weights, and collective weights. Therefore, the weight controller can reduce the numbers of antenna weights, sub-carrier weights, and collective weights to be determined, which makes it possible to reduce the load of the process for determining weights. Since the number of the antenna weight multipliers, sub-carrier weight multipliers, and collective weight multipliers can be reduced, the configuration of the receiver can be simplified. Especially, when the sub-carrier weight controllers 827 to 829 shown in FIGS. 13F, 13G, and 26 are provided as sub-carrier weight controllers and sub-carrier weights are obtained using adaptive algorithm, the amount of calculations carried out by the weight updating parts 827c, 828d, and 829g increases with the number of sub-carrier weights (this applies to the weight controller 308 when it has such features). Therefore, a reduction of the number of sub-carriers to be determined makes it possible to reduce the amount of calculations carried out by the weight updating parts 827c, 828d, and 829g and to reduce the load on them.

Figure 41:
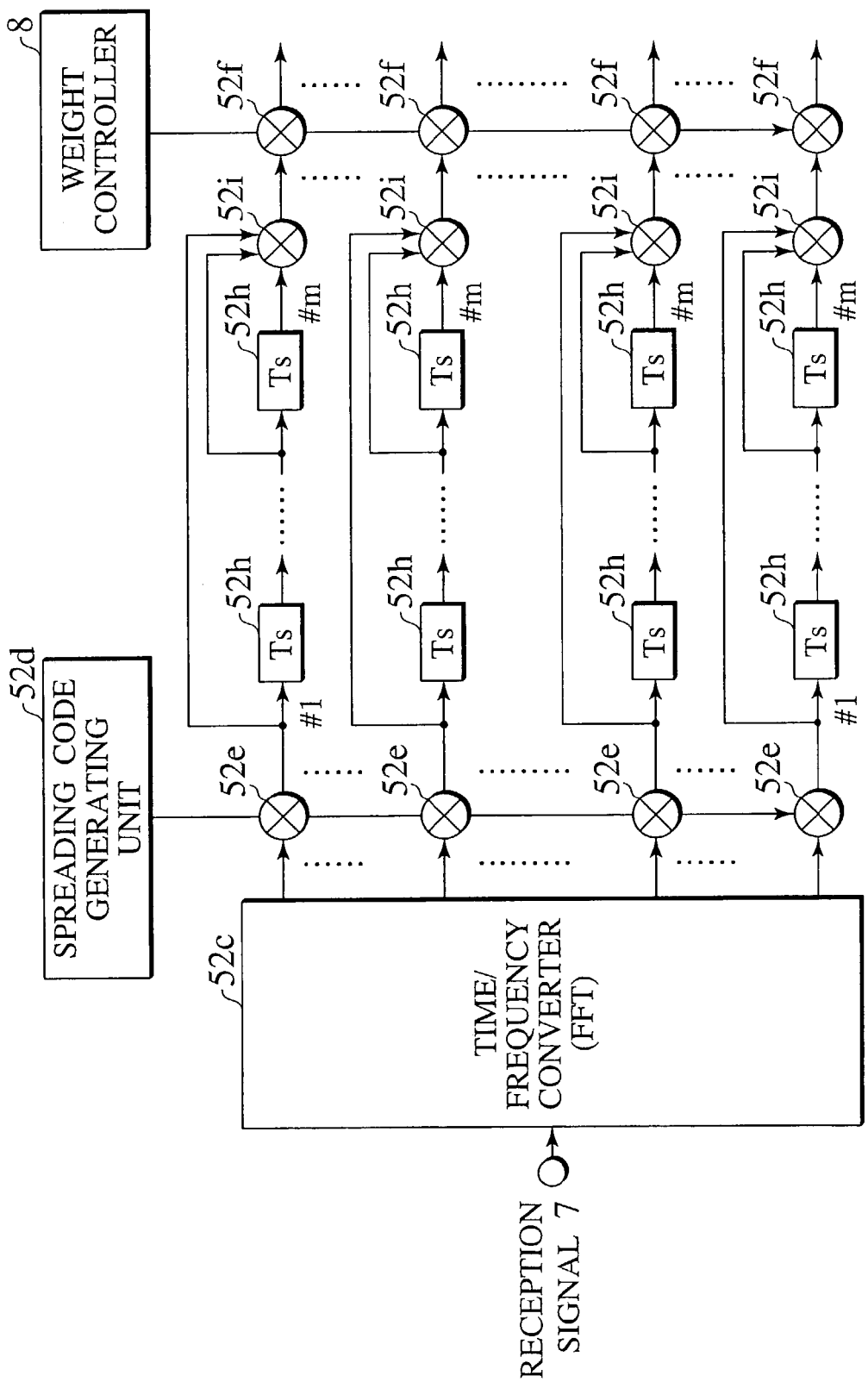
FIG. 41 illustrates the process of averaging a reception signal in the direction of a time axis according to the modification of the present invention.

As shown in FIG. 41, a receiver may have a plurality of delaying devices 52h and a plurality of adding units 52i. The spreading code multipliers 52e inputs reception signals 7 on a sub-carrier-by-sub-carrier basis multiplied by spreading codes to the delaying devices 52h and adding units 52i. In order to add m reception signals 7 on a sub-carrier-by-sub-carrier basis input thereto in the direction of the time axis, the plurality of delaying devices 52h generate m−1 reception signals 7 on a sub-carrier-by-sub-carrier basis that are shifted in time (m is a natural number).

A reception signal 7 on a sub-carrier-by-sub-carrier basis directly input from the spreading code multipliers 52e is used as the last signal. Therefore, m−1 delay devices 52h are provided. Each delay device 52h delays a reception signal 7 input thereto by a predetermined delay time (Ts) and inputs it to the next delay device 52h and to the adding units 52i. The delay time (Ts) is set at one symbol length.

The adding units 52i add a plurality of (m) reception signals 7 on a sub-carrier-by-sub-carrier basis input at different times in the direction of the time axis and average them in the direction of the time axis. The adding units 52i input the added reception signals 7 to the antenna weight multipliers 52f. The number of reception signals 7 on a sub-carrier-by-sub-carrier basis input to the adding units 52i may be different between for each of the adding units 52i.

Since the reception signals 7 on a sub-carrier-by-sub-carrier basis are thus averaged in the direction of the time axis, the signal power to noise power ratio (SNR) of the reception signals 7 can be increased by combining the averaged reception signals 7 over the spreading code duration and by despreading the same. Especially, when the sub-carrier weight controllers 827 to 829 shown in FIGS. 13F, 13G, and 26 are provided as sub-carrier weight controllers and sub-carrier weights are obtained using adaptive algorithm, the signal power to noise power ratio of the reception signals 7 after despreading used for determining sub-carrier weight will be great (this applies to the weight controller 308 when it has such features). This makes it possible to determine sub-carrier weights with increased accuracy at an increased speed.

Figure 42:
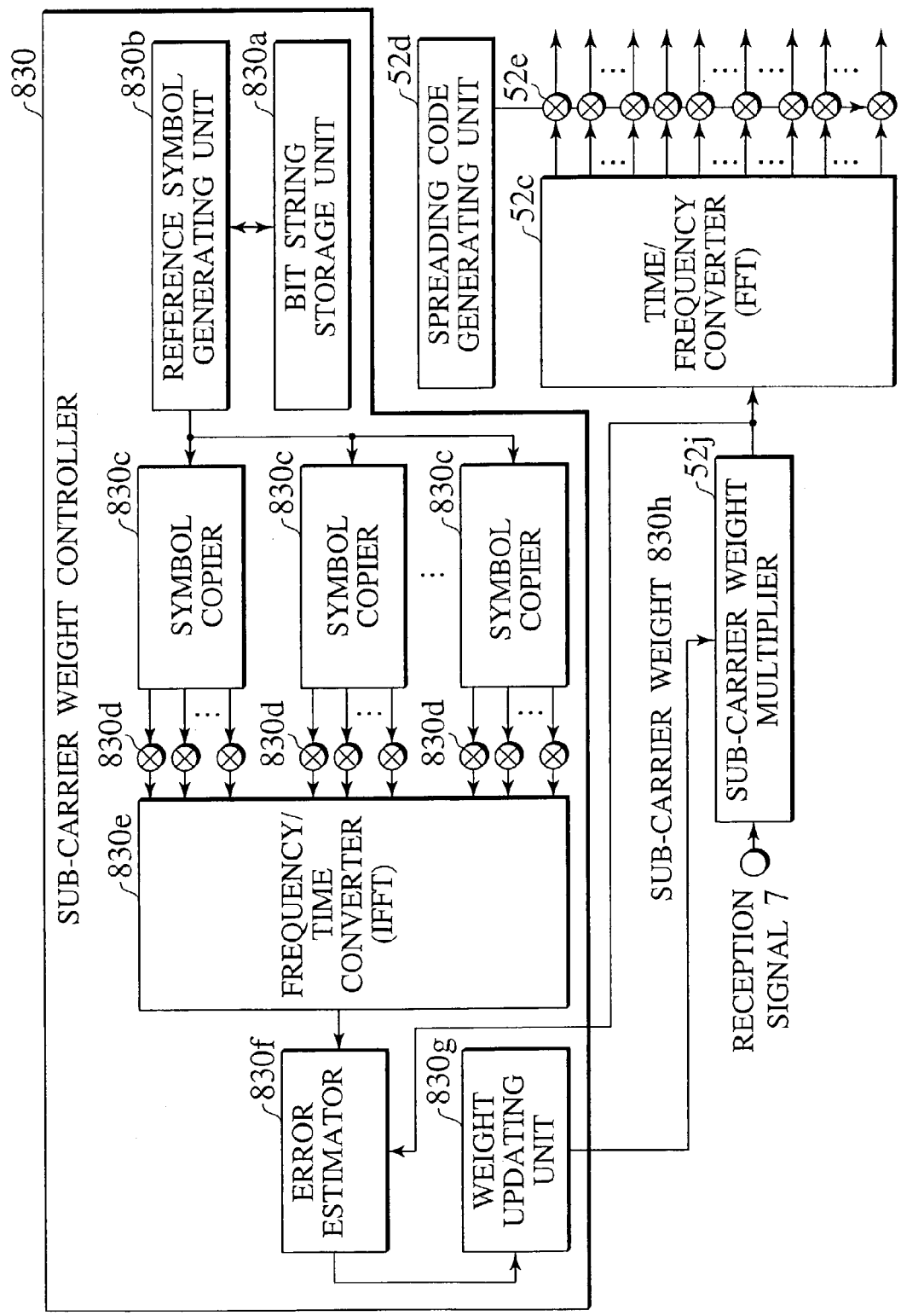
FIG. 42 is a block diagram illustrating configurations of a sub-carrier weight controller and a sub-carrier weight multiplier according to the modification of the present invention.

The receiver may have a sub-carrier weight controller 830 and a sub-carrier weight multiplier 52j as shown in FIG. 42 as a sub-carrier weight controller and a sub-carrier weight multiplier. Alternatively, a weight controller having the configuration of the sub-carrier weight controller 830 may be used, and a collective weight multiplier that multiply collective weights in the position of the sub-carrier weight multiplier 52j may be used.

The sub-carrier weight controller 830 has a bit string holding portion 830a, a reference symbol generating portion 830b, a plurality of symbol replicating portions 830c, a spreading code multiplier 830d, a frequency/time converter 830e, an error estimator 830f, and a weight updating unit 830g. The bit string storage unit 830a and the reference symbol generating unit 830b are substantially similar to the bit string storage unit 825b and the reference symbol generating part 825c of the sub-carrier weight controller 825 shown in FIG. 13D.

The reference symbol generating unit 830b inputs a reference symbol that it generates to the symbol replicating portions 830c. The symbol replicating portions 830c replicate the reference symbol in a quantity equal to the number of the spreading code durations of the spreading codes. The spreading code multiplier 830d multiplies the replicated reference symbols by spreading codes to obtain a reference signal. The frequency/time converter 830e performs frequency/time conversion on the reference signal to generate a reference signal that is spread among a plurality of sub-carriers (hereinafter referred to as "reference multi-carrier CDMA signal"). The frequency/time converter 830e inputs the reference multi-carrier CDMA signal to the error estimator 830f.

The sub-carrier weight multiplier 52j is provided upstream of the time/frequency converter 52c. The sub-carrier weight multiplier 52j multiplies a reception signal 7 by a sub-carrier weight. The sub-carrier weight multiplier 52j inputs the reception signal 7 multiplied by the sub-carrier weight to the error estimator 830f and the time/frequency converter 52c. The error estimator 830f estimates an error between the reception signal which has been multiplied by the sub-carrier weight and which has not been subjected to time/frequency conversion process at the time/frequency converter 52c and the reference multi-carrier CDMA signal. The weight updating unit 830g obtains a weight that is gradually updated to minimize a mean square error of the error between the reception signal 7 which has been multiplied by the sub-carrier weight input from the error estimator 830f and which has not been subjected to a time/frequency conversion process at the time/frequency converter 52c and the reference multi-carrier CDMA signal using adaptive algorithm. The sub-carrier weight controller 830 a sub-carrier weight 830h thus obtained to the sub-carrier weight multiplier 52j.

This makes it possible to update the sub-carrier weight to minimize a mean square error between a reception signal 7 which has not been subjected to a time/frequency conversion process at the time/frequency converter 52c and a transmission signal 6. As a result, the sub-carrier weight controller 830 achieves an effect that is similar to updating the sub-carrier weight such that a mean square error between the reception signal 7 after dispreading and the transmission signal 6 is minimized.

What is claimed is:

1. A receiver, comprising:
   a plurality of antennas configured to receive signals that are obtained by multiplying a plurality of data symbols transmitted over a plurality of data channels using spreading codes for each of the data channels, the data symbol being transmitted over a plurality of sub-carriers having different frequencies;
   a spreading code multiplier configured to multiply reception signals received by the plurality of antennas using spreading codes for the data channels corresponding to the reception signals;
   a weight controller configured to adjust antenna weights by which a reception signal received by each antenna is to be multiplied, and sub-carrier weights by which a reception signal received over each sub-carrier is to be multiplied;
   a weight multiplier configured to multiply the reception signals by the antenna weights and the sub-carrier weights adjusted by the weight controller; and
   a combining unit configured to combine the reception signals multiplied by the antenna weights and the sub-carrier weights at the weight multiplier among the antennas and over spreading code duration of the spreading codes.

2. The receiver according to claim 1, wherein the weight controller adjusts the antenna weights and the sub-carrier weights such that the spreading codes for the plurality of data channels are orthogonal to each other.

3. The receiver according to claim 1, wherein the weight controller adjusts the antenna weights and the sub-carrier weights such that the spreading codes for the plurality of data channels are orthogonal to each other and a great signal to noise power ratio is achieved as possible.

4. The receiver according to claim 1, wherein
   the weight controller adjusts the antenna weights and the sub-carrier weights to determine the antenna weights and the sub-carrier weights separately;
   the weight multiplier comprises an antenna weight multiplier configured to multiply a reception signal of each of the antennas by the antenna weights, and a sub-carrier weight multiplier configured to multiply a reception signal on each of the sub-carriers by the sub-carrier weights; and
   the combining unit comprises an antenna signal combining unit configured to combine the reception signals multiplied by the antenna weights among the antennas, and a symbol combining unit configured to combine the reception signals multiplied by the sub-carrier weights over the spreading code duration.

5. The receiver according to claim 4, wherein
   the sub-carrier weight multiplier multiplies the reception signal on each of the sub-carriers that has been multiplied using the spreading codes by the sub-carrier weights after the antenna weight multiplier multiplies the reception signal of each of the antennas by the antenna weights and the antenna signal combining unit performs antenna diversity combining by combining the reception signals among the antennas;
   and the symbol combining unit performs despreading by combining the reception signals, which have been multiplied by the sub-carrier weights over the spreading code duration after the antenna diversity combining is performed.

6. The receiver according to claim 5, wherein:
   the antenna weight multiplier multiplies the reception signal of each of the antennas by the antenna weights before the reception signals are demultiplexed into the reception signal on each of the sub-carriers; and
   the antenna signal combining unit combines the reception signals multiplied by the antenna weights among the antennas before the reception signals are demultiplexed into the reception signal on each of the sub-carriers.

7. The receiver according to claim 4, wherein
   the antenna weight multiplier multiplies the reception signal of each of the antennas by the antenna weights after despreading in which the spreading code multiplier multiplies the reception signals using the spreading codes for the data channels corresponding to the reception signals, the sub-carrier weight multiplier multiplies the reception signal on each of the sub-carriers by the sub-carrier weights, and the symbol combining unit combines the reception signals multiplied by the sub-carrier weights over the spreading code duration; and
   the antenna signal combining unit performs antenna diversity combining by combining the reception signals multiplied by the antenna weights among the antennas after the despreading is performed.

8. The receiver according to claim 7, wherein the weight controller determines the antenna weights based on the reception signal which has been combined by the symbol combining unit over the spreading code duration.

9. The receiver according to claim 1, wherein
   the weight controller adjusts the antenna weights and the sub-carrier weights to determine collective weights by which the reception signals are to be collectively multiplied;
   the weight multiplier multiplies a reception signal on each of the sub-carriers of each of the antennas by the collective weight; and
   the combining unit collectively combines the reception signals multiplied by the collective weight among the antennas over the spreading code duration.

10. The receiver according to claim 1, further comprising a judging unit configured to control an order of multiplying a reception signal on each of the sub-carriers that has been multiplied using the spreading codes by the sub-carrier weights, combining the reception signal on each of the sub-carriers over the spreading code duration, multiplying a reception signal of each of the antennas by the antenna weights, and combining the reception signal of each of the antennas among the antennas,
   wherein the weight multiplier and the combining unit perform despreading and antenna diversity combining under a control of the judging unit.

11. The receiver according to claim 10, further comprising a measuring unit configured to measure a condition of the reception signals received by the plurality of antennas,
   wherein the judging unit controls an order in which the despreading and the antenna diversity combining are performed based on the condition of the reception signals measured by the measuring unit.

12. The receiver according to claim 1, further comprising a propagation path state estimator configured to estimate a propagation path state in which transmitted signals have been propagated, wherein the weight controller adjusts the antenna weights and the sub-carrier weights based on an estimated value of the propagation path state estimated by the propagation path state estimator.

13. The receiver according to claim 1, further comprising an interference state estimating unit configured to estimate an interference state between the reception signals, wherein the weight controller adjusts the antenna weights and the sub-carrier weights based on an estimated value of the interference state estimated by the interference state estimating unit.

14. The receiver according to claim 1, further comprising a reception quality measuring unit configured to measure a reception quality of data symbols recovered from the reception signals, wherein the weight controller adjusts the antenna weights and the sub-carrier weights based on a measured value of the reception quality measured by the reception quality measuring unit.

15. The receiver according to claim 1, further comprising an adding unit configured to add the reception signal on each of the sub-carriers and averaging them in a direction of a frequency or a direction of a time axis.

16. A transmitter, comprising:
a divider configured to divide a data symbol transmitted over a plurality of data channels into a plurality of data symbols;
a symbol copier configured to copy the plurality of data symbols divided by the divider in a quantity equal to a number of spreading code duration of spreading codes corresponding to the data channels over which the data symbols are transmitted;
a spreading code multiplier configured to multiply the data symbols copied by the symbol copier using the spreading codes corresponding to the data channels over which the data symbols are transmitted to provide data signals;
a spreading unit configured to spread the data signals multiplied using the spreading codes at the spreading code multiplier over a plurality of sub-carriers having different frequencies for transmitting the data signals; and
a guard interval inserting unit configured to insert a guard interval in each of the data signals spread over the plurality of sub-carriers by the spreading unit to prevent interference between the data signals.

17. The transmitter according to claim 16, further comprising a pilot symbol inserting unit configured to insert a pilot symbol into the data symbols, an amplitude and phase of the pilot symbol being known to a receiver that receives the data signals.

18. The transmitter according to claim 17, wherein the pilot symbol inserting unit comprises:
a propagation path variation estimating pilot symbol inserting unit configured to insert the pilot symbol for estimating a propagation path variation used by the receiver for estimating a propagation path variation of the data signals into the data symbols; and
a weight updating pilot symbol inserting unit configured to insert the pilot symbol for updating a weight used by the receiver for estimating an error between data signals after despreading received by the receiver and the data signals transmitted by the transmitter into the data symbols.

19. A communication system, comprising:
a transmitter configured to transmit signals obtained by multiplying a plurality of data symbols transmitted over a plurality of data channels using spreading codes for each of the data channels using a plurality of sub-carriers having different frequencies; and
a receiver comprising a plurality of antennas configured to receive the signals transmitted by the transmitter, a spreading code multiplier configured to multiply reception signals received by the plurality of antennas using spreading codes for the data channels corresponding to the reception signals, a weight controller configured to adjust antenna weights by which the signal received by each antenna is multiplied, and sub-carrier weights by which a signal received over each sub-carrier is multiplied, a weight multiplier configured to multiply the reception signals by the antenna weights and the sub-carrier weights adjusted by the weight controller; and a combining unit configured to combine the reception signals multiplied by the antenna weight and the sub-carrier weight at the weight multiplier among the antennas and over spreading code duration of the spreading codes.

20. A method of communication, comprising:
receiving signals obtained by multiplying a plurality of data symbols transmitted over a plurality of data channels using spreading codes for each of the data channels and transmitted over a plurality of sub-carriers having different frequencies by a plurality of antennas of a receiver;
multiplying reception signals received by the plurality of antennas using spreading codes for the data channels corresponding to the reception signals at the receiver;
adjusting an antenna weights by which a signal received by each antenna is to be multiplied and a sub-carrier weights by which a signal received over each sub-carrier is to be multiplied;
multiplying the reception signals by the antenna weights and the sub-carrier weights adjusted by the adjusting step; and
combining the reception signals multiplied by the antenna weights and the sub-carrier weight among the antennas and over spreading code duration of the spreading codes.

21. The method of communication according to claim 20, wherein the receiver adjusts the antenna weights and the sub-carrier weights such that the spreading codes for the plurality of data channels are orthogonal to each other in adjusting the antenna weights and the sub-carrier weights.

22. The method of communication according to claim 20, wherein the receiver adjusts the antenna weights and the sub-carrier weights such that the spreading codes for the plurality of data channels are orthogonal to each other and such that a great signal to noise power ratio is achieved as possible in adjusting the antenna weights and sub-carrier weights.

23. The method of communication according to claim 20, wherein
the receiver adjusts the antenna weights and the sub-carrier weights to determine the antenna weights and the sub-carrier weights separately;
multiplies a reception signal of each of the antennas by the antenna weights, and combines the reception signals among the antennas; and multiplies a reception signal on each of the sub-carriers by the sub-carrier weights, and combines the reception signals over the spreading code duration.

24. The method of communication according to claim 20, wherein
the receiver adjusts the antenna weights and the sub-carrier weights to determine a collective weight by which the reception signals are to be collectively multiplied;
multiplies a reception signal on each of the sub-carriers of each of the antennas by the collective weights; and
collectively combines the reception signals multiplied by the collective weight among the antennas over the spreading code duration.

25. The method of communication according to claim 20, wherein
the receiver controls an order of multiplying a reception signal on each of the sub-carriers that has been multiplied using the spreading code by the sub-carrier weight, combining the reception signal on each of the sub-carriers over the spreading code duration, multiplying a reception signal on each of the antennas by the antenna weight, and combining the reception signal of each of the antennas among the antennas; and
performs despreading and antenna diversity under a control.

26. The method of communication according to claim 25, wherein the receiver measures a condition of the reception signals received by the plurality of antennas, and controls an order in which the despreading and the antenna diversity combining are performed based on the condition of the reception signals.

27. The method of communication according to claim 23, wherein the receiver multiplies the reception signal on each of the sub-carriers that has been multiplied using the spreading code by the sub-carrier weights; and
performs despreading by combining reception signals, which have been multiplied by the sub-carrier weights over the spreading code duration, after multiplies the reception signal on each of the sub-carriers by the antenna weights and performs antenna diversity combining by combining the reception signals which have been multiplied by the antenna weights among the antennas.

28. The method of communication according to claim 27, wherein the receiver multiplies the reception signal of each of the antennas by the antenna weights before the reception signals are demultiplexed into the reception signal on each of the sub-carriers; and
combines the reception signals multiplied by the antenna weights among the antennas before the reception signals are demultiplexed into a reception signal on each of the sub-carriers.

29. The method of communication according to claim 23, wherein the receiver multiplies the reception signal of each of the antennas by the antenna weights; and
performs antenna diversity combining by combining the reception signals multiplied by the antenna weights among the antennas, after performs despreading by multiplying the reception signals using the spreading codes for the data channels corresponding to the reception signals, multiplying the reception signal on each of the sub-carriers by the sub-carrier weights, and combining the reception signals multiplied by the sub-carrier weights over the spreading code duration.

30. The method of communication according to claim 29, wherein the receiver determines the antenna weights based on the reception signal, which has been combined over the spreading code duration.

31. The method of communication according to claim 27, wherein the receiver determines whether to maintain a state of the reception signals multiplied by the antenna weights or to adjust the state of the reception signals multiplied by the antenna weights again, based on the antenna weights by which the reception signals are multiplied, and adjusts the sub-carrier weights based on a result of determination.

32. The method of communication according to claim 27, wherein the receiver determines the antenna weights by using an equal gain combining method and determines the sub-carrier weights by using a minimum mean square error combining method or an equal gain combining method.

33. The method of communication according to claim 29, wherein the receiver determines whether to maintain a state of the reception signals multiplied by the sub-carrier weights or to adjust the state of the reception signals multiplied by the sub-carrier weights again, based on the sub-carrier weight by which the reception signals are multiplied, and adjusts the antenna weights based on a result of determination.

34. The method of communication according to claim 29, wherein the receiver determines the sub-carrier weights by using a minimum mean square error combining method and determines the antenna weights by using an equal gain combining method.

35. The method of communication according to claim 20, wherein the receiver estimates a propagation path state in which a transmitted signals have been propagated, and adjusts the antenna weights and the sub-carrier weights based on an estimated value of the propagation path state estimated.

36. The method of communication according to claim 35, wherein the receiver compares a threshold value of the propagation path state to be used as a criterion for an adjustment of the antenna weights and the sub-carrier weights with the estimated value of the propagation path state, and adjusts the antenna weights and the sub-carrier weight based on a result of comparison.

37. The method of communication according to claim 20, wherein the receiver estimates an interference state of the reception signals and adjusts the antenna weights and the sub-carrier weights based on an estimated value of the interference state.

38. The method of communication according to claim 37, wherein the receiver compares a threshold value for difference of the interference state between the antennas to be used as a criterion for an adjustment of the antenna weights and the sub-carrier weight with difference of the estimated value of the interference state between the antennas, and adjusts the antenna weight and the sub-carrier weight based on a result of comparison.

39. The method of communication according to claim 20, wherein the receiver measures a reception quality of data symbols recovered from the reception signals, and adjusts the antenna weights and the sub-carrier weights based on a measured value of the reception quality.

40. The method of communication according to claim 39, wherein the receiver compares a threshold value of a variation of the reception quality to be used as a criterion for an adjustment of the antenna weight and the sub-carrier weight with a variation of the measured value of the reception quality, and adjusts the antenna weight and the sub-carrier weights based on a result of comparison.

* * * * *